United States Patent
Sharma et al.

(10) Patent No.: US 9,952,881 B2
(45) Date of Patent: *Apr. 24, 2018

(54) VIRTUAL ASSISTANT SYSTEM TO ENABLE ACTIONABLE MESSAGING

(71) Applicant: Wand Labs, Inc., Redmond, WA (US)

(72) Inventors: Vishal Sharma, Los Altos, CA (US); Elhum Amjadi, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,741

(22) Filed: Apr. 18, 2017

(65) Prior Publication Data

US 2017/0220361 A1  Aug. 3, 2017

Related U.S. Application Data

(63) Continuation of application No. 14/966,212, filed on Dec. 11, 2015, now Pat. No. 9,661,105.
(Continued)

(51) Int. Cl.
| | | |
|---|---|---|
| *G06F 9/44* | (2018.01) | |
| *H04M 1/725* | (2006.01) | |
| *G06F 3/0488* | (2013.01) | |
| *G06F 3/0481* | (2013.01) | |
| *G06F 3/16* | (2006.01) | |
| *G06F 17/27* | (2006.01) | |

(52) U.S. Cl.
CPC ........ *G06F 9/4446* (2013.01); *G06F 3/04817* (2013.01); *G06F 3/04883* (2013.01); *G06F 3/165* (2013.01); *G06F 17/2785* (2013.01); *H04M 1/72527* (2013.01)

(58) Field of Classification Search
CPC ......... B60T 8/26; G01C 21/367; G01C 21/26; G01C 21/3638; G01C 21/3664
USPC ........ 701/300; 345/582, 619, 173, 419, 473, 345/587
See application file for complete search history.

(56) References Cited

U.S. PATENT DOCUMENTS

| | | |
|---|---|---|
| 7,155,672 B1 | 12/2006 | Adler et al. |
| 8,495,678 B2 | 7/2013 | Perlman et al. |
| | (Continued) | |

OTHER PUBLICATIONS

Sun et al., Providing context-awareness in the smart car environment, 2010, IEEE, p. 13-19 (Year: 2010).*
(Continued)

*Primary Examiner* — McDieunel Marc
(74) *Attorney, Agent, or Firm* — Law Offices of Richard Chi; Richard Chi

(57) ABSTRACT

A virtual assistant system includes a mobile device to receive an input command corresponding to a function to be performed at one or more external services, to translate the input command into a semantic atom representing the command, and to transmit the semantic atom, and an assistant server configured to receive the transmitted semantic atom, the assistant server including a plurality of plugins, each plugin corresponding to a respective one of the external services and configured to generate a proprietary language command corresponding to the received semantic atom for each external service in which the function is to be performed.

20 Claims, 23 Drawing Sheets

Multigesture to single gesture suggestion

Related U.S. Application Data

(60) Provisional application No. 62/090,786, filed on Dec. 11, 2014.

(56) References Cited

U.S. PATENT DOCUMENTS

| | | | |
|---|---|---|---|
| 8,661,496 | B2 | 2/2014 | Perlman et al. |
| 8,700,006 | B2 | 4/2014 | Ni |
| 8,893,207 | B2 | 11/2014 | Perlman et al. |
| 9,108,107 | B2 | 8/2015 | Perlman et al. |
| 9,111,214 | B1 | 8/2015 | Sharma et al. |
| 9,183,560 | B2 | 11/2015 | Abelow |
| 9,225,831 | B2 * | 12/2015 | Kim .................. G06F 3/167 |
| 9,461,943 | B2 * | 10/2016 | Narasimhan ........ H04L 41/0813 |
| 9,661,105 | B2 | 5/2017 | Sharma et al. |
| 9,692,855 | B2 * | 6/2017 | Sharma ............... H04L 67/38 |
| 9,697,202 | B2 | 7/2017 | Sharma et al. |
| 2004/0030804 | A1 | 2/2004 | Young |
| 2004/0030840 | A1 | 2/2004 | Mahnken et al. |
| 2005/0027708 | A1 | 2/2005 | Mueller et al. |
| 2007/0288467 | A1 | 12/2007 | Strassner et al. |
| 2008/0201723 | A1 | 8/2008 | Bottaro et al. |
| 2009/0234838 | A1 | 9/2009 | Ranjan et al. |
| 2009/0254912 | A1 | 10/2009 | Roundtree et al. |
| 2010/0257539 | A1 | 10/2010 | Narayanan et al. |
| 2012/0208564 | A1 | 8/2012 | Clark et al. |
| 2013/0219459 | A1 | 8/2013 | Bradley |
| 2013/0268260 | A1 | 10/2013 | Lundberg et al. |
| 2013/0321431 | A1 | 12/2013 | Chen et al. |
| 2013/0321441 | A1 | 12/2013 | Pahwa et al. |
| 2013/0321442 | A1 | 12/2013 | Van Os et al. |
| 2013/0321443 | A1 | 12/2013 | Pahwa et al. |
| 2013/0321450 | A1 | 12/2013 | Hultquist et al. |
| 2013/0321456 | A1 | 12/2013 | Hultquist et al. |
| 2013/0321472 | A1 | 12/2013 | Piemonte et al. |
| 2013/0324154 | A1 | 12/2013 | Raghupathy et al. |
| 2014/0028799 | A1 | 1/2014 | Kuffner et al. |
| 2014/0153489 | A1 | 6/2014 | Perras et al. |
| 2014/0162893 | A1 | 6/2014 | Wachter et al. |
| 2014/0214398 | A1 | 7/2014 | Sanders et al. |
| 2014/0269878 | A1 | 9/2014 | McGee et al. |
| 2014/0341109 | A1 | 11/2014 | Cartmell et al. |
| 2015/0163102 | A1 | 6/2015 | Staykoff |
| 2015/0213355 | A1 | 7/2015 | Sharma et al. |
| 2015/0278878 | A1 | 10/2015 | Sharma et al. |
| 2015/0278879 | A1 | 10/2015 | Sharma et al. |
| 2017/0093781 | A1 | 3/2017 | Sharma et al. |

OTHER PUBLICATIONS

Jimenez et al., CCENet: Framework for Knowledge Based Collaborative Environments in Internet, 2006, IEEE, p. 1-6 (Year: 2006).*

Loutas et al., Browsing service registries using the Atom Interface: An application in e-Government, 2008, IEEE, p. 782-787 (Year: 2008).*

"Non Final Office Action Issued in U.S. Appl. No. 14/608,786", dated Mar. 17, 2015, 22 Pages.

"Notice of Allowance Issued in U.S. Appl. No. 14/608,786", dated Apr. 30, 2015, 9 Pages.

"Non-Final Office Action Issued in U.S. Appl. No. 14/738,104", dated Apr. 14, 2016, 21 Pages.

"Notice of Allowance Issued in U.S. Appl. No. 14/738,104", dated Jul. 13, 2016, 9 Pages.

"Non-Final Office Action Issued in U.S. Appl. No. 14/738,121", dated May 2, 2016, 8 Pages.

"Notice of Allowance Issued in U.S. Appl. No. 14/738,121", dated Jul. 13, 2016, 7 Pages.

"Notice of Allowance Issued in U.S. Appl. No. 14/738,121", dated Nov. 28, 2016, 7 Pages.

"Notice of Allowance Issued in U.S. Appl. No. 14/738,121", dated Mar. 13, 2017, 7 Pages.

"Non Final Office Action Issued in U.S. Appl. No. 14/966,212", dated May 27, 2016, 25 Pages.

"Notice of Allowance Issued in U.S. Appl. No. 14/966,212", dated Jan. 25, 2017, 7 Pages.

"Notice of Allowance Issued in U.S. Appl. No. 14/966,212", dated Mar. 7, 2017, 2 Pages.

"Notice of Allowance Issued in U.S. Appl. No. 14/966,212", dated Feb. 27, 2017, 23 Pages.

"Non Final Office Action Issued in U.S. Appl. No. 15/158,718", dated Dec. 9, 2016, 8 Pages.

"Notice of Allowance Issued in U.S. Appl. No. 15/158,718", dated Mar. 23, 2017, 8 Pages.

"Non-Final Office Action Issued in U.S. Appl. No. 15/160,038", dated Nov. 25, 2016, 9 Pages.

"Notice of Allowance Issued in U.S. Appl. No. 15/160,038", dated Mar. 1, 2017, 7 Pages.

"Non-Final Office Action Issued in U.S Appl. No. 15/173,053", dated Jul. 24, 2017, 31 Pages.

Ameiri, et al., "Mobile Arabic Sign Language", In 6th International Conference for Internet Technology and Secured Transactions, Dec. 11, 2011, pp. 363-367.

Kim, et al."On Intelligent Avatar Communication Using Korean, Chinese and Japanese Sign-Languages: An Overview", In 8th International Conference on Control, Automation, Robotics and Vision, Dec. 6, 2004., pp. 747-752.

Lima, et al."LIBRAS Translator via Web for Mobile Devices", In Proceedings of the 6th Euro American Conference on Telematics and Information Systems, May 23, 2012, pp. 1-4.

"International Search Report & Written Opinion Issued in PCT Application No. PCT/US2015/065265", dated Mar. 4, 2016, 10 Pages.

* cited by examiner

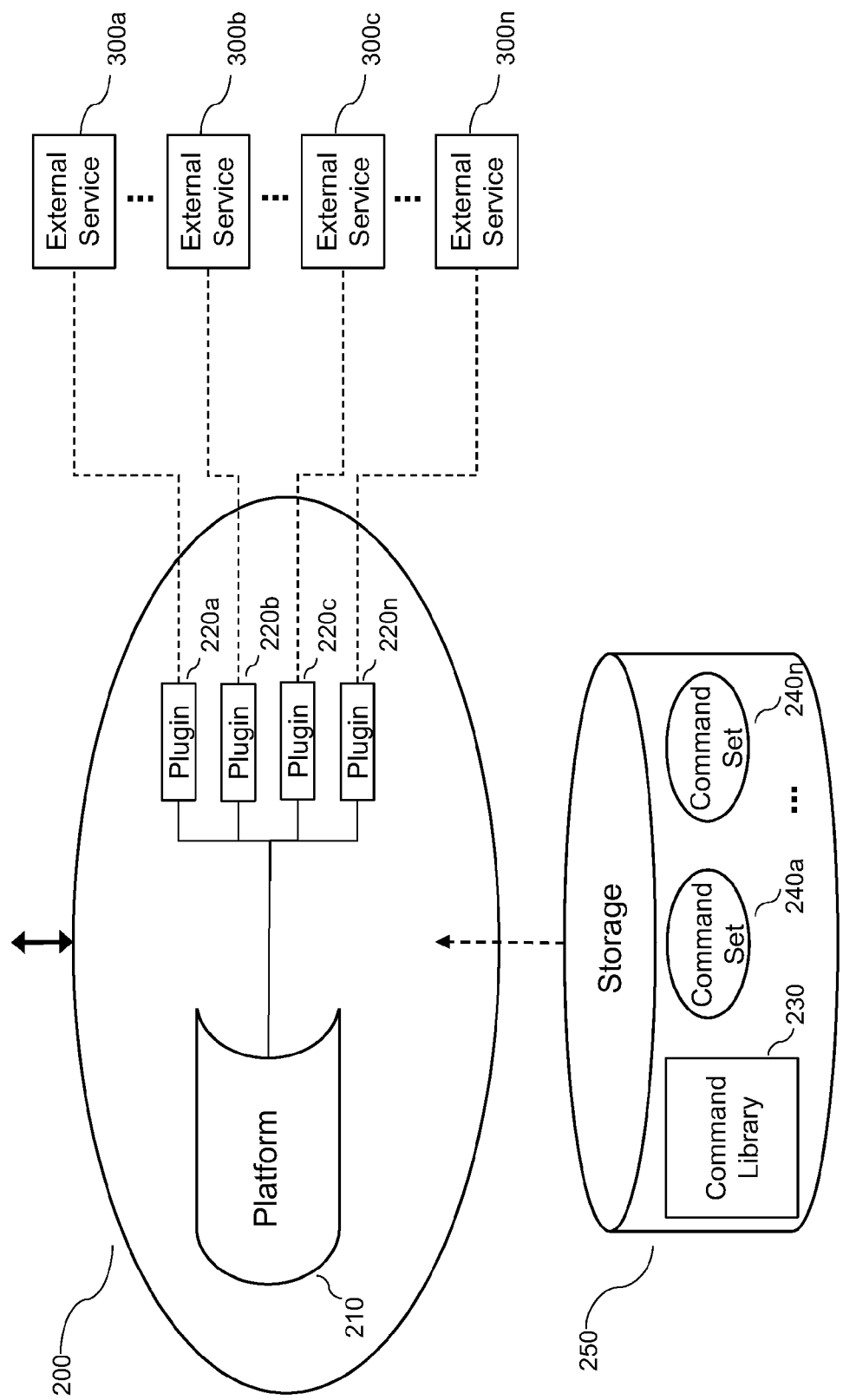

VIRTUAL ASSISTANT SYSTEM TO ENABLE ACTIONABLE MESSAGING

CROSS-REFERENCE TO RELATED APPLICATIONS

This application claims priority from U.S. Provisional Application No. 62/090,786, filed on Dec. 11, 2014, in the United States Patent and Trademark Office, the disclosure of which is incorporated herein in its entirety by reference.

BACKGROUND OF THE INVENTIVE CONCEPT

1. Field of the Invention

The present general inventive concept relates to a virtual assistant system to enable actionable messaging, which can enable control and wireless communications between a plurality of external services, as well as enable sharing of information between the plurality of external services, and to selectively allow sharing of the control with other users.

2. Description of the Related Art

Advancements in wireless communications have allowed innovation in data sharing to grow at a rapid rate. A user may use a mobile device (such as, for example, a phone, tablet computer, wristwatch, etc.) to open up various applications/programs, operate various devices, and communicate with other mobile devices. A development referred to as the Internet of Things, or IoT, reflects a growing trend of connecting to and controlling various services wirelessly.

Users of mobile devices, e.g., smartphones, customarily access a wide variety of services, for example "apps" on their mobile devices. Users must often switch from one service to another in order to access and use each service. Furthermore, the mobile device is limited to requiring the user to input commands, instructions, and data in a manner unique to each specific application/program and external service. More specifically, programs such as Facebook™ and LinkedIn™ each communicate in their own proprietary languages. If a user wishes to look up a person's profile in LinkedIn™ after having found that person in Facebook™, for example, the user is required to type in proper search criteria in proper fields within the LinkedIn™ program itself. As such, although a user may separately communicate with Facebook™ and LinkedIn™, these programs do not and cannot communicate with each other.

As another example, Phillips has developed a light emitting diode (LED) light bulb (i.e., the Phillips "Hue") that allows a user to change colors emitting therefrom via a mobile device that is running an application associated with the bulb. More specifically, the user must download and install, onto the mobile device, the application associated with the bulb, which communicates with the bulb using the Phillips Hue proprietary language. After the application is installed and running on the mobile device, the user may then control the tone, contrast, and color of the bulb using the mobile device. However, the user cannot grant access to the light bulb to another user operating another mobile device. Instead, if the other user wishes to control the light bulb with the other mobile device, the other user must also download and install the application associated with the bulb into the other mobile device.

Moreover, the user cannot use information within the application associated with the light bulb to interact with another application. For example, the user may not use information within the light bulb application to purchase more light bulbs in another application such as Amazon™. As such, the application associated with the bulb is limited merely to allowing a user to control the particular light bulb associated with the application stored within the user's mobile device.

Further, Apple™ and Google™ each include a voice assistant (Siri™ for Apple and Google Now™ for Google™) on its respective mobile device that translates a voice received into a search program. However, the Siri™ and Google Now™ assistants are limited to providing a search and some device actions, and have a limited integration with other applications such as OpenTable™, etc.

Accordingly, there is a need for a system that allows all services connected with the system to communicate therebetween.

Further, there is a need to be able to control any external services desired wirelessly, for example via the web, by inputting commands to perform such controls from a handheld device.

SUMMARY OF THE INVENTIVE CONCEPT

The present general inventive concept provides a mobile device, assistant server, and virtual assistant system configured to allow communication between a plurality of services, and control thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a virtual assistant system including a mobile device to receive an input command corresponding to a function to be performed at one or more external services, to translate the input command into a semantic atom representing the command, and to transmit the semantic atom, and an assistant server configured to receive the transmitted semantic atom, the assistant server including a plurality of plugins, each plugin corresponding to a respective one of the external services and configured to generate a proprietary language command corresponding to the received semantic atom for each external service in which the function is to be performed.

The assistant server may be further configured to receive output data from the one or more external services as a result of performing the function, to convert the received output data to one or more semantic atoms representing the received output data, and to send the one or more semantic atoms representing the received output data to at least one of the mobile device and another plugin corresponding to another external service.

The assistant server may be further configured to receive output data from the one or more external services at the corresponding one or more plugins as a result of performing the function, and to add the received output data to the semantic atom.

The assistant server may be configured to combine a plurality of semantic atoms to create a single merged semantic atom.

The assistant server may be configured to separate a semantic atom into a plurality of semantic atoms, each of the plurality of semantic atoms including a subset of information contained in the original semantic atom.

The assistant server may be configured to generate one or more copies of one or more semantic atoms.

The assistant server may be further configured to generate one or more copies of a semantic atom representing an input command, and to provide the one or more copies of the semantic atom to one or more plugins to generate proprietary language commands for the corresponding external services to perform functions corresponding to the input command.

At least one of the mobile device and the assistant server may be configured to transmit one or more semantic atoms to at least one other mobile device.

The one or more semantic atoms transmitted to the at least one other mobile device may represent user identification credentials to authorize a function at an external service.

The one or more semantic atoms transmitted to the at least one other mobile device represent output data received from the one or more external services.

The assistant server may be further configured to delete the semantic atom after generating the proprietary language command when the sematic atom is determined to no longer be required for further information transmissions thereof with other services or the mobile device.

The assistant server may be further configured to store the semantic atom after generating the proprietary language command.

The assistant server may provide the semantic atom representing the input command to a plurality of the plugins to generate proprietary language commands for each of the corresponding plurality of external services when the input command corresponds to a function or functions to be performed at the plurality of external services.

The assistant server may store credentials including data to authorize the mobile device to perform input commands for the one or more external services.

An input command at the mobile device may extend authority to perform input commands for the one or more external services to at least one other mobile device.

Another input command at the mobile device may revoke the authorization of the at least one other mobile device to perform input commands for the one or more external services.

Extending authority to perform input commands at the one or more external services to the at least one other mobile device may include copying the credentials and the plugin corresponding to the one or more external services to an assistant server accessed by the other mobile device.

The input command to extend authorization to the at least one other mobile device to perform input commands to the one or more external services may include information to limit the authorization to a predetermined level of control, a predetermined location in which control is permitted, a predetermined time frame in which the control is permitted and a predetermined access path in which the other user approaches the one or more external services.

The assistant server may analyze context information of the input command before converting the input command to a semantic atom to accurately determine the intended function to be performed by the input command.

The context information analyzed by the assistant server may include at least one of a location of the mobile device when the command is input, a time of day when the command is input, co-presence of specific individuals, involuntary actions by a user, and action sequences taken by a user of the mobile device.

The action sequences taken by the user may include a plurality of input commands made simultaneously or sequentially.

The action sequences taken by the user may include an input command that is invalidated and followed by another input command.

The assistant server may include a plurality of server devices, the plurality of server devices being configured to transfer semantic atoms between each other.

The plurality of server devices may include a main server device configured to communicate with the mobile device, and one or more subordinate server devices configured to communicate with the main server device.

The plurality of server devices may transmit semantic atoms to and receive semantic atoms from a plurality of mobile devices.

Each of the plurality of server devices may be in communication with a corresponding mobile device.

Each of the plurality of server devices may be in communication with at least one other of the plurality of server devices.

One or more of the plurality of server devices stores data regarding a user of the virtual assistant system.

The one or more server devices storing data regarding the user of the virtual assistant system may be configured to be disconnected from the plurality of server devices in response to an input command from the user.

One or more of the server devices may store one or more plugins, each of the one or more plugins corresponding to a different external service, and each of the server devices, upon receiving a semantic atom representing an input command corresponding to a function to be performed at an external service, may transmit the semantic atom to the server device storing the plugin corresponding to the external service.

The foregoing and/or other features and utilities of the present general inventive concept may be achieved by providing a method of controlling external services, the method including receiving an input command at a mobile device, the input command corresponding to a function to be performed at a selected one of a plurality of external services, translating the input command into one or more semantic atoms at the mobile device, transmitting the one or more semantic atoms to an assistant server configured to manage semantic atoms, providing the one or more semantic atoms to a plugin corresponding to the selected external service to generate a proprietary language command for the selected external service, and controlling the selected external service to perform the function by transmitting the obtained proprietary language command to the selected external service.

The method may further include providing the one or more semantic atoms representing the received output data to one or more plugins corresponding to one or more other selected external services to generate proprietary language commands corresponding to the received output data, and controlling the one or more other selected external services to perform functions by transmitting the proprietary language commands to the one or more other selected external services.

The foregoing and/or other features and utilities of the present general inventive concept may be achieved by providing a non-transitory computer-readable medium containing computer-readable codes to perform the method of controlling external services.

The foregoing and/or other features and utilities of the present general inventive concept may be achieved by providing a server device, including a storage system to store semantic atoms which can be shared between a plurality of external services, the storage system further including a library of commands to perform functions at the plurality of external services, a plurality of plugins, each plugin corresponding to a respective one of the plurality of external services, each plugin being configured to translate between semantic atoms and a respective proprietary language of the corresponding external service, and a platform configured to share semantic atoms between the plurality of external services by using the proprietary language translated at the respective plugins and to share semantic atoms with a mobile device in which commands to perform a function are initially input and transmitted to the platform as sematic atoms.

The storage system may store at least one command set corresponding to a respective one of the plurality of external services, each command set including commands to perform corresponding functions at the respective external service.

Each plugin may be created at the server device to include a set of commands selected from the stored library of commands, the set of commands to correspond with associated functions to be performed at the corresponding service.

The platform may be configured to wirelessly connect to a plurality of mobile devices to share information therebetween and to receive input commands therefrom, the information being shared and input commands being received being provided as semantic atoms.

The foregoing and/or other features and utilities of the present general inventive concept may be achieved by providing a mobile device, including a sensor to receive an input command to perform a function at one or more external services, and an assistant interface to translate the received input command into a semantic atom and to send the semantic atom to an external server to perform the function at the one or more external services via a corresponding plugin or to receive a semantic atom including proprietary language of the one or more external services to directly perform the function at the one or more external services.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 6A is a block diagram illustrating an exemplary embodiment of an assistant server usable with virtual assistant systems illustrated in FIGS. 1A-1B;

DETAILED DESCRIPTION OF THE PREFERRED EMBODIMENTS

Figure 1A:
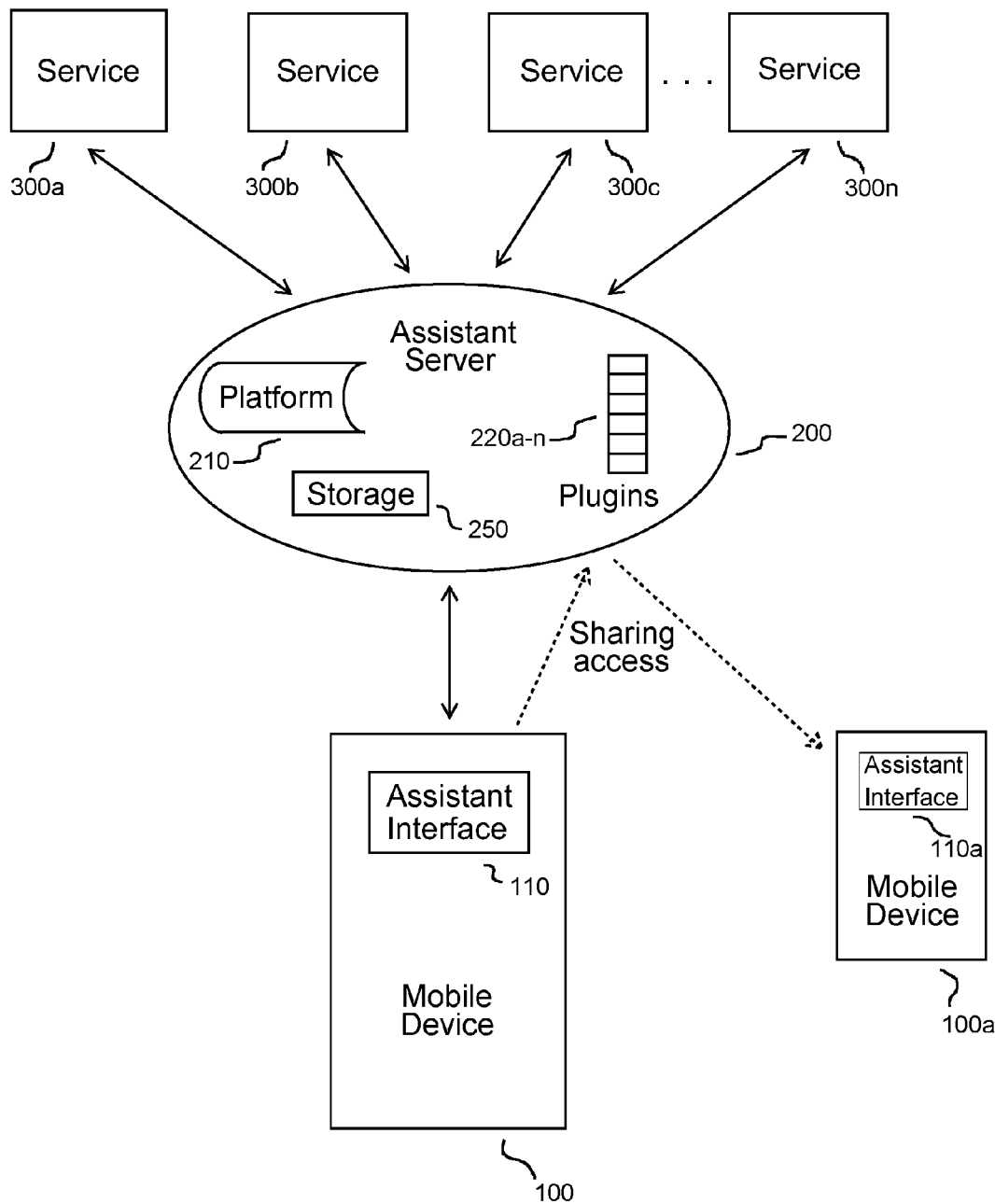
FIG. 1A is a block diagram illustrating a virtual assistant system according to an exemplary embodiment of the present general inventive concept.

Reference will now be made in detail to various exemplary embodiments of the present general inventive concept, examples of which are illustrated in the accompanying drawings, wherein like reference numerals refer to the like elements throughout. The embodiments are described below in order to explain the present general inventive concept while referring to the figures. Also, while describing the various exemplary embodiments of the present general inventive concept, detailed descriptions about related well-known functions or configurations that may diminish the clarity of the points of the present general inventive concept will be omitted for brevity of the description.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present general inventive concept will be described in detail with reference to accompanying drawings.

Figure 1B:
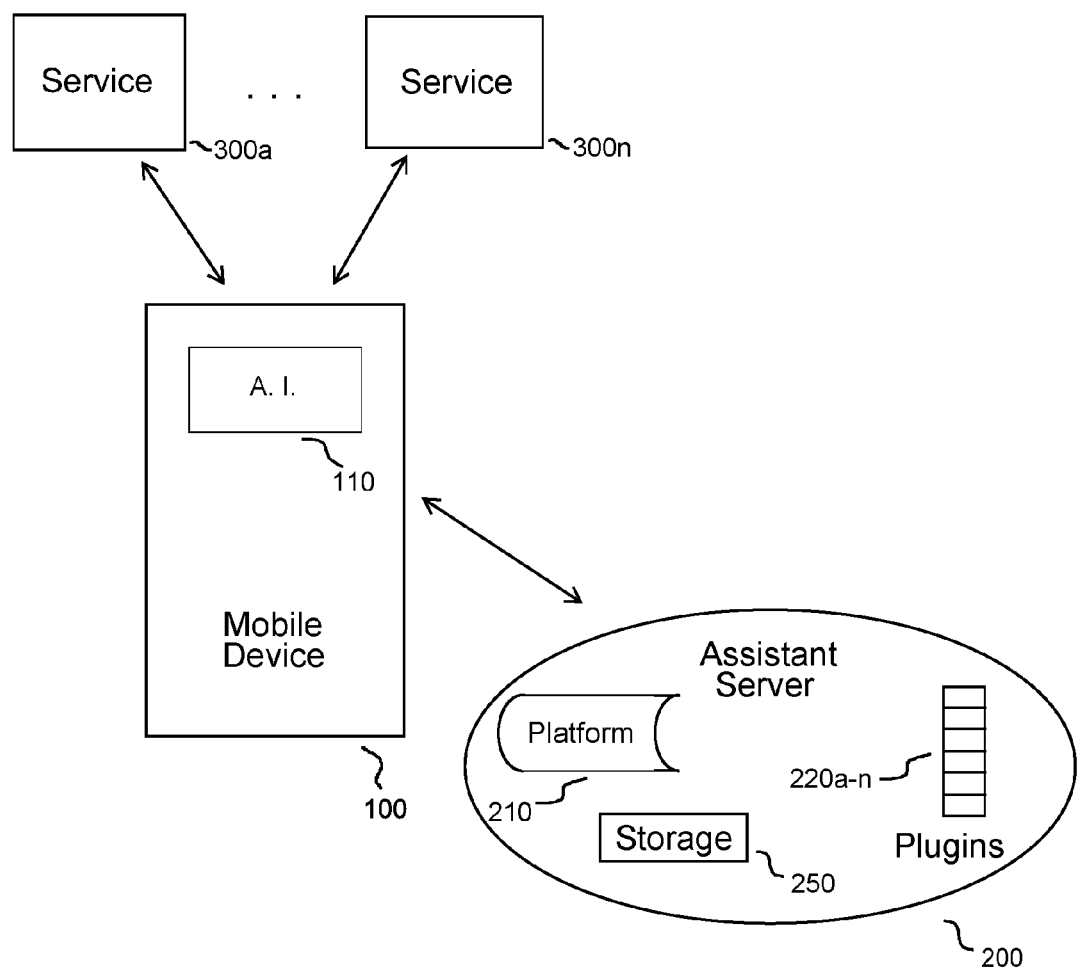
FIG. 1B is a block diagram illustrating a virtual assistant system according to another exemplary embodiment of the present general inventive concept.

FIG. 1A illustrates a virtual assistant system 10 according to an exemplary embodiment of the present general inventive concept, and FIG. 1B illustrates a virtual assistant system 10 according to another exemplary embodiment of the present general inventive concept.

The virtual assistant system 10 according to the exemplary embodiments of FIGS. 1A and 1B may include a mobile electronic device 100, an assistant server 200, and an external service 300 (or services 300*a-n*).

The virtual assistant system 10 is configured to enable actionable messaging. "Actionable messaging" as used herein means messaging which may be used to control external services 300*a-n*. Data may be messaged both to and from one user (e.g. from mobile device 100) to another user, as well as to and from one user and one or more external services 300*a-n*. Messaging in this manner enables one or more users of the virtual assistant system 10 to issue commands to one or more external services 300*a-n*, in a manner to be described infra.

"Messaging" as used herein is distinct from a "feed." A "feed" is effectively a stream of data, which a user may access to be provided with the data available at that moment in the stream. A user may contribute to the stream, e.g. by providing data, but there is limited back-and-forth communication. "Messaging," on the other hand, is more interactive, in which one or more specific users (or service(s) 300) are targeted to receive one or more specifically selected messages. The targeted user(s) (or service(s) 300) may respond to the message, e.g. with an acknowledgment, an output from an action performed in response to the message, additional information, and so on. Put another way, messaging encourages two-way conversations, whereas feeds are substantially one-way communication.

The mobile electronic device 100 (hereinafter "mobile device") may include capabilities of wireless or wired connectivity with the Internet and various networks in which the mobile device 100 can be configured to communicate. More specifically, the mobile device 100 may communicate with the assistant server 200 and/or the external service(s) 300*a-n* using Wi-Fi, Wi-Fi direct, Near-field communication (NFC), Bluetooth, radio frequency identification (RFID), Ethernet, FireWire, universal serial bus (USB), high definition multimedia interface (HDMI), or any other type of wireless or wired connection, but is not limited thereto. The communications between the mobile device 100, the assistant server 200, and the external service(s) 300 may be performed via the Internet, including cloud computing applications, satellite, a local network, etc.

The mobile device 100 may be any type of computing platform, including a smartphone, a tablet computer, a laptop computer, a smart watch, or a wearable device, but is not limited thereto, and may even include non-mobile devices such as a desktop computer or other stationary computing devices. The mobile device 100 is described in greater detail below with respect to FIG. 4A.

The mobile device 100 may also include an assistant interface 110 which is specifically created as part of the virtual assistant system 10 to allow all actions, commands, etc., originating at the mobile device 100, or obtained by the mobile device 100 via another sensor-type device, to be communicated to the assistant server 200, and vice versa, to allow the assistant server 200 to communicate necessary information to the mobile device 100 in which the assistant interface 110 is provided. The assistant interface 110 also allows communications with other assistant interfaces 110*a-n* provided on one or more other users' respective mobile devices 100*a-n*, or other servers which may contain libraries of commands, to be described in more detail infra. The assistant interface 110 provided at the mobile device 100 can perform similar operations as a "plugin" or "connector," among other operations to be described herein. The assistant interface 110 is described in greater detail below with respect to FIGS. 2A, and 5A-5B. The assistant interface 110 can be programmed into a mobile device 100 by a program designer or provided in the form of an application which may be downloaded to the user's mobile device 100 from an external source. The assistant interface 110 may also be called the "Client," but is not limited thereto. A user may connect their mobile device 100 to the assistant server 200 by programming or downloading and installing the assistant interface 110 into the mobile device 100.

Figure 4A:
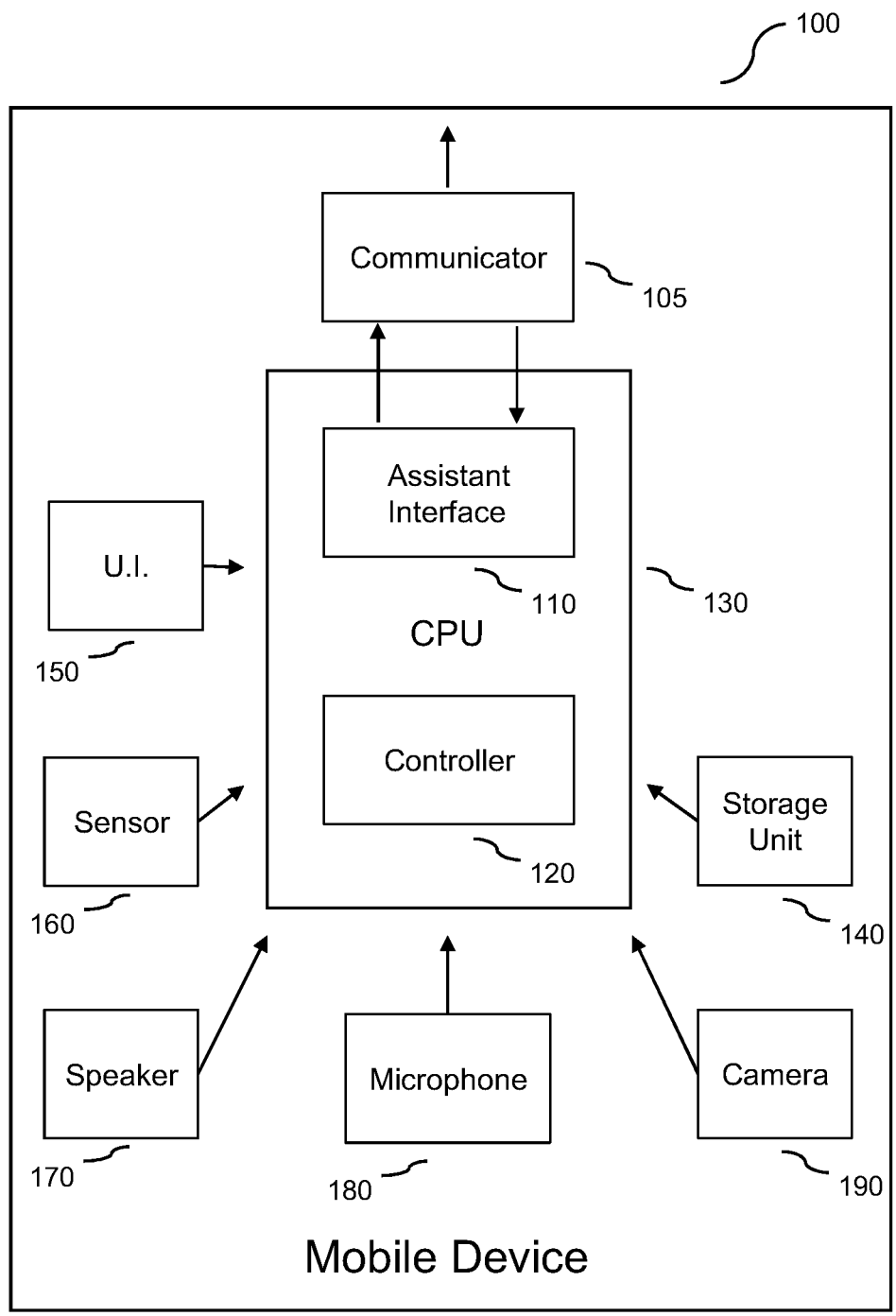
FIG. 4A is a block diagram illustrating an exemplary embodiment of a mobile electronic device usable with the virtual assistant systems illustrated in FIGS. 1A-1B.
Figure 4B:
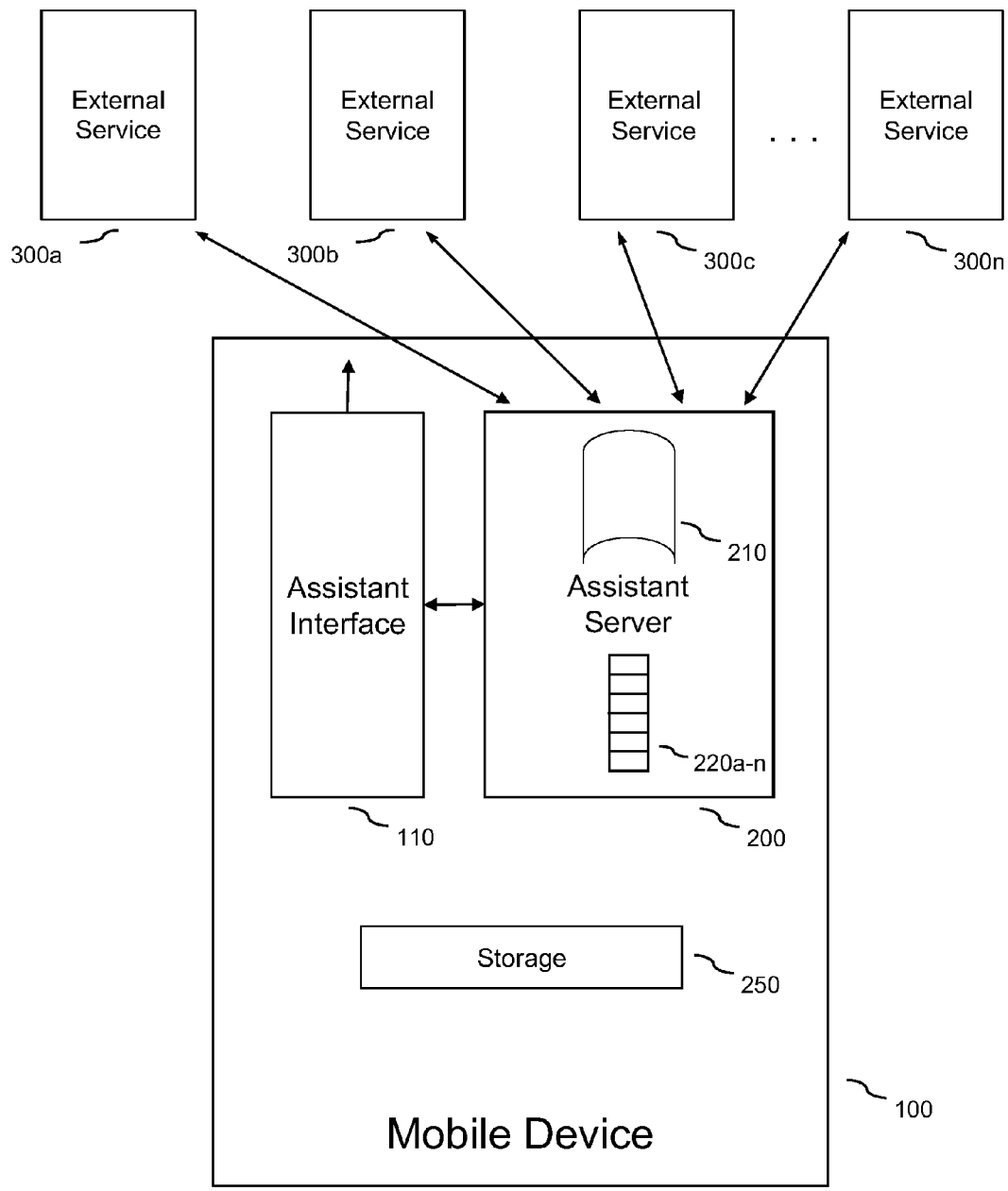
FIG. 4B is a block diagram illustrating another exemplary embodiment of a mobile electronic device.

Alternatively, as illustrated in FIG. 4B, the assistant interface 110 may be provided on the same hardware installation as the assistant server 200. In other words, the assistant server 200 may be provided at the mobile device 100 together with the assistant interface 110, in which case the assistant interface 110 is not required to wirelessly communicate with a backend-type server system in order to understand the actions required to take in order to perform any functions at a service 300. Thus, in the exemplary embodiment as illustrated in FIG. 4B, to be discussed in more detail below, the virtual assistant system 10 may be entirely self-contained in a mobile type device 100 as defined above.

The assistant server 200 can be a server that may include, for example, a computer, a dedicated computer (i.e., a back-end server), cloud-computing technology, or a plurality of computers, running one or more application(s) (i.e., software) that allows communication with the mobile device 100 (together with the assistant interface 110) via the Internet, and also allows communication with an infinite range of external services 300*a-n* (e.g. a television, a mobile device application, etc.) via the Internet. The assistant server 200 may store various plugins 220*a-n*, as well as command inputs, e.g., languages, icons, gestures, sensor-commands, programs, applications, commands, and libraries including any combinations of the above items, which are usable by the mobile device 100 running the Client 110. The assistant server 200 described here and illustrated in FIGS. 1A, 1B, and 6A has an open type platform 210, i.e., a facility whereby any software engineer (also referred to as the software or plugin developer) may create a connector (a "plugin" 220) therein to correspond with any service(s) 300. Each plugin 220 corresponds to a different external service 300. The assistant server platform 210 and plugins 220 may be included all together in one hardware configuration of the assistant server 200.

Figure 6C:
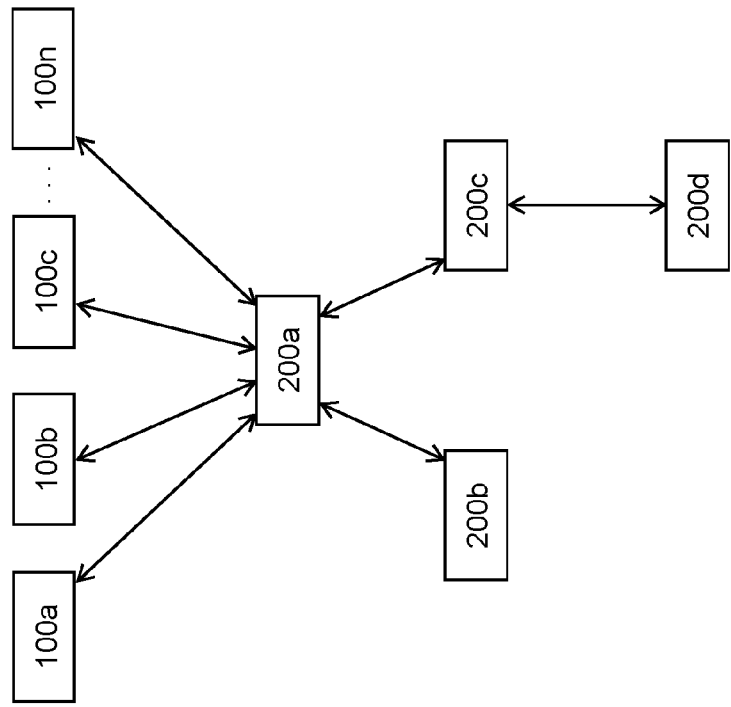
FIGS. 6B and 6C are block diagrams illustrating multiple instances of the assistant server according to exemplary embodiments of the present general inventive concept.
Figure 6B:
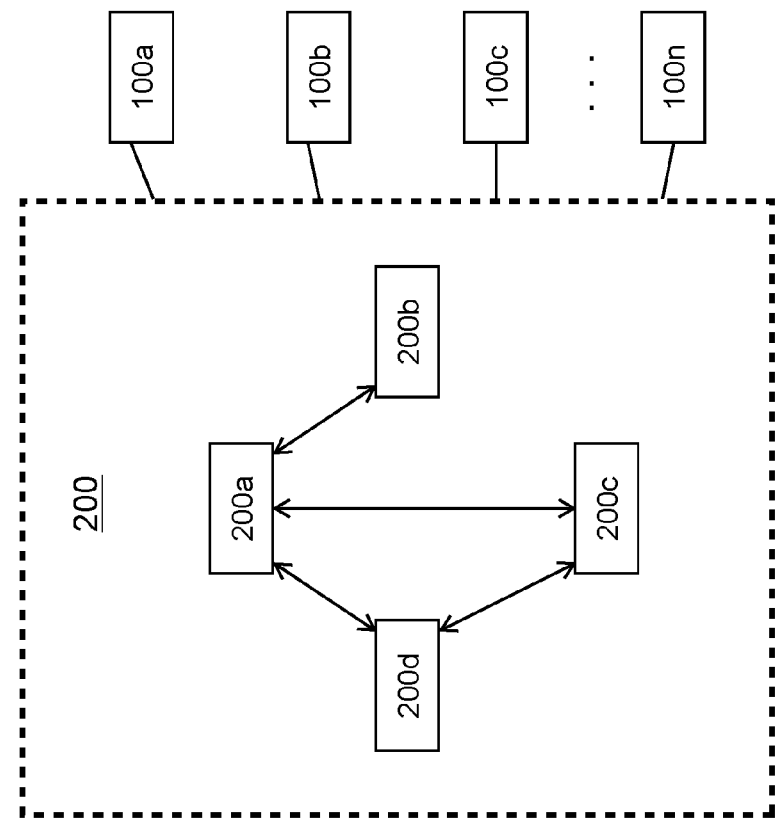

Several assistant servers 200 may communicate with one another to share functionality, thereby effectively operating as a single assistant server 200 spread out over multiple other servers. This arrangement, to be described in greater detail infra with reference to FIGS. 6B and 6C, is referred to herein as "multiple instances of the assistant server."

The external services 300*a-n* correspond to anything which may be controlled (perform functions) in response to command inputs from one or more users. The external services 300*a-n* may include, for example, devices such as lamps or doors, as well as software programs and applications or "apps" that a user might have on their computer or phone, but are not limited thereto. The external service(s) 300*a-n* may include any type of device or service that is connectable to the mobile device 100 and/or the assistant server 200 via a local network or the Internet, or other wireless forms of communication, as described above. Examples of services 300*a-n* for which plugins 220 may be created include home and office systems (e.g., security, lighting, thermostats), automotive devices, apps, wearable devices, online services, web pages, etc. This list of services 300*a-n* is provided herein as examples only, and are far more expansive to millions of other services.

Services 300*a-n* may be accessible via the Internet, for example, as well as the mobile devices 100*a-n* themselves. Services 300*a-n* which are not immediately capable of wireless communications (for example, lamps, garage doors, etc.) are also capable of being Internet-accessible or otherwise capable of communicating with other apparatuses/devices, including the mobile device 100 and assistant server 200, by being supplied with a wireless chip or other device, such as, for example, GoGogate™ for garage doors. Normally inaccessible services 300*a-n* may be made wireless-ready by connecting them to an Internet-accessible device. This concept has been recognized and is currently being referred to in discussions relating to "the internet of things," also referred to as IoT. Such services 300*a-n* are also accessible via a local network type of communication so that the mobile device 100 may ultimately control the services 300*a-n* directly once the proprietary language, including necessary credentials, is obtained by the mobile device 100.

It is well known that each of the external services 300*a-n* used throughout the world have their own corresponding proprietary data structures in their own proprietary languages, as well as specific credentials which are required to control/operate the respective external service 300. However, the plugins 220 act as translators (or interpreters) between the proprietary data structures and the semantic language. Each plugin 220 therefore allows the assistant server 200 to communicate with the respective external service 300 in its respective proprietary language via the Internet, WiFi, Bluetooth, WiFi direct, HDMI, USB, FireWire, NFC or other means in order to execute a user's wishes, either explicit or inferred by the virtual assistant system 10. The plugin 220 also can provide the assistant server 200 with any proprietary language information regarding the corresponding external service 300, including specific credentials, which may be necessary in order to permit security access to the desired service 300 to be controlled.

The various plugins 220*a-n* correspond to various respective external services 300*a-n* (including, for example, devices, services, programs, and applications). An engineer/developer may create such a plugin 220 at the assistant server 200 to allow the assistant server 200 to communicate with the corresponding external service 300 in its respective proprietary language. The engineer/developer may create the plugin 220 for the corresponding service 300 based on specifications of the external service 300. Accordingly, an infinite number of plugins 220*a-n* can be created at the assistant server 200 to allow one or more users to control the various respective services 300*a-n* in the manner as described above. Furthermore, although the plugins 220*a-n* are illustrated as being programmed/stored at the assistant server 200, one or more plugins 220*a-n* may also be stored at the mobile device 100 (for example, programmed/stored in the assistant interface 110), thereby allowing the assistant interface 110 to communicate directly with the respective external services 300*a-n*.

The plugins 220 can be programmed in any programming language, such as, for example, C, Python, Java, C++, OCAML, etc., but are not limited thereto. Furthermore, the plugins 220*a-n* can also be programmed using a graphical interface or web form that allows a programmer to make selections of visual data (such as icons, pictures, text, etc.) in order to allow the plugins 220*a-n* to be generated without using any programming language at all (i.e. the code is generated automatically from the insertion and/or incorporation of the visual data into the graphical interface or web form).

The combination of the mobile device 100 running the Client 110 and the assistant server 200 is referred to herein as the "virtual assistant" but is not limited thereto. Alternatively, users may become accustomed to referring to the mobile device 100 as their own personal "virtual assistant," since a consumer will not necessarily be aware of the components and processes involved with the operations and communications involving the mobile device 100 and the assistant server 200. In other words, the user may only perceive interacting with a mobile device 100 to control external service(s) 300.

The assistant server 200 also has a designated storage 250 (illustrated in FIG. 6A) associated with it. The storage 250 may be included as part of the assistant server 200 (for example, if the assistant server 200 is a back-end server), or the storage 250 may be an external storage which the assistant server 200 can access, such as, for example, an external server, a remote storage device or a cloud storage service. A software engineer may select from a predefined library of command inputs which are stored in the designated storage 250 in order to define a command set 240 (illustrated in FIG. 6A) which allows the user to present corresponding commands to each external service 300a-n via the assistant server 200. The library of command inputs may include any inputs which may be received by the mobile device 100. The command inputs may include, for example, gestures and icons, as well as audible or voice commands (stored as actionable data), and other forms of commands, which are stored in the storage 250 (to be described in more detail below with respect to FIG. 6A) associated with the assistant server 200, to define a command set 240 which allows the user at the mobile device 100 to present these selected commands to the respective external services 300a-n via the assistant server 200. In other words, the storage 250 stores a vast vocabulary of commands, such as, for example, gestures, icons, voice data, etc., in the form of a common vocabulary format which can be selected from by the software engineer in order to create separate command sets 240a-n associated with each of the external services 300a-n. These commands are selected to create command sets 240a-n to correspond with respective functions that can be performed at each of the external services 300a-n. The commands stored in the storage 250 can also be shared between an infinite number of the external services 300a-n and mobile devices 100a-n. As used herein, "command inputs" or "commands" may include any form of input to control an action of the virtual assistant system 10. It will be understood that the specific command inputs used in the examples infra may be replaced by other command inputs. For example, if a gesture is described, this command input of a gesture may be replaced by a command input of, e.g., touching a displayed icon, depending on the particular exemplary embodiment of the present general inventive concept.

As will be described below with respect to FIG. 1B, under certain predefined situations, these specific commands from the defined command set 240 can be presented to the corresponding external service 300 directly from the mobile device 100 through the assistant interface 110 in a local control mode. The assistant server 200 also provides assistance in this local mode, as will be described in more detail infra.

As pointed out above, the selections of commands by the plugin developer can be grouped together and saved in the storage 250 as separate command sets 240a-n, which can be specific to the corresponding services 300a-n (illustrated in FIG. 6A). In other words, storage 250 can be configured with a vast vocabulary of gestures, icons, voice data, and other type commands provided in a common vocabulary format, which can be shared between all services 300a-n which are connected to the assistant server 200. A software engineer may select from this common vocabulary of commands while creating a plugin 220 in order to create a command set 240 to be associated with the various functions or operations that the corresponding external service 300 can perform. This common vocabulary format of commands will be part of a language hereinafter referred to as a "semantic language." from which. The semantic language is used to represent objects and concepts, a list which may include but is not limited to commands, authority to issue commands, people, and objects and services (e.g., songs, movies, restaurants, weather reports, Wi-Fi access, etc.).

The semantic language used at the assistant server 200 allows the assistant interface 110, provided within the mobile device 100, to communicate the many gestures, icon touches, voice data, etc., from the mobile device 100 (in raw input form) to the assistant server 200 since the assistant interface 110 translates the received gestures, icon touches, voice data, etc. into this created semantic language in order to communicate all types of information relevant to different services 300a-n therebetween via a single language within the assistant server 200.

The semantic language allows the assistant server 200 to function as a universal translator between the various services 300a-n. More specifically, the semantic language can be used for communication between the assistant server platform 210 and each of the plugins 220a-n for all of the services 300a-n for which a plugin 220 is created at the assistant server 200.

Various entities and concepts may be represented as units of data in the semantic language. These units of data are referred to herein as "semantic atoms" or "atoms" 1000. A semantic atom 1000 may represent anything in the world, independent of any particular external service 300. Semantic atoms 1000 may represent data, for example a name or a time, and may also represent abstract concepts and other information. For example, a semantic atom 1000 could represent a command, a person, a business, a movie, a location, a WiFi access point, a song, a Social media post, a light bulb, a car, a GPS device, a virtual assistant, etc.

The virtual assistant system 10 uses these semantic atoms 1000 to allow various services 300a-n to communicate seamlessly with one another, as well as with the assistant server 200 and the mobile device 100 (and other mobile devices 100a-n). The various services 300a-n, operating in conjunction with plugins 220a-n, may utilize one or more of the semantic atoms 1000a-n to perform their respective functions.

The system of semantic atoms 1000 is maintained in the assistant server 200. The exact definitions of, e.g., command inputs, can evolve over time, including with the participation of an open developer community. This evolution with an open developer community is an approach known as 'Folksonomy,' when applied to taxonomies which evolve through community participation.

The applications of semantic atoms 1000, and the number of things which may be represented by semantic atoms 1000, are infinite. Semantic atoms 1000 can be represented in a variety of formats, including text, YAML, XML and other such languages. These formats may correspond to the semantic language, which as described above is a standardized language or set of languages in which semantic atoms 1000 are represented. Semantic atoms 1000 may be stored in the mobile device 100 (for example, in storage unit 140, illustrated in FIG. 4A), or in the assistant server 200 (for example, in storage 250, illustrated in FIG. 6A). One or more semantic atoms 1000 may even be stored separately and removed from the virtual assistant system 10 (e.g., on a removable memory device such as a USB thumb drive), and brought back to the virtual assistant system 10 at a future date, at which time the semantic atom(s) 1000 would be instantly understood by the virtual assistant system 10.

When the virtual assistant system 10 receives an input from a human or from a system (service 300) with which it is integrating, the virtual assistant system 10 may convert the input into one or more semantic atoms 1000. If the input is received from a user (at the mobile device 100), the input is translated into one or more semantic atoms 1000 at the assistant interface 110. If the input is received from an external service 300, the input is translated into one or more semantic atoms 1000 at the corresponding plugin 220. Each plugin 220 includes instructions to translate between semantic atoms 1000 and the proprietary language of the corresponding service 300. Accordingly, for every service 300 that the virtual assistant system 10 knows how to interact with (via a plugin 220), the virtual assistant system 10 knows how to translate from semantic atoms 1000 language to the data structures (proprietary language) used by that service 300, and vice versa. These plugins 220, used in conjunction with semantic atoms 1000, allow the orchestration of actions across a vast number of disparate services 300*a-n* with ease.

The assistant server 200 may include any type of master/slave arrangement as predetermined by a user. This may be predetermined by the end-user, or someone that is managing the assistant server 200 can also set up the arrangement of the assistant server 200 in a predetermined way. The assistant server 200 may also be connected to any number of mobile devices 100*a-n*, and may therefore facilitate communication between these mobile devices 100*a-n*, as will be described in greater detail infra.

As described above, the storage 250 can store various languages, icons, gestures, sensor-commands, key-strokes, voice data commands, programs, applications, etc., as well as libraries including any combinations of the above items and commands in the semantic language using semantic atoms 1000. These items and commands are associated with any commands that can be instructed by a user by inputting such a command at the mobile device 100, which then sends the input command to the assistant server 200 via the assistant interface 110 after being translated into semantic atoms 1000 (the semantic language) by the assistant interface 110. Alternatively these items or commands can be obtained by the mobile device 100 via another source (such as, for example, sensors 160, to be described in more detail below with reference to FIGS. 4A, 5A-5B, and 8) and then presented to the assistant server 200 via the assistant interface 110 after being translated into semantic atoms 1000 by the assistant interface 110.

As pointed out above, the assistant interface 110 first translates an input command into one or more semantic atoms 1000 that represent the input command. In an exemplary embodiment of the present general inventive concept, a single atom 1000 is generated to represent a single input command. However, the assistant interface 110 may instead generate multiple semantic atoms 1000, for example if the command is being sent to multiple assistant servers 200*a-n* or multiple services 300*a-n*. The atom 1000 generated by the assistant interface 110 may itself also include other atoms 1000, for example if the user is forwarding a song (represented by an atom 1000) to assistant server 200 with instructions to play the song at a corresponding service 300.

Once the semantic atom(s) 1000 corresponding to the command is/are provided to the assistant server 200, the atom(s) 1000 may be converted to the appropriate proprietary language at the corresponding plugin 220. The proprietary language command provided by the plugin 220 contains within it specific credentials with respect to the service 300, such as, for example, where the service 300 is located, the IP address of the service 300, and/or any other information that may be required to permit the virtual assistant system 10 to directly control the desired service 300. Thus, each plugin 220 can be created by an engineer to contain specific credentials of the corresponding service 300 required in order to communicate with and operate the service 300.

In other words, any type of gesture, icon touch, voice, keyboard input, or other input command input at the mobile device 100 or through the mobile device 100 (a raw input command) by another sensor type device, can be first translated into one or more semantic atoms 1000 via the assistant interface 110. Once the semantic atom(s) 1000 corresponding to the input command are recognized within the assistant server 200, they can be translated at each plugin 220 created for the corresponding external service 300 to the proprietary language (including any necessary credentials) used by the corresponding external service 300. Using the proprietary language format (including any necessary credentials) of the input command, the intended function/operation desired to be performed at the corresponding external service 300 can be performed.

As described herein, semantic atoms 1000 may be converted to proprietary language at the plugins 220. When a semantic atom 1000 is "converted" or "translated" at a plugin 220, one or more proprietary language commands is/are generated at the plugin 220, and the original semantic atom 1000 may be discarded or maintained. Plugins 220 may discard or maintain atoms 1000 depending on the immediate situation, e.g., the content of the atom 1000, the type of function(s) to be performed at the service 300, etc. Rules on managing atoms 1000, including whether to discard or maintain atoms 1000, are kept at the plugins 220.

An atom 1000 may be discarded when it is determined that the original atom 1000 is no longer necessary. For example, if the atom 1000 represents a command to turn on a light (a service 300), there no need to keep the original atom 1000 after the corresponding plugin 220 has sent a proprietary language command to the light to turn on. If the original semantic atom 1000 is discarded, the plugin 220 may still generate new semantic atoms 1000, for example based on output data received from the service 300. In the example of turning on a light, above, if the plugin 220 discards the original atom 1000, the plugin 220 may generate a new atom 1000 representing, e.g., the color of the light after the light is turned on.

Alternatively, an atom 1000 may be maintained so that further information may be added to it. For example, if an atom 1000 representing a person is sent to a Facebook™ plugin to look up that person in Facebook™, the results of the search (e.g., the person's Facebook™ profile) may be converted to the semantic language at the plugin 220 and added to the original semantic atom 1000 representing the person. Adding information to the atom in this way may be referred to herein as "enriching" the atom.

As illustrated, for example, in FIG. 1A, the assistant server 200 may communicate directly with the external services 300*a-n* by converting the received commands expressed in the form of semantic atoms 1000 to the corresponding proprietary language at the plugins 220. In this exemplary embodiment, the mobile device 100 is configured to be part of the virtual assistant system 10 and communicates with the assistant server 200 through the assistant interface 110. The assistant server 200 can control (via plugins 220*a-n*) any number of the external services 300*a-n* included within the virtual assistant system 10 via an Internet or any other type of wireless connection, as described above, which the assistant server 200 shares with the external services 300*a-n*. Furthermore, the assistant server 200 can provide interaction (share information) between each of any number of the external services 300*a-n* included within the virtual assistant system 10 using the semantic atoms 1000 as a common language. These external services 300a-n may be connected to the assistant server 200 via an Internet or other type of wireless connection, as described above.

Alternatively, the assistant interface 110 may directly perform functions at the services 300a-n which are associated with a respective input command provided at the mobile device 100. FIG. 1B is a block diagram illustrating this exemplary embodiment of the present general inventive concept. As illustrated in FIG. 1B, the mobile device 100 is configured to be part of the virtual assistant system 10 and communicates with the assistant server 200 through the assistant interface 110, similar to the exemplary embodiment of FIG. 1A. However, in this exemplary embodiment, when it is determined that the mobile device 100 is within a certain range of a particular external service 300a-n desired to be controlled, or within a common network of the particular service 300a-n, the assistant server 200 can communicate back to the mobile device 100 to permit the mobile device 100 to perform direct control of the particular external services 300a-n, similar to the way a remote control device would perform these controls (i.e. a television and corresponding remote control device).

More specifically, if a location based communication service (for example, NFC, Bluetooth, etc.) is established between the mobile device 100 and a desired external service 300 to be controlled, this "established proximity" communication information can be provided to the assistant server 200 through the assistant interface 110. The assistant server 200 can then provide control access of the desired external service 300 to the mobile device 100 directly. In this situation, the plugin 220 corresponding to the particular service 300 can first embed the necessary proprietary language information into one or more semantic atoms 1000 so that the assistant server 200 can provide this information to the mobile device 100 through the assistant interface 110. When the one or more semantic atoms 1000 containing the proprietary language information are received at the assistant interface 110, the assistant interface 110 may extract the proprietary language information from the atom(s) 1000, which the mobile device 100 can use to control the service 300b. As a result, the mobile device 100 can directly control the desired external service 300 in the same fashion as a hand-held remote control specifically designed for the service 300 would control the service 300.

Figure 7A:
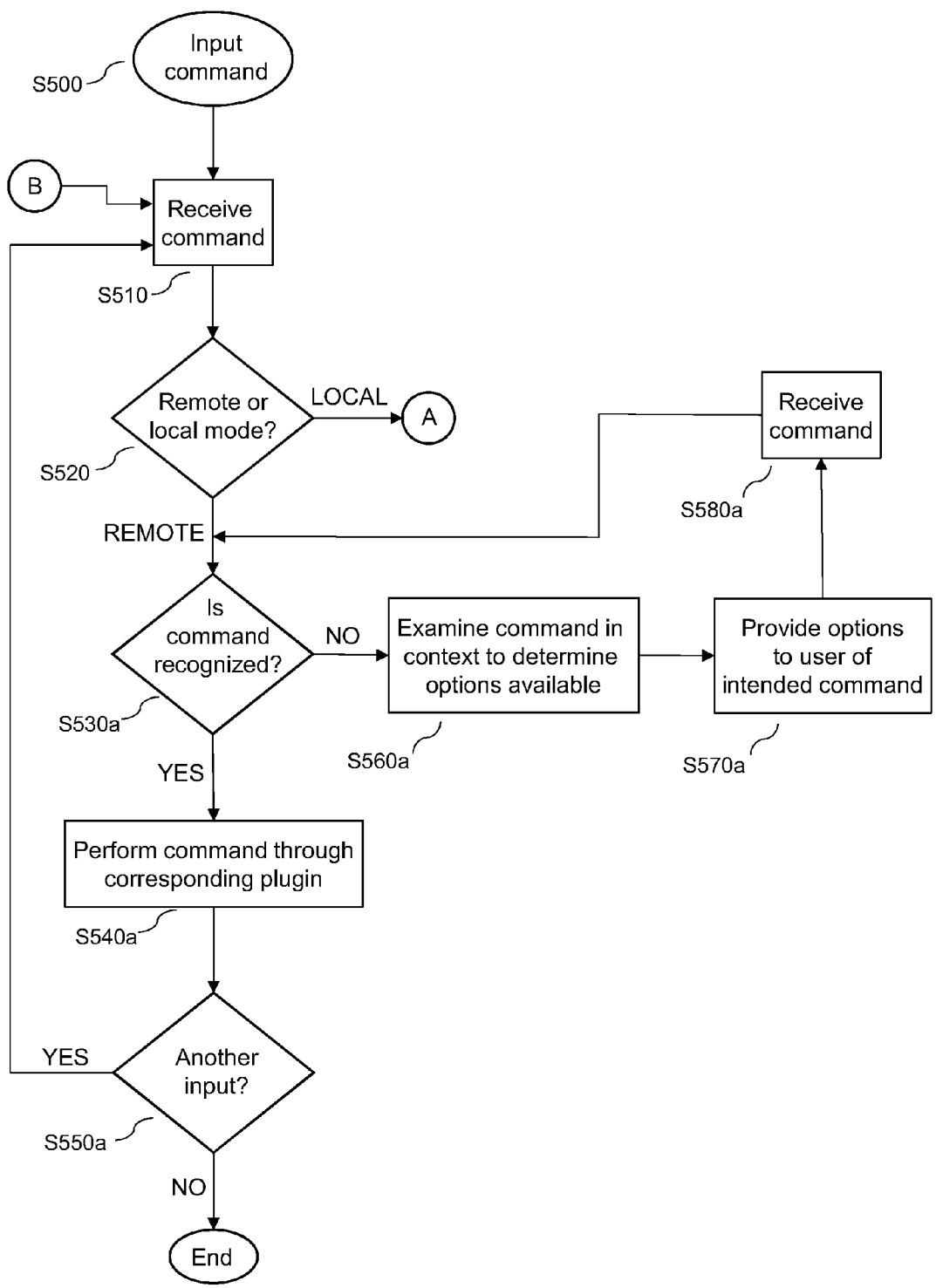
FIGS. 7A and 7B are flowcharts illustrating command processes of the virtual assistant system, according to exemplary embodiments of the present general inventive concept.

A more detailed overview of the control process of the virtual assistant system 10 is provided below with reference to FIGS. 7A and 7B.

It is to be noted that an infinite number of external services 300a-n may be accessed and controlled by the virtual assistant system 10, and any number of mobile devices 100a-n can be included within the virtual assistant system 10 to access and control the infinite number of external services 300a-n. Access to the services 300a-n may also be shared between mobile devices 100 (see dotted lines "sharing access" in FIG. 1A), as will be described in more detail infra.

As pointed out above, the semantic language (in the form of the semantic atoms 1000) created within the assistant server 200 acts as a universal language to allow communication and exchange of information between external services 300a-n through the assistant server 200 via respective plugins 220a-n for each service 300a-n, between the mobile device 100 and the assistant server 200, between the mobile device 100 and any of the infinite number of external services 300a-n, and between mobile devices 100a-n. An example of a list of command inputs can include, but is not limited to, the following: a voice command can be captured by a microphone connected to or integrated as part of a mobile device 100 (such as, for example, a smartphone or tablet) or other computing hardware. Gestures can be captured by, e.g., a camera, motion detector, proximity detector, infrared sensor, temperature sensor, global positioning device, or any other device that is capable of capturing information about a user's movements, which is in turn connected to a mobile or other computing device. Gestures may also be captured by wearable, held, or other devices that detect movement by using accelerometer hardware or other movement-tracking hardware, or even eye-tracking, lip-tracking or facial-tracking systems. Icons can be touched or clicked either by hand or via a stylus on a touch sensitive device (such as that of a mobile device or other touchscreen) or by means of a click by positioning a mouse or roller-ball on top of the icon. In addition, it is possible that the user may use voice alone, gestures alone or icons alone, or any combinations thereof to make the assistant perform these tasks. For example, a user may gesture upwards at a camera to which the assistant has access to indicate that a thermostat controlled by the assistant should raise the temperature. Alternatively, for example, this gesture can be detected by means of an armband or other wearable device.

In creating a command set for a plugin 220, an engineer/developer may select from command inputs that correspond to predefined command inputs as understood by the virtual assistant system 10. For example, if one closed first and two closed fists are part of the predefined semantic language stored in the virtual assistant system 10, an engineer/developer may select a gesture of closing a first to represent the locking of a door and closing two fists to represent engaging a deadbolt.

As another example, a user may hold a picture up to a camera (associated with the user's mobile device 100) and with a waving gesture instruct the assistant server 200 to identify a person in the picture via a face-recognition program (a service 300, for example, an "app") to which a plugin 220 has been created. This specific gesture of waving a picture together with using such a face-recognition program will have been previously provided within the semantic language of gestures stored in the storage 250. Then this gesture may be selected by an engineer while creating a plugin 220 for a face recognition type service 300.

Because the library of commands programmed at the assistant server 200 in the semantic language is constant across a limitless (thousands or even millions) number of plugins 220, similar commands may emerge for similar concepts. As an example, two separate plugins 220 could be respectively created for a door and a billboard, respectively, in a public square, and stored within the assistant server 200. If, for example, closing a first is associated with the concept of shutting down or closing up for the day, a user may then utilize a same gesture of closing a first to signify locking the door as well as shutting down the billboard, depending on whether the user wishes to control the door or the billboard.

Since plugins 220 are created for both the door and the billboard (as well as an infinite number of other devices, services, programs, applications, etc.), both the door and the billboard are able to understand the commands initiated by the user through the mobile device 100, as the assistant server 200 acts as a translator or an interpreter (via the semantic atoms 1000, based on the library of gestures, icons, and other command inputs stored in the assistant server 200) between the mobile device 100 and the door and the billboard. More specifically, the assistant server 200 acts as the translator between the infinite number of external services 300a-n, etc., and the mobile device 100 by using the semantic language in the form of semantic atoms 1000. As pointed out above, the semantic language (the common vocabulary between all devices, services, etc.) is specifically created within the assistant server 200 to allow communication between the assistant server platform 210 (see FIG. 1A) and each of the plugins 220*a-n* for all of the respective services 300*a-n* in which a plugin 220 is created at the assistant server 200, and between the assistant server platform 210 and the assistant interface 110.

As an example of the functionality of semantic atoms 1000, when the virtual assistant system 10 searches a social network (a service 300*a*) for people and receives a list of people in response to the search, the virtual assistant system 10 (specifically, the plugin 220*a* corresponding to the service 300*a*) may convert the received list of people into semantic atoms 1000 that represent those people. These semantic atoms 1000 can be shown to the user (via the assistant interface 110), and/or the atoms 1000 can be provided to one or more other services 300*b-n*. Alternatively, or in addition, the atoms 1000 can be transmitted to other users of the assistant server 200, or to other users using one or more separate assistant servers 200*a-n* in communication with the assistant server 200. An example of this latter situation is where there are multiple instances of the assistant server 200, as noted above and described in greater detail infra with reference to FIGS. 6B and 6C.

As another example, a user can be following an artist on Facebook™. The user may receive a semantic atom 1000 from Facebook™ representing the artist (translated from the Facebook™ proprietary language by the corresponding plugin 220). The user can then take the semantic atom 1000 representing the artist (in a single command, issued by, e.g., touch, voice, gesture or another command input) and then request from Spotify™, Rdio™ and Youtube™ which songs by that artist are available. What happens in this example is that, having retrieved the semantic atom 1000 representing the artist, the user performs a command input (icon touch, gesture, etc.) for a "search" command. This command input could be the same command input for all music/content services used by the virtual assistant system 10. The semantic atom 1000 representing the artist is then converted into suitable formats, i.e., the corresponding proprietary languages of the selected music/content services 300*a-n* (Spotify™, Rdio™ and Youtube™ in this example) by the corresponding plugins 220*a-n*, and is provided to the selected music/content services 300*a-n* along with the "search" command, which is also converted into the corresponding proprietary languages by the corresponding plugins 220*a-n*. Searches for the artist may then be made in each of the selected music/content services. In this example, the user is only required to find the artist in question on Facebook™ and perform a single command input to conduct multiple searches in multiple services 300*a-n*. After the search is executed, the results may be returned by all of the services 300*a-n* used to the assistant server 200 (via the plugins 220*a-n*) as one or more semantic atoms 1000 representing the one or more songs by that artist which were found. These semantic atoms 1000 can then be sent to other services 300*a-n*. For example, the atoms 1000 representing the songs may be sent to a music system (such as Sonos™) to be played. In other words, a service 300*a* (Facebook™, in this example) may communicate data to other services 300*b-n* (Spotify™, Rdio™ and Youtube™), which may in turn communicate with other services 300*b-n*, each service 300*a-n* communicating in their respective proprietary languages, managed by the assistant server 200 and the corresponding plugins 220.

In the above example of sending a semantic atom 1000 to multiple plugins 220, the atom 1000 may be copied and sent simultaneously to several plugins 220 (Spotify™, Rdio™ and Youtube™ in the above example). Alternatively, the atom 1000 may be sent to a single unified plugin, referred to herein as a "recipe plugin" or "super-plugin," which is configured specifically to interact with several other related plugins 220. In the above example the atom 1000 received from Facebook™ could be sent to such a super-plugin configured to communicate with music lookup services (Spotify™, Rdio™ and Youtube™ in the above example). The super-plugin would then handle copying the atom 1000 and sending the copies of the atom 1000 to the various plugins 220 corresponding to the desired services. The super-plugin would also receive atoms 1000 back from these various plugins 220, and may manage these atoms 1000 according to the user's commands and rules stored within the super-plugin. For example, the super-plugin may present the atoms 1000 to the user, aggregate the atoms 1000 into a single atom 1000, or enrich the original atom 1000 (representing the information received from Facebook™) by adding the atoms 1000 received from the other plugins 220 to it. Using a super-plugin in this manner may make controlling many services 300 simpler for a user: the user only perceives interacting with one application (the super-plugin), while in fact the user's commands are being used to control any number of related services 300 through the super-plugin.

Sending atoms 1000 to services 300*a-n* (via the corresponding plugins 220*a-n*) can also be described herein as "flinging" or "tossing" atoms 1000. Sending atoms 1000 to services 300*a-n* may involve a command input gesture of "flinging" or "tossing," in which the user gestures towards an intended service 300*a* (e.g., a music player), to command the virtual assistant system 10 to send one or more atoms 1000 to the corresponding plugin 220*a* to generate one or more proprietary language commands to send to that service 300*a*. The command inputs may accordingly be performed more intuitively than conventional methods of manipulating buttons. For example, a user may simply gesture towards a music player with regards to a selected atom 1000 (corresponding to, e.g., one or more songs), and the virtual assistant system 10 may understand the command input as meaning "play the song(s) represented in this semantic atom 1000 on the music player the gesture is directed towards." These intuitive command inputs may be pre-programmed by plugin developers, or may be developed by the virtual assistant system 10 itself via adaptive learning, described in detail infra.

Semantic atoms 1000 may also be put into a collection. For example, a group of friends can collaborate to decide which movie to see and which restaurant to eat at as a group in a given evening. The friends, corresponding to a group of users of the virtual assistant system 10, can then pass a collection of movies and restaurants between themselves. This collection may be represented by one or more semantic atoms 1000 which are passed between the users. The collection may itself be a single semantic atom 1000 which includes other semantic atoms 1000 representing individual items (e.g., restaurants and movies). Each individual user may have the authority to remove items from the collection and to add items to the collection. As part of building and modifying this collection, each user can use whatever underlying services 300*a-n* they prefer. For example, one user might use IMDB™ to select movies and another user might use Rotten Tomatoes™ for the same purpose. In this example, the users eventually agree upon a set of movies. At this point a movie can simply be picked from the agreed-upon list and tickets for that movie may be purchased rapidly through a movie ticket service, for example Fandango™. In this example, upon receiving a "purchase" command input from a user, the assistant server 200 may separate a single atom 1000 (corresponding to the selected movie) from an atom 1000 representing the list of agreed-upon movies, and send the atom 1000 of the selected movie to a selected movie ticket service with a command to buy one or more tickets corresponding to that movie. The plugin 220 for the movie ticket service knows how to read and use the semantic atom 1000 corresponding to the selected movie. More specifically, the plugin 220 for the movie ticket service includes instructions instructing the assistant server 200 how to convert the atom 1000 representing the selected movie into the proprietary language of the ticket service, and to purchase the corresponding tickets according to the "purchase" command.

Similarly, atoms 1000 may be copied. For example, a single semantic atom 1000 representing a command may be copied so that semantic atoms 1000*a-n* representing the command may be simultaneously presented to a plurality of plugins 220*a-n*, to carry out the command at a plurality of services 300*a-n*. Copying atoms 1000 in this manner may be performed by the assistant server 200, or by, e.g., a super-plugin communicating with several other plugins 220, as described above. In the example above of deciding on movies, a single user may buy a ticket to the agreed-upon movie for themselves, and may send copies of one or more atoms 1000 involved in the transaction to other users to similarly purchase tickets. The atom(s) 1000 copied in this manner may represent, for example, the movie, the act of purchasing a ticket (for example, specifying a particular ticket service). The act of copying a transaction in this way may be referred to as a "mimicking transaction," and allows multiple users to perform the same action, e.g., purchasing a ticket to a particular movie. A mimicking transaction allows different users to use different payment credentials. Alternatively, the payment credentials used for one transaction may also be mimicked (represented as semantic atoms 1000, copies of which are sent to other users). Payment credentials may mimicked if, for example, the first user agrees to pay for the others users' tickets.

Users can share atoms 1000 with each other in a messaging or "chat" format, where the users are in constant conversation with each other. The users can obtain atoms 1000 generated by various services 300*a-n* and share the obtained atoms 1000 with other users via messaging. One user may send, or "message," one or more atoms 1000 to one or more other users, who may then select these one or more atoms 1000 and use the one or more atoms 1000 with one or more services 300*a-n*. For example, a first user can send a second user an atom 1000 corresponding to a movie. The second user can use the received atom 1000 to find theaters which are nearby and playing the movie, for example by sending the received atom 1000 to a search service. The second user may receive the results of this search, represented as one or more additional atoms 1000 including, e.g., movie times and locations. Then the second user can share these one or more received atoms 1000 with the first user as part of the chat session. Alternatively the second user may message the one or more received atoms 1000 to one or more other users, either as a new chat that does not include the first user, or as part of the original chat which includes the first user. Groups can also be defined, which include a set of users.

Any user in a defined group can message or "toss" atoms 1000 into a common chat between the users in the group. Any atom 1000 can be taken from one chat between two or more users and "tossed" into a chat between different users by a user who is common to both chats. This situation is illustrated in FIG. 2A. FIG. 2A illustrates 5 users, with corresponding mobile devices 100*a-e*. It will be understood that any number of users and mobile devices 100*a-n* may be included without departing from the present general inventive concept. In FIG. 2A, there are two chats: one between the users of mobile devices 100*a*, 100*b*, and 100*c*, and another between the users of mobile devices 100*a*, 100*d*, and 100*e*. Since the user of mobile device 100*a* is a party to both chats, that user may "toss" semantic atoms 1000 from, e.g., the chat between mobile devices 100*a*, 100*d*, and 100*e* into the chat between mobile devices 100*a*, 100*b*, and 100*c*.

Figure 2B:
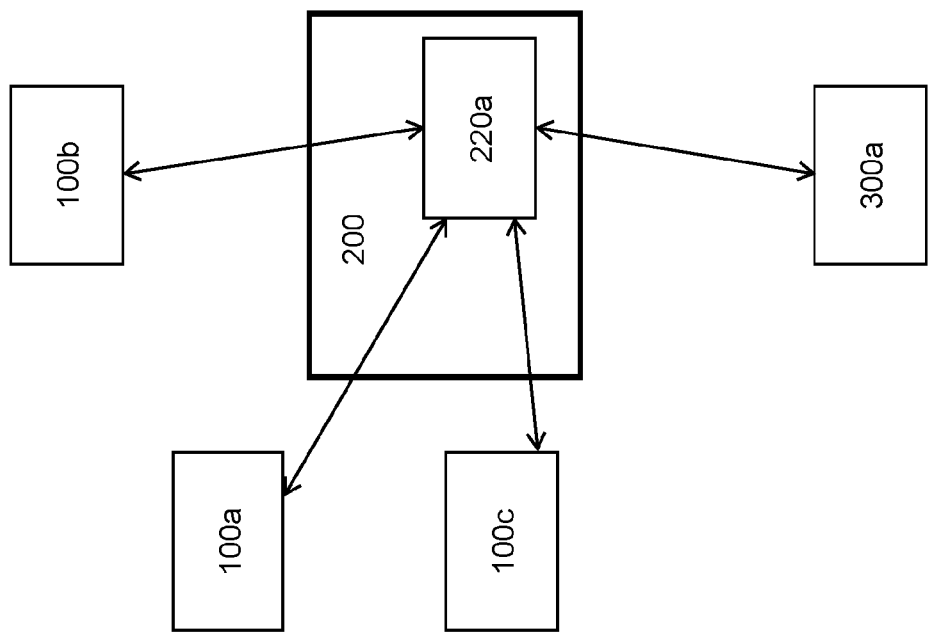
FIG. 2B is a block diagram illustrating messaging between mobile devices and one or more external services according to an exemplary embodiment of the present general inventive concept.
Figure 2A:
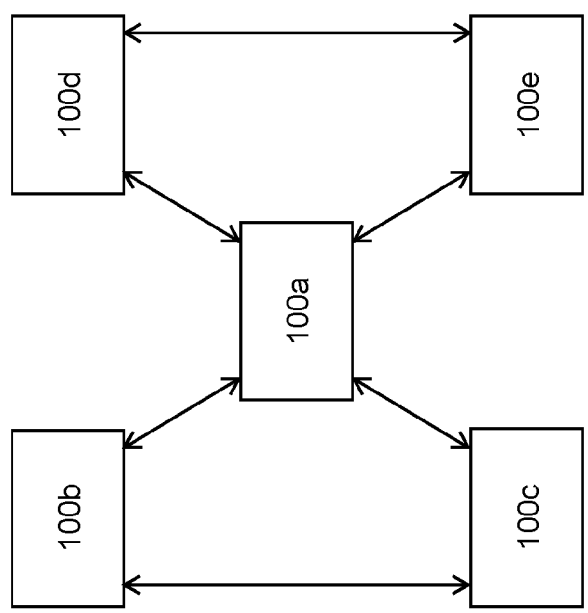
FIG. 2A is a block diagram illustrating messaging between mobile devices according to an exemplary embodiment of the present general inventive concept.

As illustrated in FIG. 2B, services 300*a-n* can also "participate" in chats through the respective plugins 220*a-n*, receiving and presenting atoms 1000 to the chat in a manner similar to a user. As illustrated in FIG. 2B, a dropcam plugin 220*a*, corresponding to dropcam 300*a*, is participating in a chat with several users (corresponding to mobile devices 100*a-c*). It will be understood that any number of plugins 220*a-n*, corresponding services 300*a-n*, and mobile devices 100*a-n* may be included in the chat in this manner without departing from the present general inventive concept. Furthermore, although the plugin 220*a* is illustrated as stored in the assistant server 200 in FIG. 2B, the plugin 220*a* may be stored elsewhere, for example, on another mobile device 100 which participates in the chat. The dropcam plugin 220*a* in FIG. 2B may present, e.g., a picture atom 1000 in that chat, representing a picture taken by its associated dropcam 300*a*. All users in the chat would receive the atom 1000 from the dropcam 300*a*, and any user in the chat can then take that atom 1000 and send it to other users, including users in another chat not including the plugin 220*a*.

As another example, commercial services can monitor deals available in stores in a geographic area and toss atoms 1000 representing those deals to a user or into a chat of several users, potentially based on the geographic location of those users. If the atoms 1000 are human-readable, e.g., they may include a title indicating they are a deal from a retailer, users can understand the meaning of the received atoms 1000 without needing to send the atoms 1000 to one or more services 300*a-n* first. Users in the chat can also discuss the received deals within the same chat, and message the atoms 1000 representing the deals to each other or to other users in different chats.

When services 300 "participate" in chats, those services 300 may also receive one or more atoms 1000 from users. In the above example of users agreeing upon a list of movies and buying tickets for one agreed-upon movie, the movie ticket service could be participating in the chat between the users, in which case any user in the chat could send the atom 1000 representing the selected movie to the ticket service 300 in the context of the chat. This action of sending the movie atom 1000 to the ticket service 300 would be interpreted by the assistant server 200 as a command to buy tickets for the movie represented by the atom 1000, and a corresponding command would be sent to the ticket service 300 through the ticket service's plugin 220. In the example of the dropcam 300*a* illustrated in FIG. 2B, users in the chat may send commands to the dropcam plugin 220*a* through the chat, and these commands may be converted to the dropcam's proprietary language and carried out at the dropcam 300*a*.

One or more users in a chat session may also invite a plugin 220 to participate in a chat session, invisibly from the other users in the chat session, based on the users' authority of access to those plugins 220a-n. Basically, the users may bring one or more plugins 220a-n into the chat session and make use of these plugins 220a-n, without extending authority to other participants of the chat session or even allowing other participants in chat session to be aware of the plugins' participation. Plugins 220a-n in this case may include the users' individual assistant interfaces 110 for the virtual assistant system 10. Users may also share their plugins 220a-n with the other participants in the chat session as needed. This sharing of plugins 220a-n with other users through a chat session may be selective, i.e., plugins 220a-n may be shared with all the users in a messaging session or only a subset of the users in a messaging session, as desired by the user owning the plugins 220a-n.

Users can also collaborate to assemble data through messaging. As an example, one user can obtain one or more semantic atoms 1000 representing an order for a pizza and message the atom(s) 1000 to another user, who then adds toppings to the pizza, in effect adding additional information to the atom(s) 1000 representing the pizza. The atom(s) 1000 may be messaged between multiple users in this way, each user modifying the atom(s) 1000 (e.g. by adding or removing toppings) until the users are ready to order. At that point, one of the users may send the atom(s) 1000 representing the pizza order to a service 300, for example Pizza Hut™, to carry out the corresponding operation, in this case ordering the pizza. As part of being messaged to Pizza Hut™, the semantic atom(s) 1000 representing the pizza are sent to the assistant server 200, which in turn sends the data to the Pizza Hut™ plugin 220 to generate a corresponding command in the Pizza Hut™ proprietary language, which is thereafter sent to Pizza Hut™ to order the pizza. Notably, these operations can occur automatically without direct user interaction. In the users' perception, they messaged between each other regarding what kind of pizza to buy, and then messaged their agreed-upon pizza order to Pizza Hut™.

Similarly, a retailer might message a user an offer, for example an offer to buy a product at a discount. That offer would be represented as one or more semantic atoms 1000 sent into a chat by a service 300 (the retailer in this example). A user may be able to message the atom(s) 1000 representing the offer to another user, and this other user may redeem the offer by sending the atom(s) to the retailer's plugin 220 with a command to redeem. This redemption may be performed according to a relevant context. Whether the offer has been received from another user may be a context which affects the offer, such that the offer changes as it is messaged from one user to another. For example, if the initial offer from the retailer to the first user was to buy a soft drink at 20% off, the same offer, after being messaged to another user, may allow the other user to buy a soft drink at 50% off. Alternatively, the offer, after being messaged to the other user, may allow the other user to buy coffee at 50% off from a coffee outlet owned by the same retailer. In other words, the number of times data has been messaged may also be included in the semantic atom(s) to be used as a context by the corresponding plugin 220 to interpret as a command. The transmission of atom(s) 1000 (corresponding to the offer) may also be trackable. A user that shares an offer with many of their friends and then redeems the offer might be rewarded with another offer, for example for a free product, based on their friends' sharing and use behavior.

Tracking of the number of times atoms 1000 representing an offer have been messaged between users can also be used to gamify commerce quite extensively. For instance, a user that is successful in referring many friends to a new service might gain an elite status with that service based on the sharing and use behavior of that user's friends. In all of these cases, the same data (the offer) is being translated differently in different contexts, and potentially between different plugins 220a-n.

This advertising could be more open as well. For example, a retailer might announce that 50 units of an item are available for free. Then one or more users can request and receive one or more atoms 1000 corresponding to the offer from the retailer's plugin 220 (which might be accessible via chat also) if the offer is still available (in this example, if any of the 50 units of the item are still available). The one or more users may be able to then transfer these one or more atoms 1000 (corresponding to the offer along with the authority to redeem the offer as described above) to other users. Receiving and redeeming the offers might require the receiving users to also install or communicate with a plugin 220 that belongs to the issuing retailer or, alternatively, such installation and/or communication might not be required. Messaging according to the present general inventive concept as described herein then becomes a way by which a retailer can reach many potential customers and generate "buzz" by targeting highly influential individuals with transferrable offers.

Two advantages of semantic atoms 1000, among many, is that they eliminate the need to input data over and over again they and enable rapid reuse of data across very different systems by creating a common language. Semantic atoms 1000 may represent objects and concepts a human may understand, such that the atoms 1000 on their own may be meaningful to a human. As such, semantic atoms 1000 may be almost entirely human comprehensible when examined. For example, a semantic atom 1000 corresponding to a movie may contain information about the movie's title, synopsis, actors, director, language, ratings, genre, running time, release date and available formats thereof. This information can be rendered directly to a user. That is, the information about the item (the movie in this case) may be in a format the user can understand, such as, for example, text. In the same way, semantic collections (corresponding to collections of semantic atoms 1000) may also be human viewable. Despite the foregoing, however, there may be other information in a semantic atom 1000 that is not human-comprehensible, even though the semantic atom 1000 may still carry meaning. For example, a semantic atom 1000 corresponding to a person may contain eigenvalues that mathematically represent that person's face in order to make that person recognizable to a camera. In this example, a human looking at those eigenvalues would not be able to visualize the person directly, although the eigenvalues still contain meaningful information, in this example the information that allows a camera to visualize that person. Furthermore, not all the information containable in a semantic atom 1000 is necessarily contained in it. Sometimes only a subset of the available data is included in the atom 1000. For example, a movie semantic atom 1000 might only contain the name but not the synopsis of the movie.

Figure 3B:
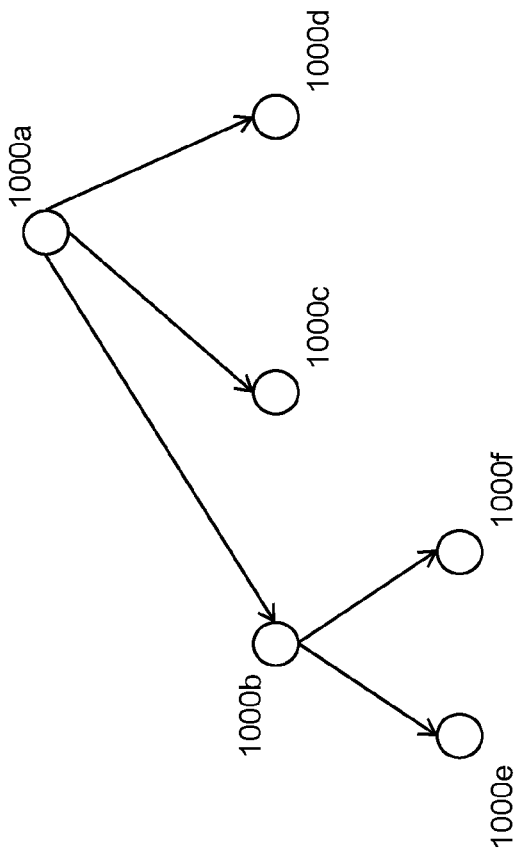
FIG. 3B is a block diagram illustrating nesting semantic atoms according to an exemplary embodiment of the present general inventive concept.
Figure 3A:
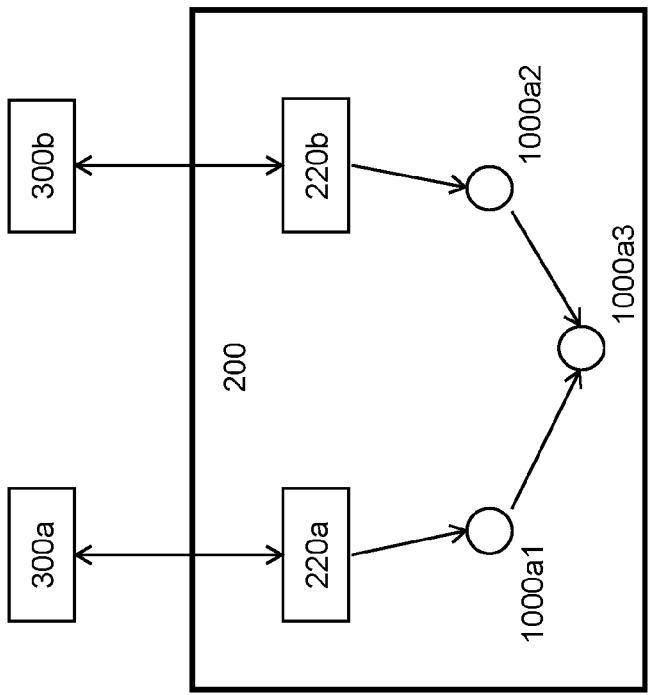
FIG. 3A is a block diagram illustrating merging semantic atoms according to an exemplary embodiment of the present general inventive concept.

Semantic atoms 1000 can also be combined or merged. An exemplary embodiment of this use of atoms 1000 is illustrated in FIG. 3A. As illustrated therein, when a service 300a, such as, for example, Facebook™, is accessed, the service 300a may generate (through its corresponding plugin 220a) a semantic atom 1000a1 corresponding to, e.g., a person, the semantic atom 1000a1 including information about that person (e.g., name, picture, birthday, etc.). When a different service 300b, for example, an e-mail service, is accessed, this new service 300b may generate (through its corresponding plugin 220b) a semantic atom 1000a2 corresponding to the same person, but with different information (e.g., e-mail address, telephone number, etc.). The virtual assistant system 10 (for example, the assistant server 200) may merge these two atoms 1000*a*1 and 1000*a*2, corresponding to the same person but including different information about that person, into a single atom 1000*a*3 representing that person. This combination of atoms 1000 may be performed based on rules maintained in the assistant server 200 (e.g., on one or more plugins 220 stored at the assistant server 200). Any number of semantic atoms 1000*a-n* may be combined in this manner. Additionally, although FIG. 3A only illustrates two external services 300*a* and 300*b* for convenience, it will be understood that any number of external services 300*a-n*, and corresponding plugins 220*a-n*, may be used in this manner to combine semantic atoms 1000. Furthermore, although FIG. 3A illustrates the plugins 220*a-n* as stored in the assistant server 200, and that the assistant server 200 combines the atoms 1000*a-n* (atoms 1000*a*1 and 1000*a*2 as illustrated in FIG. 3A), the plugins 220*a-n* may alternatively be stored at the mobile device 100, which may also combine the atoms 1000*a-n*. Furthermore, if there are multiple instances of the assistant server 200, different independent instances 200*a-n* may collaboratively merge semantic atoms 1000*a-n* to create a semantic atom 1000 that is richer with information or better suited to a particular task.

Semantic atoms 1000 may also be nested according to rules maintained in the plugins 220. In the exemplary embodiment of the present general inventive concept as illustrated in FIG. 3B, semantic atom 1000*a* represents, for example, a music playlist. Each one of the songs in this playlist could itself be an atom 1000*b-n* that is contained in the semantic atom 1000*a* representing the playlist. In FIG. 3B, three nested atoms 1000*b*, 1000*c*, and 1000*d* are illustrated for convenience, but it will be understood that any number of atoms 1000*b-n* may be nested in this manner without departing from the present general inventive concept. Furthermore, each nested atom 1000 may further include other nested atoms 1000. As illustrated in FIG. 3B, for example, atoms 1000*e* and 1000*f* may be nested within atom 1000*b*. If atom 1000*b* corresponds to a song, for example, atoms 1000*e* and 1000*f* may correspond to, e.g., lyrics and price of that song.

"Larger" atoms 1000, generated by combining or nesting atoms 1000*a-n*, can be exchanged between people and services 300 also, thus greatly simplifying chats in which one user may wish to message several items at once to another user. For example, user A can send user B the playlist atom 1000*a* illustrated in FIG. 3B. User B may pick one of the song atoms nested inside playlist atom 1000*a* (for example, song atom 1000*b*) and send the selected song atom to user C, who could then in turn add the song atom to a different playlist atom.

Semantic atoms 1000 may also represent actions. For example, a user may send another user a location request. This location request may contain a variety of information, including time needed, rationale for need and action to be taken upon receipt. Another atom 1000 could represent the act of leaving home. This "leaving home" atom 1000 may be sent to another user for example, enabling the other user to use the atom 1000 to take a set of consequent actions. For example, if a renting guest departs from a rental property and sends a "departing event" semantic atom 1000 to the owner, the owner can then send this "departing event" atom 1000 to the lights, heating, security, WiFi and other services 300*a-n* to automatically take actions in the rental property associated with such an event. In this example, sending the "departing event" atom 1000 to the various services 300*a-n* may cause the lights to turn off, turn the heating to a lower temperature setting, and so on.

Semantic atoms 1000 can also be saved for various purposes. For example, various WiFi atoms 1000 that contain the passwords to access various WiFi access points might be persisted by a user for future use. As described above, atoms 1000 may be stored in the mobile device 100 or the assistant server 200, as well as, e.g., a removable storage medium or other storage medium.

Semantic atoms 1000 can also be discarded after viewing. For example, a user might run a search on LinkedIn™ and see a number of people as a consequence which are represented by semantic atoms 1000 in the virtual assistant system 10, but not do anything further with these atoms 1000. In this case, the unused atoms 1000 are simply discarded by the assistant server 200, plugin(s) 220, and service(s) 300.

FIG. 4A is a block diagram illustrating an exemplary embodiment of a mobile device 100 in detail for purposes of describing how the mobile device 100 is configured to be a part of the virtual assistant system 10 illustrated in FIGS. 1A and 1B.

The mobile device 100 may include the assistant interface 110, a communicator 105, a controller 120, a central processing unit (CPU) 130, a storage unit 140, a user interface 150, a sensor 160, at least one speaker 170, at least one microphone 180, and at least one camera 190.

Referring to FIG. 4A, the communicator 105 can be used to establish a connection with the assistant server 200 and/or an external service 300. The communicator 105 may include an antenna or any type of communication device to establish the connection with the assistant server 200 and the external service 300 using Wi-Fi, Wi-Fi direct, NFC, Bluetooth, RFID, Ethernet, FireWire, universal serial bus (USB), high definition multimedia interface (HDMI), or any other type of wireless or wired communication method, but is not limited thereto. The communications between the mobile device 100, the assistant server 200, and any external service(s) 300 may be performed via the Internet, including cloud computing applications, satellite, etc.

The controller 120 may control communications between the mobile device 100 and the assistant server 200, as well as control communication between the mobile device 100 and the external services 300*a-n* under certain conditions being met, such as a location based communication service (e.g., near field communication (NFC), Bluetooth, etc.) being established, as described above with respect to FIG. 1B.

The controller 120 determines which service 300 the assistant interface 110 is communicating with in order to interpret a received request whether the request is received in a proprietary language format or as semantic atoms 1000. Although the service which the assistant interface 110 is communicating with is often the assistant server 200, the libraries of possible inputs (icons, gestures, voice commands, with interpretations) could be obtained from a different server or from another assistant interface 110*a-n* on a separate mobile device 100*a-n*. For example, multiple assistant interfaces 110*a-n* could work collaboratively: i.e., once one assistant interface 110*a* has learned how to interpret an input, this assistant interface 110*a* could share the input(s) with another assistant interface. Accordingly, the controller 120 may determine what device the assistant interface 110 is communicating with in order to provide these features.

The controller 120 can thus make a determination that the assistant interface 110 should reach out to an external source other than the assistant server 200 under certain circumstances. For example, if the assistant interface 110 is determined by the controller 120 to be receiving an input request that requires information from another assistant server 200a-n or another assistant interface 110a-n, the controller 120 may dictate to the assistant interface 110 to reach out to that external other source. The assistant interface 110 would accordingly connect to the external other source by way of the communicator 105 and present the request. The external other source will check the full set of libraries to interpret this request (gesture, icon touch, voice data, etc.), and if found, the external other source will respond to the assistant interface 110 and tell it what to do with semantic atoms 1000 (with proprietary language embedded therein). At this point if the mobile device 100 is operating through the assistant server 200 as illustrated in FIG. 1A, the assistant interface 110 will provide the command to the assistant server 200 to perform the command on the intended external service 300. Alternatively, if the mobile device 100 is operating in a local control mode as illustrated in FIG. 1B, the assistant interface 110 can then connect with the service 300 through the communicator 105 and directly control the intended external service 300 using the properly obtained proprietary language.

The CPU 130 may request the virtual assistant system 10 to run applications and/or programs, perform various functions of the mobile device 100, and adaptively learn various commands based on the user's preferences, among various other uses. The CPU 130 may also run various operating systems that may be changed, altered, or personalized, based on the user's preferences. Further, when there are a plurality of external services 300a-n in which the user desires to control, the CPU 130 may perform various functions specifically corresponding to the plurality of external services 300a-n, based on respective user commands.

The storage unit 140 may store the commands learned by the CPU 130, as well as the various languages, icons, gestures, sensor-commands, programs, applications, commands, and libraries including any combinations of the above items, that are downloadable by the mobile device 100 from the assistant server 200. For example, if the mobile device 100 does not possess a specific command among the library of commands within the assistant server 200 to control a particular service 300, the mobile device 100 can download any single command or set of commands from the assistant server 200, at which point the mobile device 100 can directly control the service 300, or at least have a more extensive library of commands to understand one or more commands being input to the mobile device 100. In other words, if a user of the mobile device 100 makes, e.g., a gesture or provides a voice command which is not a readily known command to the mobile device 100, the assistant server 200 can recognize the correct command by checking within the extensive library of commands, while considering various contexts of the command and the user information collected via the history of information previously gathered, as described infra. Then, with the help of a corresponding plugin 220, the assistant server 200 can generate the command as one or more semantic atoms 1000 with the proprietary language embedded therein. The atom(s) 1000 representing the command can then be provided to the mobile device 100, at which point the mobile device 100 can download the correct command into the storage unit 140, translate the command to the proprietary language of the service 300 via the assistant interface 110, and then perform an intended function at the service 300a through the communicator 105 by using the proprietary language of that service 300.

The user interface 150 allows a user to perform various functions on the mobile device 100, including displaying selectable icons, making telephone calls, accessing the Internet to view various web pages, playing multimedia such as music and movies, viewing pictures, running programs, controlling one or more external services 300a-n, accessing the assistant server 200, modifying the mobile device 100, etc., but is not limited thereto. The user interface 150 may include a screen, a keyboard, a keypad, a mouse, a trackball, a touch screen, an audio interface (for example with the at least one microphone 180), a hologram interface, a sensing interface, etc., but is not limited thereto. Moreover, the user interface 150 may include any combinations of the various types of aforementioned user interfaces.

The sensor 160 may be configured to sense one or more inputs, for example a sound, gesture, or touch of the user. The sensor 160 may work in conjunction with facial recognition software running on the CPU 130 to allow the mobile device 100 to recognize facial expressions of the user, or a ring type device, such as, for example, Fin™, which is a Bluetooth enabled device that can provide commands from gestures made by a user. In this example, the commands can be received by the CPU 130 and translated into one or more sematic atoms 1000 by the assistant interface 110. Additionally, the sensor 160 may include other types of sensing devices that sense movement of the mobile device 100 itself, such as, for example, a gyration, pressure, or proximity of the mobile device 100 to a service 300 to be controlled. Moreover, the sensor 160 may include global positioning system (GPS) technology to sense a location of the mobile device 100. The sensor 160 may include a single sensor having multiple functions, or may be divided into a plurality of different sensors based on the user's preference. The sensor 160 is described in greater detail below with reference to FIG. 5A.

The mobile device 100 may further include the at least one speaker 170 to allow the user to hear audio emitted from the mobile device 100, the at least one microphone 180 to allow the user to speak into the mobile device 100, and the at least one camera 190 to allow the user to capture images. The at least one speaker 170 and the at least one microphone 180 may be used to perform telephone operations, and may also be used to receive audio commands (for example voice commands) from the user that may be processed by the CPU 130. The at least one camera 190 may be used to photograph still or moving objects, to perform webcam communications with other users using applications such as Skype or GChat, or to receive/read gestures and/or facial features from the user that may be processed by the CPU 130.

The assistant interface 110, as described above with respect to FIGS. 1A-1B, can perform the operations of a plugin by translating input commands into one or more semantic atoms 1000 and can communicate with the assistant server 200 using the semantic atoms 1000. Furthermore, the assistant interface 110 can translate any of the commands received at the mobile device 100 by any form of the sensor 160 thereof or received by the mobile device 100 by way of an external sensor, such as, for example only, the wearable ring as described above. The assistant interface 110 also translates data received from the assistant server 200 into a format which may be understood by the mobile device 100 (effectively, the proprietary language of the mobile device 100), and which may be displayed for example on the user interface 150.

As pointed out above, FIG. 4B illustrates an exemplary embodiment where the mobile device 100 of FIG. 4A may include the assistant server 200 therein as well as the other devices illustrated in FIG. 4A. In this case, the assistant interface 110 is not required to communicate with any backend-type server system in order to understand the actions required to take in order to perform any functions at any services 300a-n when operating in a local mode. Thus, in this exemplary embodiment illustrated in FIG. 4B, the virtual assistant system 10 may be entirely self-contained in a mobile type device 100, as described above. In the embodiments described above with reference to FIGS. 1A-1B and 2A, the interaction between the assistant server 200 and the assistant interface 110 would normally occur over the web. However, in this exemplary embodiment illustrated in FIG. 4B, the interaction between the assistant server 200 and the assistant interface 110 occurs within the mobile device 100 itself. Furthermore, the storage 250 associated with the assistant server 200 is also provided on the same hardware as the mobile device 100, and is used by the assistant server 200 similar to the way the assistant server 200 uses the storage 250 as described in FIGS. 1A-1B. Thus the storage 250 in FIG. 4B is functionally equivalent to the storage 250 described in FIGS. 1A-1B. Although many of the components of the mobile device 100 of FIG. 4A are not illustrated in the mobile device 100 of FIG. 4B, such as the communicator 105, the CPU 130, the controller 120, the U.I. 150, the sensor 160, the storage unit 140, etc., in order to highlight the differences between the mobile device of FIG. 4A and FIG. 4B, these components are also included in the mobile device of FIG. 4B.

A virtual assistant system 10 according to this exemplary embodiment of FIG. 4B is valuable in cases where communication is poor, such as remote applications, military applications, etc. Since the mobile device 100 and the assistant server 200 of this exemplary embodiment do not rely on wireless communications between each other to perform functions at services 300a-n, the probability of failure in controlling an intended service 300 as a result of poor wireless communication between the mobile device 100 and assistant server 200 can be eliminated. Furthermore, users who do not want their data to be stored at some remote location may also use this type of setup of the virtual assistant system 10 for security purposes, or other similar reasons. Since no assistant information is being sent wirelessly, the virtual assistant system 10 (and by extension, the user's information) is more secure. This type of setup can also be very valuable in automobiles or aircraft which face varying connectivity situations, e.g., sometimes becoming disconnected from wireless service.

As an alternative to the exemplary embodiment illustrated in FIG. 1B, the "mobile device" 100 may instead be implemented on one or more stationary devices, such as an Amazon Echo™ style device that is connected to the assistant server 200 or a cloud (which is connected to or serves as the assistant server 200). As such, a user may not require a handheld device with the assistant interface 110 to connect to the assistant server 200. Instead, stationary devices may be positioned around various points in an area. These stationary devices can function as the "mobile device" 100 described above, and may receive command inputs (e.g., a user's voice, gestures, etc.), interact with the user, and perform functions according to the command inputs. As an example, if a user is in a building there may be one or more stationary devices, each of which may have their own assistant interface 110, positioned on every floor. This arrangement of stationary devices allows a user to command the virtual assistant system 10 to perform various tasks and control external services 300a-n, similarly to the exemplary embodiment described above with reference to FIGS. 1A-1B. According to an exemplary embodiment of the present general inventive concept, the stationary devices may also communicate with each other.

Figure 17:
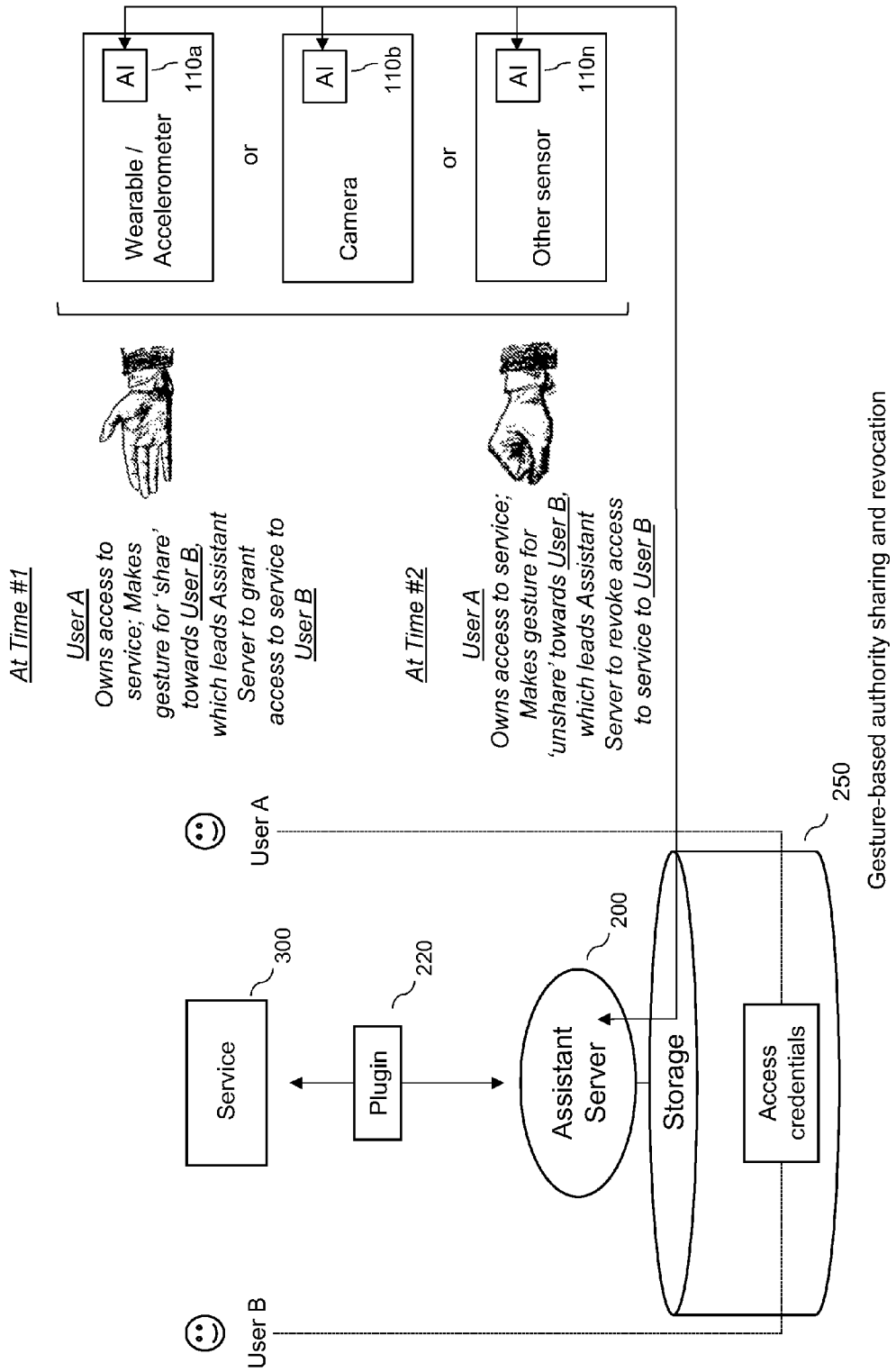
FIG. 17 is a diagram illustrating authority sharing and revocation of the virtual assistant system, according to an exemplary embodiment of the present general inventive concept.

Stationary devices function similarly to the mobile device 100. Accordingly, it will be understood that the term "mobile device," as used herein, may also include stationary devices. FIG. 17, discussed in detail infra, illustrates an exemplary embodiment of the present general inventive concept including multiple devices (e.g., sensors having separate assistant interfaces 110a-n), which may function as stationary devices as described above.

Figure 5A:
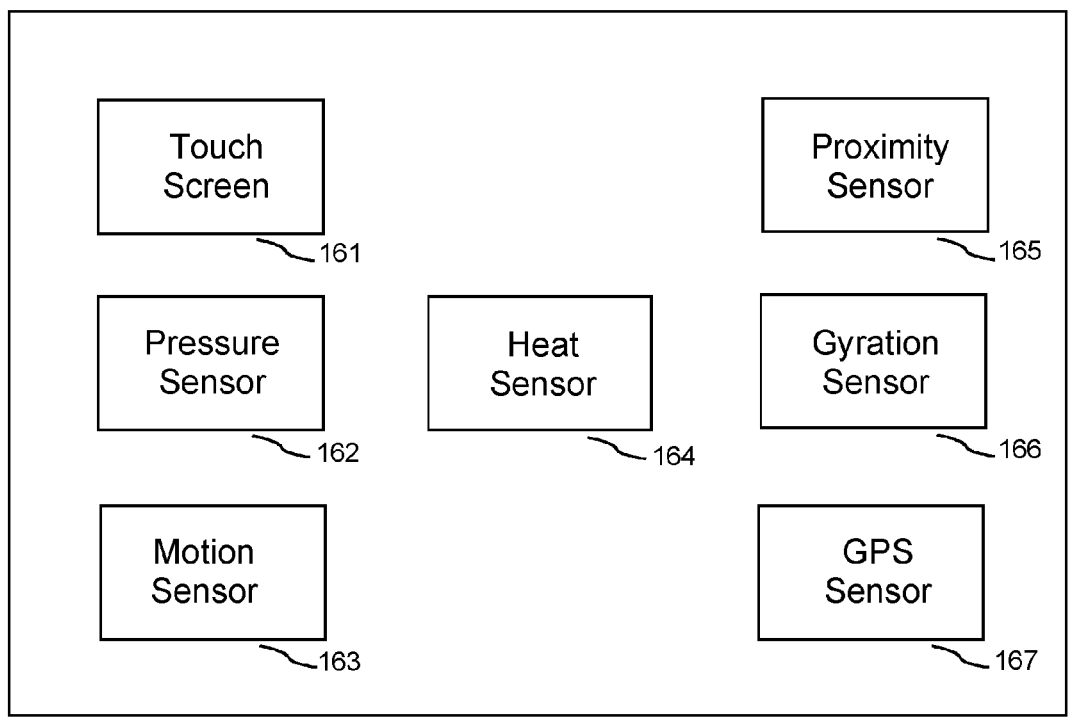
FIG. 5A is a block diagram illustrating an exemplary embodiment of the sensor part of the mobile electronic device of FIG. 4A.
Figure 5B:
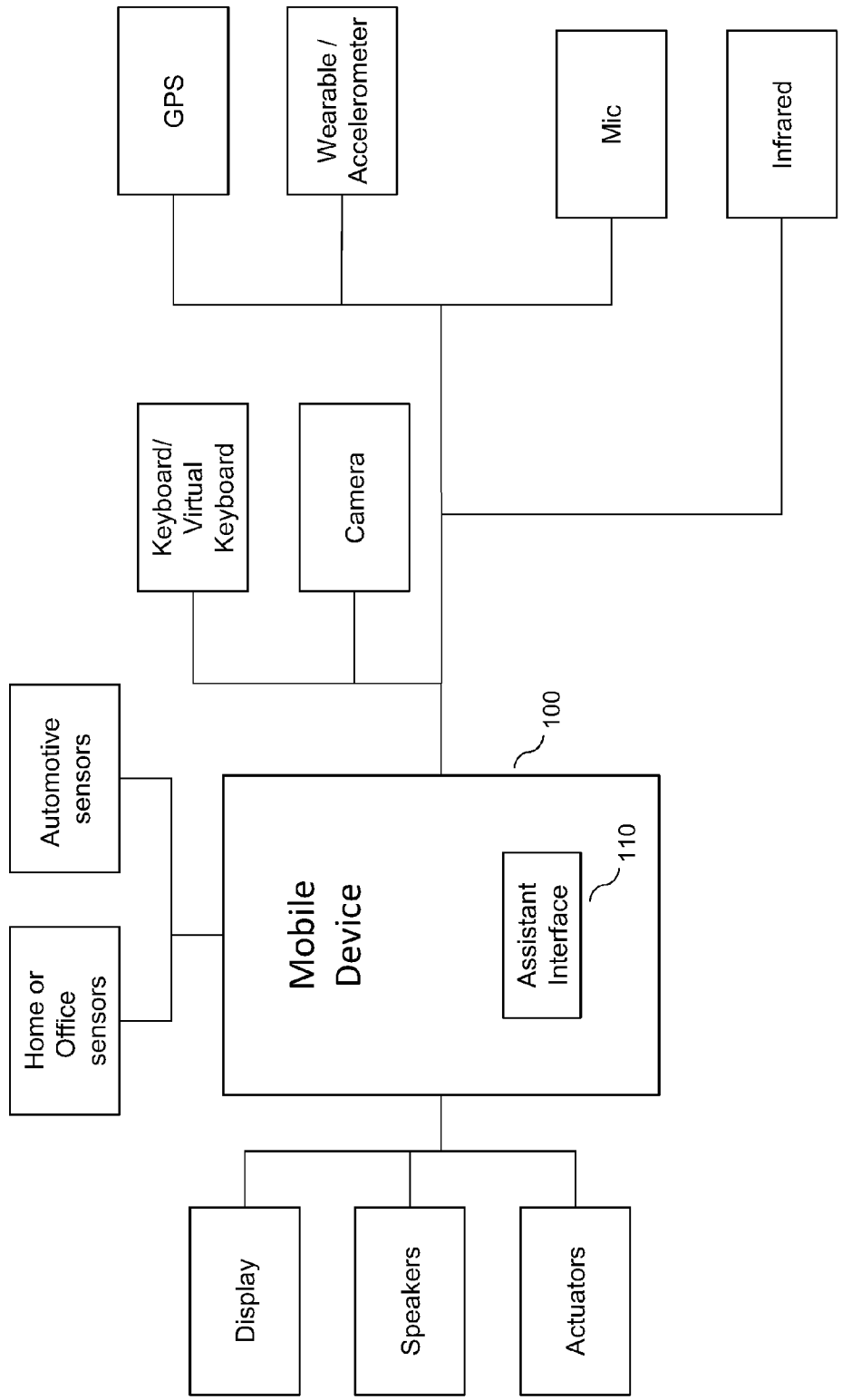
FIG. 5B is a block diagram illustrating an exemplary embodiment of external input sensors and devices usable with the mobile electronic device of FIGS. 4A and 4B.

FIG. 5A is a block diagram illustrating an exemplary embodiment of the sensor 160 of the mobile device 100 illustrated in FIG. 4A. The sensor 160 as illustrated in FIG. 5A can be provided in the form of a plurality of different sensors.

The sensor 160 may include various different sensors located at various locations on the mobile device 100, and may include a touch screen 161, a pressure sensor 162, a motion sensor 163, a heat sensor 164, a proximity sensor 165, a gyration sensor 166, and a global positioning service (GPS) sensor 167.

The touch screen 161 is a display that displays items, icons, and media thereon, while allowing the mobile device 100 to detect a location of the user's finger, stylus, etc., when in contact with the touch screen 161. As such, when the user moves their finger around the touch screen 161, various commands can be performed on the touch screen 161, such as scrolling through menu items, selecting icons, flipping pages, etc., but is not limited thereto.

The pressure sensor 162 allows the mobile device 100 to detect a pressure, for example a pressure at which the touch screen 161 is depressed. As such, different pressures sensed by the pressure sensor 162 can result in different commands executed by the mobile device 100. The pressure sensor 162 may be a component that is separate from the touch screen 161, or may be integrated therein.

The motion sensor 163 can detect a motion of the user or a motion of the mobile device 100 with respect to the user or one or more external services 300a-n. As such, the motion sensor 163 can actively track the movement of the user and/or the mobile device 100. The motion sensor 163 may be a component that is separate from the at least one camera 190, or may be integrated therein.

The heat sensor 164 can sense heat from an outside source, which can be processed and interpreted as data by the CPU 130.

The proximity sensor 165 can sense a proximity of the mobile device 100 with respect to other objects and/or users. The proximity sensor 165 may be a component that is separate from the at least one camera 190, or may be integrated therein.

The gyration sensor 166 can sense a motion and/or a direction of motion of the mobile device 100 itself in a three-dimensional space. More specifically, the gyration sensor 166 can sense how the mobile device 100 is moving, thereby allowing the mobile device 100 to be used as a wand-like apparatus to control the external service 300, for example. For instance, the gyration sensor 166 may sense that the user moves the mobile device 100 from a low position to a high position, and then may send a command through the assistant server 200 to control a television (corresponding to an external service 300) to increase its volume. Alternatively, the motion sensor 163, the proximity sensor 165, and the at least one camera 190 may also be utilized to sense that the mobile device 100 has moved from a low position to a high position and send a corresponding command to the assistant server 200.

The GPS sensor 167 can sense a location of the mobile device 100 using GPS technology, in order to substantiate an exact location of the mobile device 100. When the location of the mobile device 100 is substantiated, the assistant server 200 can determine which external services 300a-n can and/or should be controllable by the mobile device 100, and which types of commands can and/or should be utilized to perform the controls.

According to an exemplary embodiment, if a user is operating the mobile device 100 outside his/her house and wants to open a garage door (a service 300a) which is wirelessly connected to the assistant server 200, the user may give a "thumbs up" hand sign to the at least one camera 190, or using another form of sensor, at which point the assistant interface 110 translates and provides the command as a semantic atom 1000 to the assistant server 200 to communicate the command to the garage door plugin, causing the garage door to open. The "thumbs up" hand sign is interpreted to signify "garage door open" at this point because the GPS sensor 167 can sense that the mobile device 100 is outside the user's house. However, if the user is inside the house, the same "thumbs up" hand sign can be used to close the garage door at this point because the GPS sensor 167 can sense that the user is inside the house. Therefore, the same hand sign or other gesture can be used to perform different functions corresponding to a single external service 300, based on a location of the mobile device 100 sensed by the GPS sensor 167.

As another exemplary embodiment, a sprinkler system service 300a could be controlled differently based on a location of the mobile device 100. More specifically, if the GPS sensor 167 senses that the mobile device 100 is near the user's home and the user touches a sprinkler system icon displayed on the user interface (UI) 150 of the mobile device 100, the sprinkler system can be shut off to allow the user to walk on the lawn without getting wet. If the user is far from the home and the user touches the same sprinkler system icon displayed on the UI 150 of the mobile device 100, the sprinkler system may turn on, causing water to spray onto the lawn. Alternatively, the user could preset an automated sprinkler system function based on the GPS sensor 167 sensing a location of the user.

It will be understood that the sensor 160 may include any combination of the sensing devices illustrated in FIG. 5A, or additional sensing devices not illustrated, according to the particular exemplary embodiment of the present general inventive concept. For example, gestures can be detected by the at least one camera 190, as well as a photo-detection device, a wearable device such as an armband or Fin™, or using an accelerometer or other movement detection device in the mobile device 100. In the exemplary embodiment of the present general inventive concept illustrated in FIG. 5B, the mobile device 100 is connected to a plurality of external input sensors and devices. For example, the mobile device 100 may be connected to external sensors in a user's home, office, or car in order to receive data therefrom which it would not be able to receive with its own sensor 160. External sensing devices, such as a keyboard, camera, GPS, wearable sensor, microphone, and/or infrared sensor would connect the mobile device 100 to alternate sensing devices to accept a user input. In this way, the functionality of the user's mobile device 100 can be greatly expanded.

Furthermore, the mobile device 100 may receive input commands from external devices, such as one or more displays, speakers, and actuators. The inputs from these external devices can be processed by the CPU 130 to determine such a command being received from the respective external device.

As described above, gestures may also be captured by wearable, held, or other devices that detect movement by using accelerometer hardware or other movement tracking hardware, or even eye-tracking, lip-tracking or facial-tracking systems. Icons are usually touched or clicked either by hand or a stylus on a touch sensitive service (such as that of the user interface 150 of the mobile device 100 illustrated in FIG. 4A, or some other form of a touchscreen) or by means of a click by positioning a mouse or roller-ball on top of the icon. The user may use any command input or combination thereof, for example voice alone, gestures alone or icons alone, or any combinations thereof, to make the assistant server 200 perform these tasks at the service 300 (e.g., the above example of the combination of using a GPS together with a sensor to sense the "thumbs-up gesture"). As another example, a user may gesture upwards at a camera to which the assistant server 200 has access to indicate that a thermostat controlled by the assistant server 200 should raise the temperature. Or this gesture can be detected by means of an armband or other wearable device.

FIG. 6A is a block diagram illustrating an exemplary embodiment of an assistant server 200 in detail for purposes of describing how the assistant server 200 is configured to be a part of the virtual assistant system 10 illustrated in FIGS. 1A and 1B.

The assistant server 200 illustrated in FIG. 6A may include the assistant server platform 210 and the plugins 220a-n.

The assistant server platform 210 may be any device or combination thereof that allows a software developer to create the plugins 220 at the assistant server 200. The assistant server platform 210 may, for example, be a CPU, multiple CPUs, or other computing device used to process commands as well as communicate with services 300a-n via semantic atoms 1000. Similarly to the CPU 130 in the mobile device 100, the assistant server platform 210 can be continuously running a learning algorithm or algorithms.

Although plugins 220a-n are illustrated in FIG. 6A as being separate from the assistant server 200, this illustration is provided merely to illustrate the infinite number of plugins 220a-n that may be created and their respective associations with specific services 300a-n. These plugins 220a-n are generally created at the assistant server 200.

As discussed above, the storage 250 may be provided on the same hardware or cloud service as the assistant server 200, or may be separately located and accessible by the assistant server 200, as illustrated in FIG. 6A. The storage 250 may be, for example, a hard drive included in the assistant server 200, or an external storage device which is connected to the assistant server 200, for example a flash drive or a cloud storage server. The storage 250 may also be a plurality of storage devices connected to the assistant server 200. The storage 250 stores the library of commands 230 used to control the services 300a-n.

The library 230 may be divided into multiple divisions for different types of inputs. For example, the library 230 may be divided into a library of icons, a library of voice/word inputs, and a library of gestures.

The storage 250 may also include separate command sets 240a-n corresponding to services 300a-n. Each of the numerous command sets 240a-n includes the specific commands (associated with inputs) which may be used to control a particular one of services 300a-n.

In order to control a particular service 300, the user may connect the mobile device 100 to the assistant server 200 and download the appropriate command set 240. This connection may be achieved via the Internet by using a Wi-fi, Wi-fi direct, NFC, Bluetooth, RFID, or any other type of wireless or wired connection. The downloaded command sets 240 may be saved in the storage unit 140, either automatically or after a user acceptance command. Once downloaded, the command sets 240 may be used by the assistant interface 110 to translate received inputs into one or more semantic atoms 1000.

The storage 250 may also store usage data on the virtual assistant system 10, including context data (such as, for example, a time or a user's physical location when certain commands are entered), which inputs are given incorrectly (which inputs are immediately undone, etc.), and so on. This usage data may be made available to plugin developers so that the developers may then update the library 230 accordingly to reflect this usage data.

The storage 250 may also store updates to the library 230 generated through use of the virtual assistant system 10. As noted above and discussed in detail infra, the virtual assistant system 10 may define additional inputs, such as gestures, depending on user behavior, which may be stored in the storage 250.

The assistant server 200 illustrated in FIG. 6A is a centralized arrangement comprising a single node or server. However, as noted above the assistant server 200 may also be a distributed deployment, or "multiple instances" of the assistant server 200, comprising multiple nodes or servers communicating with each other via semantic atoms 1000.

Multiple instances of the assistant server 200 can comprise a network of hierarchically arranged servers 200a-n. This network could utilize different instances of the assistant server 200 to handle different requests, e.g., requests relating to different things. For example, where one server (corresponding to one instance of the assistant server 200) contains plugins 220 relating to a subset of services 300a-n, for example physical devices, another instance of the assistant server 200 could contain plugins 220 relating to a different subset, for example social media services and applications. A third instance of the assistant server 200 can route requests to and compile responses from these underlying servers (the underlying instances of the assistant server 200). The user perceives interacting with a single entity, i.e., a single assistant server 200.

When there are multiple instances of the assistant server 200, there may be a collection of nodes of approximately equal importance. For example, multiple users, each with their own assistant server 200, could connect their assistant servers together to function as a single assistant server 200. An exemplary embodiment of this configuration is illustrated in FIG. 6B. FIG. 6B illustrates 4 instances 200a-d, as well as mobile devices 100a-n in communication with the resulting assistant server 200. It will be understood that any number of instances 200a-n may be included. Furthermore, each instance 200a-n may include some or all of the features of the assistant server 200 illustrated in FIG. 6A. In the configuration of the assistant server 200 illustrated in FIG. 6B, different instances 200a-n of the assistant server 200 may be in communication with all or some of the other instances 200a-n. As illustrated in FIG. 6B, one instance 200a is in communication with all the other instances, while another instance 200b is only communicating with a single one of the others (200a in this exemplary embodiment). Instance 200b in this example will therefore only receive data directly from the instance 200a it is in communication with, but may receive data from the other instances (200c and 200d in FIG. 6B) indirectly, e.g., through assistant server 200a, which is in communication with these other instances 200c and 200d. Any number of mobile devices 100a-n may communicate with the networked instances of the assistant server 200a-n. Each of the various mobile devices 100a-n may each correspond to one of the instances 200a-n. Furthermore, the various mobile devices 100a-n may each communicate with any of the instances 200a-n which are connected in this manner, to receive data which is shared between all the instances 200a-n. The instances 200a-n may be "participants" in a chat between users in this manner, similarly to services 300a-n participating in chats as discussed above.

Alternatively, a single, "main" assistant server (instance) may function as the assistant server 200 described above with respect to FIG. 6A, and also connect to external nodes or instances for specific tasks and information. An exemplary embodiment of this configuration is illustrated in FIG. 6C. In FIG. 6C, only four instances 200a-d are illustrated for convenience, but any number of instances 200a-n may be included. In the exemplary embodiment illustrated in FIG. 6C instance 200a serves as the "main" assistant server, which mobile devices 100a-n are in communication with. This "main" assistant server is in communication with other, "subordinate" instances 200b-d. These "subordinate" instances 200b-d are not necessarily communicating directly with the "main" instance 200a. As illustrated in FIG. 6C, for example, instance 200d communicates with instance 200c, which in turn communicates with the "main" assistant server 200a.

As described above, icons, gestures, speech libraries, etc., are stored in the assistant server 200. However, some elements of these libraries, for example overriding aspects or additional aspects, could be contained elsewhere in the virtual assistant system 10, for example in the assistant interface 110 or in a node of the assistant server 200 that is kept separately from the other nodes. For example, a spoken command such as "radiation start" may mean "switch the light bulbs on" for a specific user, but may have a completely different meaning for other users. This additional command may be in a node (the node comprising a CPU and a memory, serving basically as a server) that is separate from the main assistant server 200 but connected to the assistant server 200, as in a deployment of multiple instances of the assistant server 200.

A user's personal access information, connections, sharing information, etc. might be contained in a separate instance of the assistant server 200. This separate instance might be a server under the particular user's control, such that the user may determine whether the separate instance is connected to the assistant server 200. Use of this separate instance enables a user to disconnect their personal information from the assistant server 200 and continue to be provided assistance by the assistant server 200, but at a diminished level without any personal information.

According to exemplary embodiments of the present general inventive concept, when a user wishes to perform a function with their mobile device 100, they must first run/initiate/open/access the Client 110 on their mobile device 100. Alternatively, the Client 110 may be running on the mobile device 100 continuously, without need for initiation. Once the Client 110 is running, the user may make a command input, e.g., select an icon to control an external service 300, in order to control the service 300 to perform a desired function. (Alternatively, the Client 110 may recognize a gesture, motion, sound, facial feature, or any other above-mentioned command input, without the need for a specific icon selection.)

When a command input selecting a service 300 is made and a function corresponding to the selected service is chosen via another or the same command input, the Client 110 may create a semantic atom 1000 that includes the command to control the service 300 to perform the desired function, and send the semantic atom 1000 to the assistant server 200. The assistant server 200 may include a stored pre-programmed plugin 220 that allows the assistant server 200 to translate the semantic atom 1000 into a proprietary language of the selected service 300. The assistant server 200 may receive the semantic atom 1000 from the mobile device 100, recognize that the user desires to control a particular service 300 in a particular way, and translate the semantic atom 1000 into the proprietary language of the service 300 according to the corresponding plugin 220 to allow the service 300 to understand the function/action that needs to be taken in response to the user's command input. The assistant server 200 may then send the translated command in the proprietary language of the selected service 300 to the selected service 300 in order to control the service 300 to perform the function.

For example, if a user wants to use a mobile device 100 to control a light (which may be connected with the virtual assistant system 10 via wired or wireless communications), that user may first select, e.g., a light icon displayed on a display screen of the mobile device 100 (for example user interface 150), while the Client 110 is initialized. The light icon may open up command prompts or options to allow the user to select, e.g., "LIGHT ON." Upon such a user selection, the "LIGHT ON" command is converted into a semantic atom 1000 by the Client 110, and is sent to the assistant server 200. This semantic atom 1000 may represent the concept of, e.g., turning on the light. The assistant server 200 may receive the semantic atom 1000. The semantic atom 1000 may then be converted by the light plugin 220 within the assistant server 200 into the light's proprietary language, the converted semantic atom 1000 representing instructions understandable by the light. More specifically, a programmer may have previously programmed the plugin 220 corresponding to the light to convert the device proprietary language into one or more semantic atoms 1000, and vice versa, thereby allowing the user to control the light from their mobile device 100. As such, the assistant server 200 is able to interpret the "LIGHT ON" command sent from the mobile device 100, and then can send an instruction in the light proprietary language to the light so that the light turns on.

As another example, if a user wants to use social media, e.g., Facebook™ (which is programmed in a Facebook™ proprietary language) to find someone on, e.g., LinkedIn™ (which is programmed in a LinkedIn™ proprietary language that cannot naturally communicate with the Facebook™ proprietary language), the user may open up the Facebook™ application using the mobile device 100 that is connected with the assistant server 200. As such, the user uses the Client 110 to access Facebook™, selects a person's profile in Facebook™, for example the person's profile picture, and a semantic atom 1000 is created by the Client 110 to represent the selected person (i.e., the proprietary language of Facebook™ is translated into a semantic atom 1000. This semantic atom 1000 may include any information retrieved from Facebook™, for example the person's name, pictures, and Facebook™ profile. Next, the Client may send the semantic atom 1000 representing the selected person to the assistant server 200, which accesses a stored plugin 220 for LinkedIn™ in order to translate the semantic atom 1000 into LinkedIn™ proprietary language. More specifically, the assistant server 200 must have stored therein both a plugin 220 for Facebook™ and a plugin 220 for LinkedIn™, such that the semantic atom 1000 received from Facebook™ representing the selected person can be used to find the selected person on LinkedIn™. In other words, the plugins 220*a-n* translate proprietary languages of their corresponding services 300*a-n* into the single semantic language, and vice versa, in order to allow various services 300*a-n*, including for example devices and applications, to communicate with each other via semantic atoms 1000. As such, after the assistant server 200 translates the semantic atom 1000 received from the Client 110 into the LinkedIn™ proprietary language, the assistant server 200 can directly send the instructions (in the LinkedIn™ proprietary language) to LinkedIn™ to perform the user's desired command, which, in this example, is to access the selected person's LinkedIn™ profile. Furthermore, the Client 110 may be operating in the background, i.e., the user may not be consciously aware of the Client 110's operations or even the use of semantic atoms 1000. In summary, as far as the user is concerned, the visual process of the above procedure includes: (1) opening Facebook™, (2) selecting a profile, (3) opening LinkedIn™, (4) pasting the selected profile into the search criteria in LinkedIn™, and (5) viewing the selected person's profile in LinkedIn™.

Additionally, the above operations may be distributed among services 300*a-n*. For example, a service 300 which has been given authorization to communicate in the semantic language, either by the software developer or via a command input from the user, may also communicate directly with the assistant server 200 and mobile device 100 with semantic atoms 1000. The service 300 in this case effectively operates as its own plugin. Such an authorized service 300 would be capable of sending semantic atoms 1000 to other services 300, and performing other tasks of the Client 110.

Furthermore, a mobile device 100 that is connected with the assistant server 200 (i.e., a mobile device 100 that includes the Client 110) can share the semantic atom 1000 representing the selected person with another mobile device 100 connected with the assistant server 200, in order to allow the another mobile device 100 to use the semantic atom 1000 representing the selected person to find the person's profile in yet another service 300, such as, for example, MySpace™. The sharing of the semantic atom 1000 may be performed via a messenger service providing messaging or chat functionality, email, or any other type of communication method involving the assistant server 200 and the mobile device(s) 100.

The above examples of service control are based on a service 300's capability of having global connectivity. More specifically, in the above examples, the assistant server 200 is the device that ultimately controls the selected service 300, based on the commands received from the mobile device 100 via the Client 110.

Alternatively, there may be services 300 that only have local connectivity capabilities, such as, for example, near field communication (NFC) devices. As such, control of such a local connectivity device must initiate from the mobile device 100 directly, and the commands cannot be received from the assistant server 200 (for example, the assistant server 200 is most likely out of NFC range of the NFC device, unless the assistant server 200 is included within the mobile device 100, as in the exemplary embodiment illustrated in FIG. 4B).

More specifically, when a user wishes to perform a function with their mobile device 100 at a local connectivity service 300, the user must first run/initiate/open/access the Client 110 on their mobile device 100. Alternatively, the Client 110 may be running on the mobile device 100 continuously without need for initiation. Once the Client 110 is initiated, the user may make a command input, e.g., select an icon, to control a local service 300 that is within a given range (e.g., an NFC range/proximity) of the mobile device 100, in order to control the local service 300 to perform a function. (Alternatively, the Client 110 may recognize a gesture, motion, sound, facial feature, or any other above-mentioned command, or the mobile device 100 may sense the local service 300 automatically when within the given range without the need for icon selection.)

When the command input is made and a function corresponding to the selected local service 300 is chosen, the Client 110 may create a semantic atom 1000 that includes the command to control the local service 300 to perform the desired function, and send the semantic atom 1000 to the assistant server 200. The assistant server 200 may include a stored pre-programmed NFC device plugin 220 that allows the assistant server 200 to translate/interpret the semantic atom 1000 into a proprietary language of the selected local service 300, and vice versa. The assistant server 200 receives the semantic atom 1000 from the mobile device 100, recognizes that the user desires to control the local service 300 in a particular way, and uses the local service plugin 220 to interpret the local service proprietary language commands that are necessary to control the local service 300. Subsequently, the assistant server 200 may create a new semantic atom 1000 including the commands that will be understandable by the local service 300, and send the new semantic atom 1000 back to the mobile device 100.

The mobile device 100 may receive the new semantic atom 1000 including the commands that will be understandable by the local service 300, and translate the semantic atom 1000 into a command having the proprietary language of the selected local service 300. Then, as long as the mobile device 100 is within the given range of the selected local service 300, the command (in the proprietary language of the selected local service 300) is sent from the mobile device 100 to the local service 300 to control the local service 300 to perform the desired function.

For example, if a user wants to use a mobile device 100 to control an NFC light (that is NOT connectable with the assistant server 200 via wired or wireless communications), that user can first select, e.g., a light icon displayed on a display screen of the mobile device 100 (for example, user interface 150), while the Client 110 is initialized. Similarly to the example described above, selection of the light icon may open up command prompts or options to allow the user to select a command, e.g., "LIGHT ON." Upon selection, the "LIGHT ON" command may be converted into a semantic atom 1000 and sent to the assistant server 200. This semantic atom 1000 may correspond to the action of turning the light on. The assistant server 200 may receive the semantic atom 1000. The semantic atom 1000 may then be converted by the light plugin 220 within the assistant server 200 into corresponding proprietary language representing instructions understandable by the light. Subsequently, the assistant server 200 creates a new semantic atom 1000 including instructions to generate the desired command(s) that will be understandable by the NFC light (i.e., expressed in the proprietary language of the light), and sends the new semantic atom 1000 back to the mobile device 100. Alternatively, the desired command(s) may already be converted to the proprietary language of the light, and be included in the semantic atom 1000 with instructions to extract the command(s) therefrom and transmit the extracted command(s) to the light to carry out the desired function(s).

The mobile device 100 may receive the new semantic atom 1000 including the commands that will be understandable by the NFC light, and convert the semantic atom 1000 into a command having the proprietary language of the selected NFC device. This translation can be performed at the assistant interface 110, according to the instructions included in the received semantic atom 1000 to convert the atom 1000 to the proprietary language of the light. Alternatively, the commands expressed in the proprietary language of the light may be extracted from the semantic atom 1000 at the assistant interface 110, according to instructions included in the semantic atom 1000. Then, as long as the mobile device 100 is within the NFC range of the NFC light, commands, e.g., the command to turn the light on, may be sent from the mobile device 100 to the NFC light, in the proprietary language of the NFC light, to control the NFC light, e.g., to turn on.

Furthermore, if the light is password-protected so others cannot operate the light without the password, an authorized user (i.e., a user who has the password or other credentials necessary to control the light) can share the "LIGHT ON" semantic atom 1000 with an unauthorized user to grant the unauthorized user access to the light to perform the "LIGHT ON" operation. In this case, the "LIGHT ON" semantic atom 1000 would further include the access credentials, e.g., password, user ID, etc., necessary to access and control the light. The semantic atom 1000 can either be shared via the assistant server 200 or directly from the mobile device 100.

Alternatively, the user may grant the unauthorized user access to, e.g., a service 300 temporarily by adding the unauthorized user's account as a semantic atom 1000 (created by the virtual assistant system 10) to a list of authorized users. As such, the service 300 never knows that an unauthorized user has been given access thereto, as the service 300 continues to receive its commands from the virtual assistant system 10, notwithstanding whether an authorized user or an unauthorized user is providing the commands.

This sharing of authority over services 300 is discussed in greater detail infra.

Additionally, the Client 110 may have incorporated logic therein to avoid the need to send the semantic atom 1000 to the assistant server 200. More specifically, the Client 110 within the mobile device 100 may be provided with a myriad of pre-stored plugins 220. The Client may transmit and receive semantic atoms 1000 directly with these pre-stored plugins 220, without the need to route the semantic atoms 1000 through the assistant server 200. The Client 110 may also be pre-programmed with one or more applications authorized to use the semantic language and which may therefore communicate via semantic atoms 1000 without the need for a separate plugin 220. Similarly to the pre-stored plugins 220, the Client 110 may transmit and receive semantic atoms 1000 with these pre-programmed authorized applications without needing to route the semantic atoms 1000 through the assistant server 200.

For example, if, as above, a user wants to use social media to find someone on, for example, LinkedIn™, the user may open, for example, a Facebook™ application using the Client 110 running on a mobile device 100, select a person's profile (for example, the person's picture), and a semantic atom 1000 may be created by the Client 110 to represent the selected person. If plugins 220 corresponding to Facebook™ and LinkedIn™ are directly stored within the mobile device 100, there is no need to send the semantic atom 1000 representing the selected person to the assistant server 200. Instead, in this example, because the plugins 220 are stored within the mobile device 100, when the user uses the Client 110 to access LinkedIn™, the Client 110 translates the semantic atom 1000 representing the selected person into the proprietary language understandable by LinkedIn™. As such, the user can easily find the person's profile on LinkedIn™ using the semantic atom 1000 corresponding to the selected person which was received from Facebook™, because the semantic atom 1000 effectively allows Facebook™ to communicate with LinkedIn™. Moreover, the user's experience in this example is substantially the same as when the plugins 220 are stored at the assistant server 200.

A process of determining the intention of an input command and carrying out the corresponding operation at an external service 300 will be described while referring to FIG. 7A. Referring to FIG. 7A, when a command is input at the mobile device 100 directly through the sensor 160 or via an external sensor (operation S500), the assistant interface 110 first translates the command input at the mobile device 100 into one or more semantic atoms 1000 so that the command can be shared among services 300a-n connected to the assistant server 200. As described above, the command input at the mobile device 100 may be an icon touch, gesture, voice data, or any other input provided at the mobile device 100 in which a sensor part can receive the input.

The assistant server 200 receives this translated command (operation S510). The connection between the mobile device 100 and the assistant server 200 may be automatic, or alternatively, the user may be prompted on the mobile device 100 to initiate and/or accept the connection to the assistant server 200.

The assistant server 200 then determines if the virtual assistant system 10 is operating in a remote mode or a local mode (operation S520). The determination of whether the virtual assistant system 10 operates in remote mode or local mode can include, for example, whether the assistant server 200 is permitted within the firewall of the service 300 or if the assistant interface 110 is connected within a local network (such as Bluetooth or NFC) to the service 300.

If the assistant server 200 determines that the virtual assistant system 10 is operating in remote mode (REMOTE at operation S520), the assistant server 200 can confirm recognition of the command(s) originating at the mobile device 100 by checking among the library of commands at operation S530a.

If the received command is recognized at the assistant server 200 (YES at operation S530a), the assistant server 200 can then perform the desired command instructed (operation S540a) at the intended external service 300 via the corresponding plugin 220 created at the assistant server 200, when the virtual assistant system 10 is in the remote mode of operation.

Alternatively, if it is determined that there exists any confusion as to what the command received from the mobile device 100 is intended to refer to (NO at operation S530a), for example, there may be more than one service 300 which uses the same command, the assistant server 200 can examine the command in a number of contexts by considering, among other things, the historical usage pattern of this command, the particular user providing this command, the particular location in which the command is given, the specific time of day in which the command is given, whether this particular user providing the command always uses this specific gesture to perform a specific function at a specific service 300, etc., at operation S560a. In other words, the assistant server 200 will examine all accessible contextual information available within a program running at the platform 210 of the assistant server 200 regarding this received command in order to determine specifically what possible options could have been intended by the received command.

Once the assistant server 200 determines which possible options could have been intended by the command input at the mobile device 100, the assistant server 200 provides these options of intended commands back to the mobile device 100 (operation S570a) so that the options can be displayed at the user interface (UI) 150 at the mobile device 100. Here the user can once again input the intended command, but this time with specific accuracy by selecting one among a few displayed options. As an example, a list of icons could be displayed on the mobile device 100 representing the possible commands, and the user could select one icon as the intended command. The assistant server 200 may also record the user's selection so that the original command input in operation S500 will be recognized if it is input again later (a collection of history data to form contexts). This is discussed in greater detail below with reference to FIG. 11.

The specifically intended command is then translated at the assistant interface 110 (into one or more semantic atoms 1000) and provided to the assistant server 200, where the command is received at the assistant server 200 (operation S580a) to carry out this command in the remote mode of operation of the virtual assistant system 10. In other words, when the virtual assistant system 10 is in remote mode, at operation S540a, the assistant server 200 may present the command to the corresponding plugin 220, which converts the command from the one or more semantic atoms 1000 to the proprietary language in which the external service 300 understands. The assistant server 200 then can perform the intended command, i.e., the assistant server 200 can communicate directly with the external service 300 in the respective proprietary language of the service 300b to perform any functions or operations instructed at the mobile device 100 (or other type sensor device which is connected to the virtual assistant system 10 and can provide a command input, which will be described in more detail infra).

Information received from the service 300 as part of carrying out the command in operation S540a is converted from the proprietary language to one or more semantic atoms 1000 at the corresponding plugin 220. If additional operations are requested at other services 300 using this information (YES at operation S550a), additional commands input into the mobile device 100 are received at operation S510 to perform the additional commands.

Figure 7B:
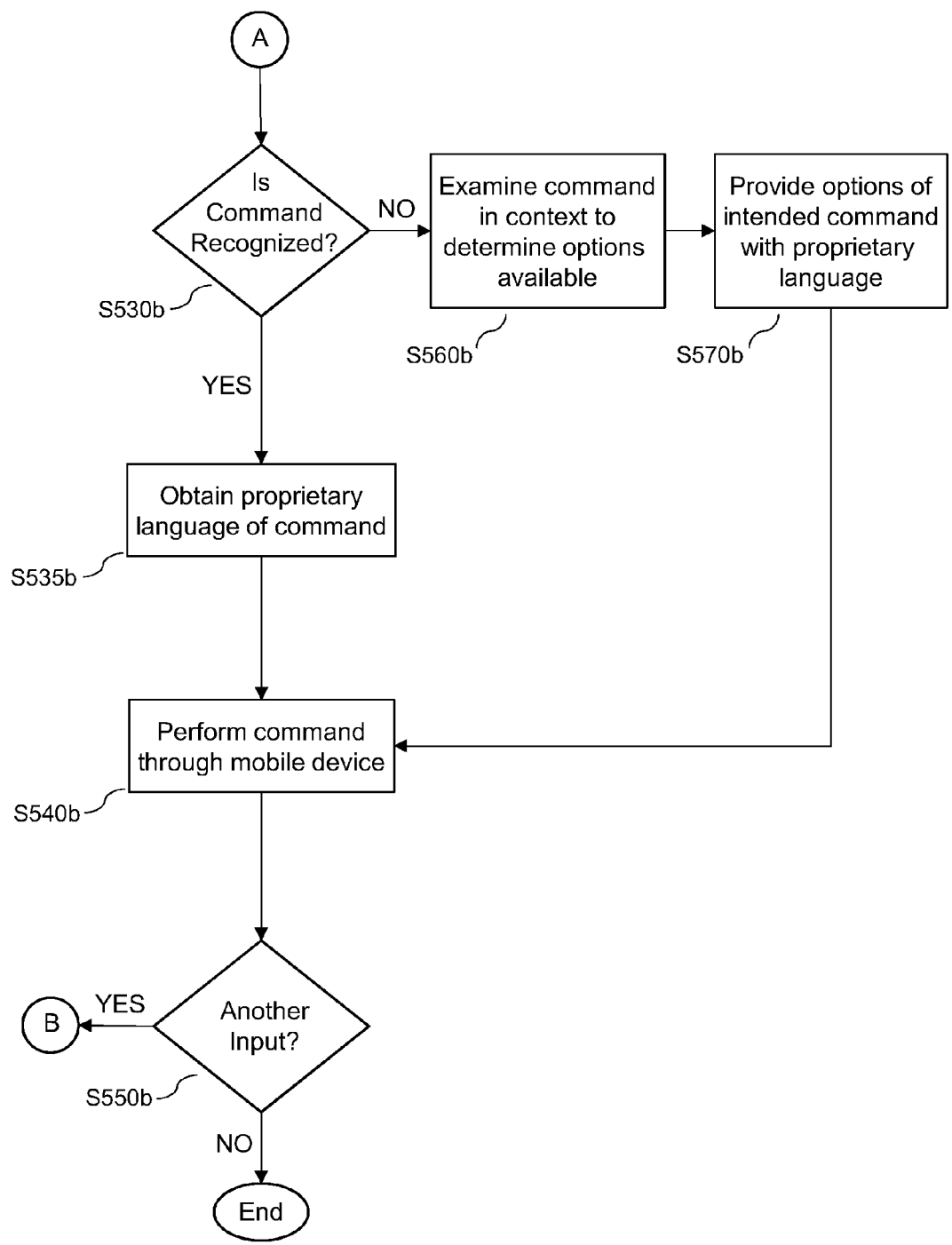

Alternatively, when it is determined that the virtual assistant system 10 is in a "local mode," (LOCAL at operation S520), the virtual assistant system 10 can perform the following sequence of operations as illustrated in FIG. 7B.

If the received command is recognized at the assistant server 200 (YES at operation S530b), the assistant server 200 can then obtain the proprietary language information of the specific service 300 to be controlled, and provide the information to the assistant interface 110 of the mobile device 100 as one or more semantic atoms 1000 with the proprietary language included (operation S535b). With the necessary proprietary language required to perform the intended control obtained at the mobile device 100, control of the service 300 can be directly performed at the mobile device 100 through the assistant interface 110 (and communicator 105) at operation S540*b*. Furthermore, if additional operations are requested to be performed at other services 300 using the information obtained as a result of the function performed at the previously intended service 300 (YES at operation S550*b*), additional commands input at the mobile device 100 are received at operation S510 (FIG. 7A) to perform additional functions corresponding to the additional input commands. These additional commands input can include information obtained from the previous operations performed. For example, continuous communications between services such as "apps" often require information obtained from the previous "app" in which a function was performed (e.g., obtaining information on a movie playing in a user's locale).

If there exists confusion as to what input command may have been intended when the command is received (NO at operation S530*b*), the assistant server 200 then determines which possible options could have been intended by the command input at the mobile device 100 (operation S560*b*). Similarly to the description above with regard to operation S560*a* in FIG. 7A, this determination can be performed by examining the command in a number of contexts by considering, among other things, the historical usage pattern of this command, the particular user providing this command, the particular location in which the command is given, the specific time of day in which the command is given, whether this particular user providing the command always uses this specific gesture to perform a specific function at a specific service 300, etc.

Once the possible intended command options are determined at the assistant server 200 at operation S560*b*, the assistant server 200 can obtain the proprietary language of these commands with the corresponding plugins 220, and provide these command options back to the mobile device 100 (operation S570*b*) with their respective proprietary language information so that the options can be displayed at the user interface (UI) 150 of the mobile device 100. Here the actual intended command can be selected and performed directly at the mobile device 100 (operation S540*b*).

Similarly to operation S580*a* described above, the assistant server 200 may record the command option selected by the user in operation S570*b* so that the command will be recognized if it is input again later.

As noted above, FIG. 7A illustrates a remote mode according to an exemplary embodiment of the present general inventive concept. In the remote mode, the assistant interface 110 does not need to be on the same network or internet as the corresponding service 300, nor does the assistant interface 110 need to download the proprietary language of the service 300. In remote mode, the assistant interface 110 may be required to present credentials such as a username and password to prove the user has authorized access to the service 300, but communication usually occurs through the assistant server 200.

Conversely, in the local mode illustrated in FIG. 7B, communication occurs directly between the mobile device 100 and the service 300. In local mode, the assistant interface 110 does need to be on the same network as the corresponding service 300, specifically the corresponding local network (for example, Bluetooth or NFC). However, once the mobile device 100 is on this local network, credentials are not necessary to prove the user has authorized access to the service 300.

In another exemplary embodiment of the present general inventive concept, the virtual assistant system 10 may operate in remote mode while the assistant interface 110 communicates directly with the service 300. This is advantageous if the service 300 monitors the number of access requests and shuts off access to IP addresses that are accessing it excessively. For example, if one million (give or take) users sharing one assistant server 200 want to access the same service 300 through the assistant server 200, according to the control process illustrated in FIG. 7A, the service 300 would register a large number of access requests coming from one IP address (the assistant server 200). The service 300 may accordingly block access from the assistant server 200. In this situation, it would be preferable for each user to access the service 300 through the assistant interfaces 110*a-n* of their respective mobile devices 100*a-n*. The service 300 would then register one access request from each of a million different IP addresses, and therefore would not block access to any of the users.

Figure 8:
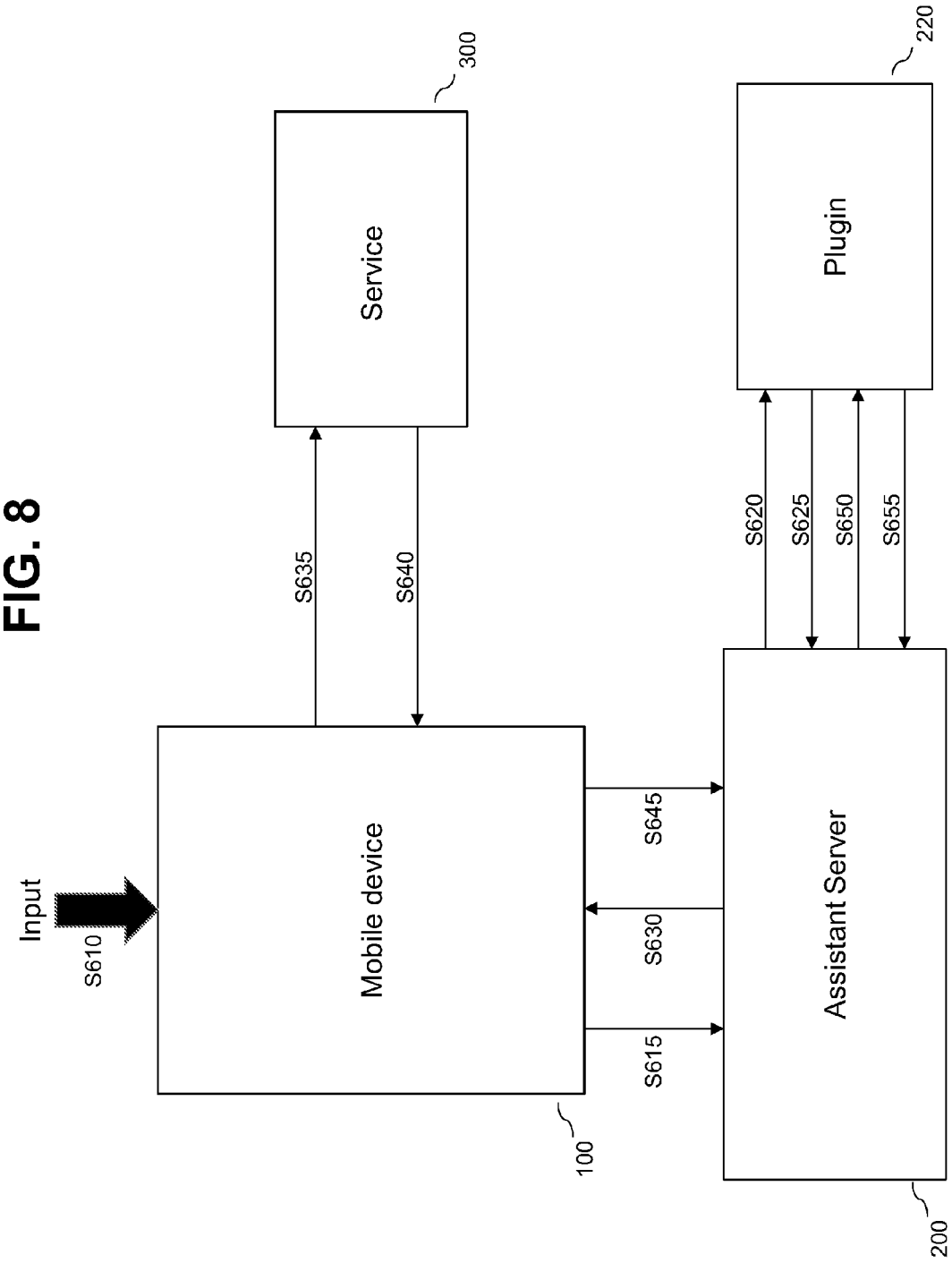
FIG. 8 is a block diagram illustrating the flow of operations of the virtual assistant system, according to an exemplary embodiment of the present general inventive concept.

The above exemplary embodiment of the present general inventive concept is illustrated in FIG. 8. In this exemplary embodiment, the virtual assistant system 10 is operating in remote mode. That is, the commands are being sent to a service 300 that is not connected locally (through Bluetooth, NFC, etc.) to the mobile device 100. In the exemplary embodiment illustrated in FIG. 8, a user input is received at the mobile device 100 and translated into one or more semantic atoms 1000 (operation S610). The input is then transmitted to the assistant server 200 (operations S615), which in turn provides the translated input to the corresponding plugin 220 (operation S620). Here the plugin 220 converts this translated input to the appropriate proprietary language (operation S625).

After the input is converted to the proprietary language, a semantic atom 1000 including the command is sent to the mobile device 100 (specifically to the assistant interface 110, through the communicator 105, illustrated in FIG. 4A) (operation S630). The mobile device 100 then extracts the converted command from the semantic atom 1000 and transmits the converted command, in the corresponding proprietary language, to the service 300 (operation S635). According to an exemplary embodiment of the present general inventive concept, the converted command may be transmitted by the assistant interface 110 through the communicator 105 over the Internet to the service 300.

The service 300 carries out the corresponding action and transmits data back to the assistant interface 110 (operation S640). This data is in the proprietary language of the service 300, which the mobile device 100 on its own does not understand. The mobile device 100 accordingly sends the received data to the assistant server 200 (operation S645), which provides it to the corresponding plugin 220 (operation S650). The plugin 220 converts the data into one or more semantic atoms 1000 (operation S655). Similarly to the remote mode illustrated in FIG. 7A, once the data is converted to the semantic atoms 1000, it may be shared between the mobile device 100 and other services 300*a-n*.

Furthermore, the present general inventive concept is not limited to only using one of the local or remote mode at a time. For example, the mobile device 100 could be connected locally to one or more services 300, while also being connected through the assistant server 200 to a different service 300.

As described above, each plugin 220 created at the assistant server 200 for the specific external service 300 is configured such that the plugin 220 can convert commands in one or more semantic atoms 1000 into the corresponding proprietary language. Similarly, the plugin 220 can also convert this proprietary language and other information (i.e., credentials of the service 300) into the semantic atoms 1000 used within the assistant server 200 so that the different external services 300*a-n* connected to the assistant server 200, via the Internet or other type of wireless communication used, as described above, can now share information between one another.

Furthermore, information obtained at the mobile device 100 from one service 300, as the result of an input command at the mobile device 100, can then be communicated and shared with other services 300*a-n* via the assistant server 200 so that a user of the mobile device 100 can communicate information with and between each of the services 300*a-n*. In other words, the mobile device 100 can control each of the services 300*a-n* and interact (share information) between the services 300*a-n* to obtain a greater or more substantive bundle of information, which is all transported as one or more semantic atoms 1000. This newly obtained substantive bundle of information can then be used with another command to be directed to another service 300 or shared with other mobile devices 100*a-n* connected with the assistant server 200. This process can continue between external services 300*a-n* and the mobile device 100 as well as between mobile devices 100*a-n* connected with the assistant server 200 to share and obtain any information desired, and consequently to use this information to access any additional external service 300 for an ultimate result sought.

An example of gathering information between services 300*a-n* can be a case where a user of a mobile device 100 accesses a service 300*a* Fandango™ to determine which movies may be available in a given location, and then choose a specific movie desired to view. Before the user purchases tickets to this movie, the user can transmit or "toss" this movie information (translated into one or more semantic atoms 1000 by the assistant interface 110) to another service 300*b*, such as IMBD™. Then the user can determine which actors are in the movie via the IMDB™ app prior to purchasing the tickets through Fandango™, based on whether the user may desire to watch a specific movie if the movie includes this particular actor.

In other words, once a movie is selected within the Fandango™ app (service 300*a*), the assistant interface 110 can convert this movie information into one or more semantic atoms 1000, where this translated movie information can then be shared with other apps such as IMDB™ (service 300*b*) through the IMDB™ plugin in order to obtain additional information about the movie. Such additional information to be obtained can include, for example, which actors are playing in the movie. IMDB™ can receive and understand the movie selected within the Fandango™ app because this information is converted into one or more semantic atoms 1000 from the Fandango™ proprietary language, and then can be converted into the proprietary language of IMDB™ by its corresponding plugin 220.

Furthermore, prior to purchasing the tickets, the user at the mobile device 100 may share one or more semantic atoms 1000 including this obtained movie information with other users at other mobile devices 100*a-n* which are also connected with the assistant server 200 (to be described in more detail with respect to FIG. 1A). Then the other users may view the obtained movie information and agree to a certain number of tickets to be purchased, and also may ultimately choose another movie via the same process, at which point all users can agree to purchase tickets for a movie which all users have agreed upon after sharing all of this information gathered between Fandango™ and IMDB™, etc., and between the users of the connected mobile devices 100*a-n* themselves. The above example is only an example of shared communication between users and services 300*a-n*, and is not limited thereto. Any number of communications and any format of communications between services 300*a-n* and users (via mobile devices 100*a-n*) can be performed through the semantic atoms 1000 created within the assistant server 200.

Another example of gathering information between services 300*a-n* can be related to music. For example, the mobile device 100 can use apps such as Gracenote™, Shazam™, or any other type of music recognition software to recognize music that is playing somewhere (such as a restaurant, shopping mall, music store, radio, television, etc.). The music recognition can be performed by a microphone type sensor within the mobile device 100 or connected to the mobile device 100. The song recognized by the assistant interface 110 can then be converted into one or more semantic atoms 1000 and sent to the assistant server 200 to present this information at the Gracenote™ app through a Gracenote™-created plugin 220. Gracenote™ can then provide the song information to the Gracenote™ plugin 220, which in turn will provide the song information as one or more semantic atoms 1000 to be used for any additional purpose that may be requested by the user at the mobile device 100.

In other words, at this point any additional service 300 that knows and/or understands how to use a song and is connected to the assistant server 200 can use this music information (as one or more semantic atoms 1000) to provide any desired result, as may be requested by the user at the mobile device 100. For example, this information can be sent, via the same process, to the app MusixMatch™, which presents the lyrics for the song. It can also be sent to Rdio™, which adds the song into the Rdio™ queue for the user. It can also be sent to Sonos™ speakers, which play the song. It can be also sent to YouTube™, which can find a video of the song and play this video or add the video to the user's playlist on YouTube™. The number of apps that this obtained and expanded information can be sent to in order to perform a command or gather even more information is only limited to the number of apps or other services that can work with perform some type of function using this obtained music information.

In each case, the plugin 220 for each service 300 desired to be used with this obtained music information can translate to-and-from the semantic atoms 1000 and the proprietary language of the service 300, thus providing for the free flow of communication regarding the music information between all services 300*a-n*, as well as between multiple users. Furthermore, the music information provided in the semantic atoms 1000 can be sent from one user at a mobile device 100 to other users of other mobile devices 100*a-n* to allow multiple users to apply this music information to various services 300*a-n* of their choosing.

In addition to the above described capabilities, if a song is playing on a television, for example, and a user of a mobile device 100 desires to capture, save and play the song on an external portable MP3 player or other type of music playing device at a later time, the user can first use Gracenote™ to recognize the song playing on the television. Subsequently, this song can be translated to one or more semantic atoms 1000 by the assistant interface 110 and provided to the assistant server 200, where the translated song can then be sent to a plugin 220 created for the external portable MP3 player, where the translated song information can be translated to the proprietary language of the external portable MP3 player, where the external portable MP3 player can then be instructed by either the plugin 220 itself or the mobile device 100 to play the song at the user's convenience. Whether the plugin 220 is instructed to directly play the song on the external portable MP3 player or whether the plugin 220 provides the proprietary language and other necessary information back to the assistant interface 110 so that the mobile device 100 can play the song on the external portable MP3 player can depend on either the network in which the MP3 player is connected, the location of the MP3 player with respect to the mobile device 100, or in accordance with other conditions as described previously herein. As such, the virtual assistant system 10 can access any Internet-based webpage or plugin 220 and use one or more semantic atoms 1000 to perform operations and interconnectivity with other Internet-based webpages, plugins 220*a-n*, mobile devices 100*a-n*, or external services 300*a-n*.

Figure 9:
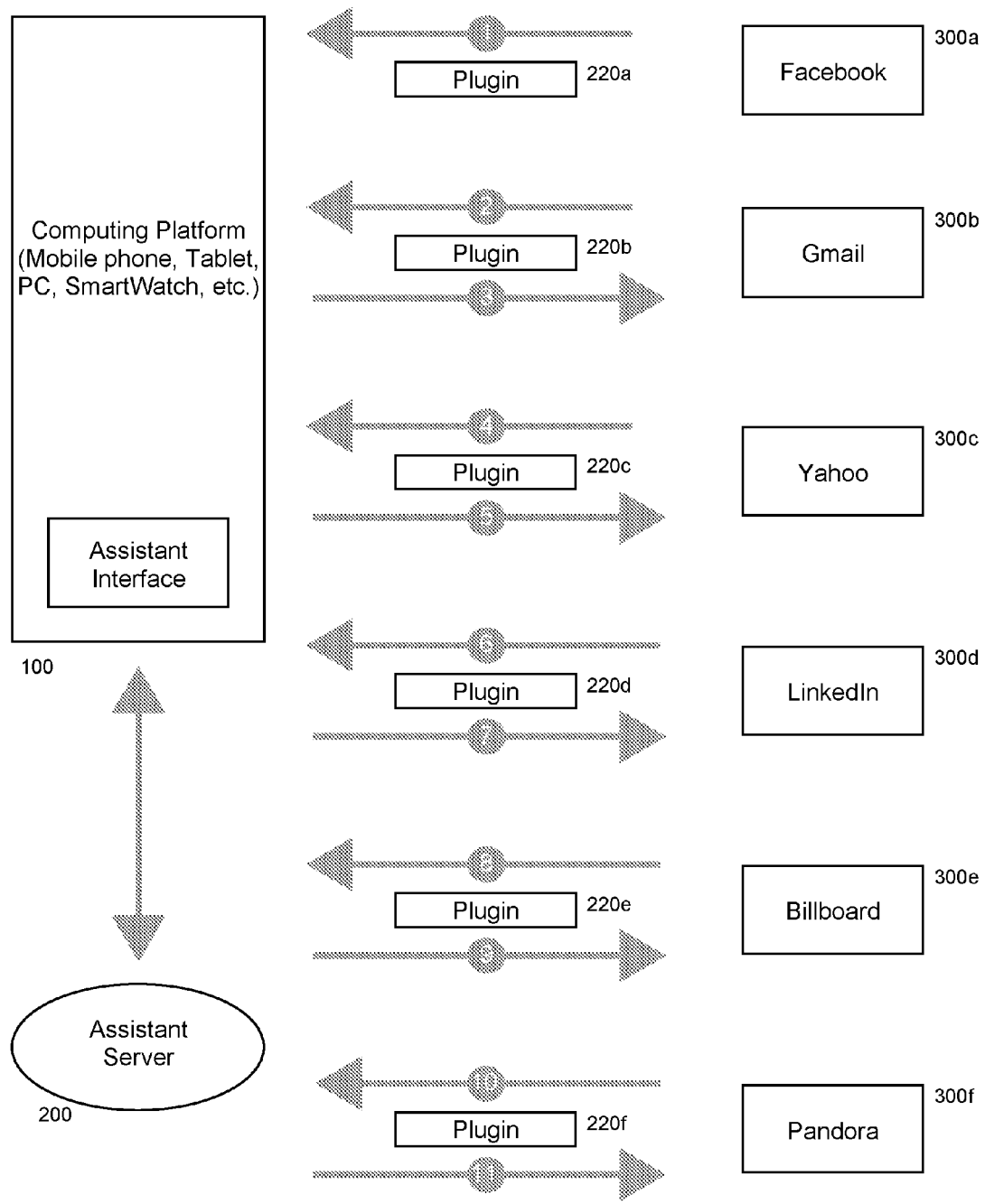
FIG. 9 is a block diagram illustrating a process of using semantic atoms to communicate between external services according to an exemplary embodiment of the present general inventive concept.

An example of using atoms 1000 to communicate between services 300*a-n* is illustrated in FIG. 9. As illustrated therein, a user can use the virtual assistant system 10 to, for example, look at posts made by people in social media, for example Facebook™ (corresponding to service 300*a*). The virtual assistant system 10 may represent each person with a corresponding semantic atom 1000. The user can take an atom 1000 which represents a person and ask another service 300*b* to provide additional information on the person, which may be added to the semantic atom 1000. For example, the user can send the atom 1000 to, e.g., Gmail™, to retrieve the person's email address. The e-mail address so retrieved can be added to the semantic atom 1000 that represents the person. The user can use this email-enriched semantic atom 1000 to send the person an email on another service 300*c*, for example Yahoomail™. Moreover, the user can use the virtual assistant system 10 to access a person's résumé via another service 300*d*, for example LinkedIn™ and add this additional information about that person to the atom 1000. The atom 1000 can continue to be used and added to, with an infinite number of services 300*a-n*. In the example given here and illustrated in FIG. 9, if the person's résumé includes a musical band that the person belongs to, for example, then the user can use the semantic atom 1000 representing the person (including their résumé and musical band noted thereon) to access an Internet web page such as Billboard™ (another service 300*e*) in order to view songs written by the person. Similarly, the user could use the semantic atom 1000 to directly access an application such as Pandora™ (service 300*f*) to play random music written by the person.

As such, semantic atoms 1000 allow a user to instantly connect a concept, e.g., a person, to various types of applications and services 300*a-n*. Several examples of the use of semantic atoms 1000 are provided herein:

With respect to movies, a user may use the virtual assistant system 10 to, for example, look at the top movies currently available according to, e.g., the Rotten Tomatoes™ service. Each movie may be represented by a separate semantic atom 1000. The user may use a movie's semantic atom 1000 to locate the movie for rent, for example to verify which local Redbox™ have the DVD in stock. Any command input or combinations thereof may be used, depending on the particular user and the programming of the plugins 220 involved. For example, no typing or speaking may be necessary. This process of looking up a movie and finding its availability may all be accomplished purely with touches or gestures. Similarly, Netflix™, Blockbuster™, Crackle™ or any other type of movie-related services may be utilized in this example.

With respect to books, a user may find a book on a service 300*a*, for example Goodreads™ and obtain a semantic atom 1000 corresponding to the book. Then the user may send this atom 1000 to another service 300*b*, for example Amazon™ to see people's ratings for the book. Subsequently, the user may send the semantic atom 1000 to, e.g., Overstock.com™ (another service 300*c*) to purchase the book. As such, the user can instantly use the semantic atom 1000 to purchase the book and maintain a record of the purchase on the virtual assistant system 10.

With respect to light bulbs, a user may, for example, generate a semantic atom 1000 representing the color and brightness setting of a bulb for bulb settings. Alternatively, two separate semantic atoms 1000 may be made for color and brightness, which may be combined to form a single semantic atom 1000. Then, the user may "throw" the atom 1000 representing the bulb's settings at another bulb using the virtual assistant system 10 using, e.g., a gesture movement. The other bulb may be immediately forced (i.e., commanded in its proprietary language) to adopt the color and brightness settings of the first bulb.

Figure 10:
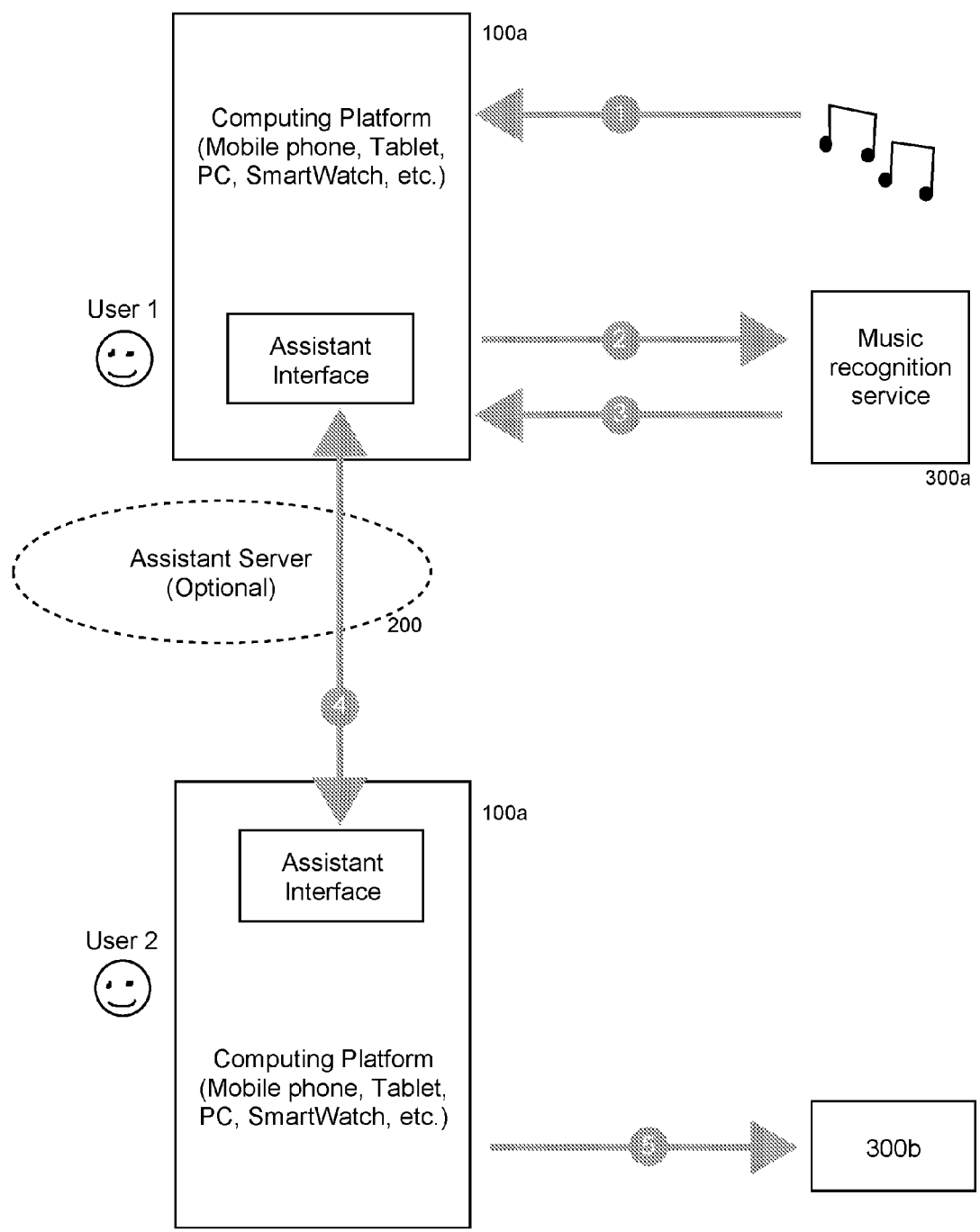
FIG. 10 is a block diagram illustrating a process of cross-user sharing of semantic atoms according to an exemplary embodiment of the present general inventive concept.

With respect to cross-user sharing, semantic atoms 1000 can also be sent to other users. As illustrated for example in FIG. 10, one user can recognize a song using a music recognition service 300*a*, e.g., Gracenote™ which may obtain information about the song, such as the name and album. The virtual assistant system 10 may generate a semantic atom 1000 representing the song and including the information found by the service 300*a*. The user may then send this semantic atom 1000 representing the song to another user, who may then use the song atom 1000 to play the song on, e.g., YouTube™ via the virtual assistant system 10, by sending the atom 1000 to another service 300*b* (YouTube™ in this example). This other service 300*b* may obtain the song and play it on the other user's audio system. Notably, the assistant server 200 in this example is optional for transmitting the song information between users. A user having a semantic atom 1000 representing a song on their mobile device 100 may send that atom to another user's mobile device 100*a*, directly or via the assistant server 200.

Furthermore, as described above, several atoms 1000 may be nested inside one another or bundled (combined) into a single atom 1000. For example, a virtual shopping basket full of shopping items (for example, a user's cart on Amazon™) can be a single atom 1000 that includes other atoms 1000 corresponding to the individual shopping items nested inside it. As such, the single atom 1000 of the shopping basket can save space and increase the convenience of transmitting the atom 1000 (and its nested atoms 1000) between different services 300*a-n* to increase user convenience.

The virtual assistant system 10 is an open one in which any developer can create a plugin 220. This open construction allows new semantic atoms 1000 to be specified by any developer for new data types. In this way, the semantic language may keep expanding over time. Semantic language dialects are also permissible for different domains.

Figure 11:
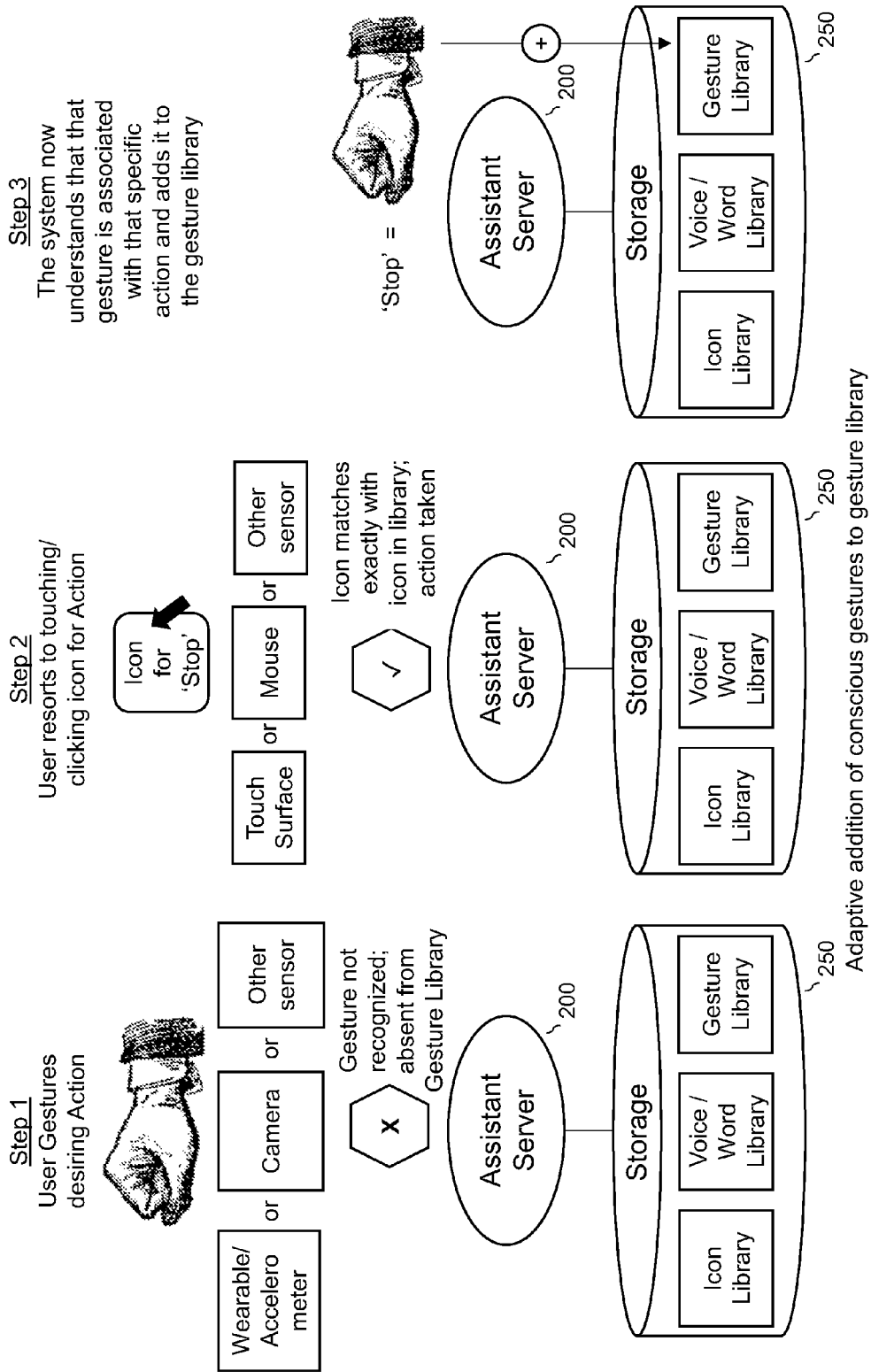
FIG. 11 illustrates a process of adaptive addition of a conscious input command to a library of commands, according to an exemplary embodiment of the present general inventive concept.

In addition to providing a common set of commands, exemplary embodiments of the present general inventive concept also allow new commands to be developed, via an adaptive learning and control system. For example, a command received at the mobile device 100 which is not recognized may be recorded as a new command once defined by the user. As illustrated, for example, in FIG. 11, a user may make a gesture intended to give a command ("Stop", as illustrated in FIG. 11). If this input is not among the inputs recorded in the assistant server 200, the user may then input the command a different way, for example by touching an icon denoting "Stop." The assistant server 200 may then record the first input (the gesture in this example) into the storage 250 as denoting the associated command.

Figure 12:
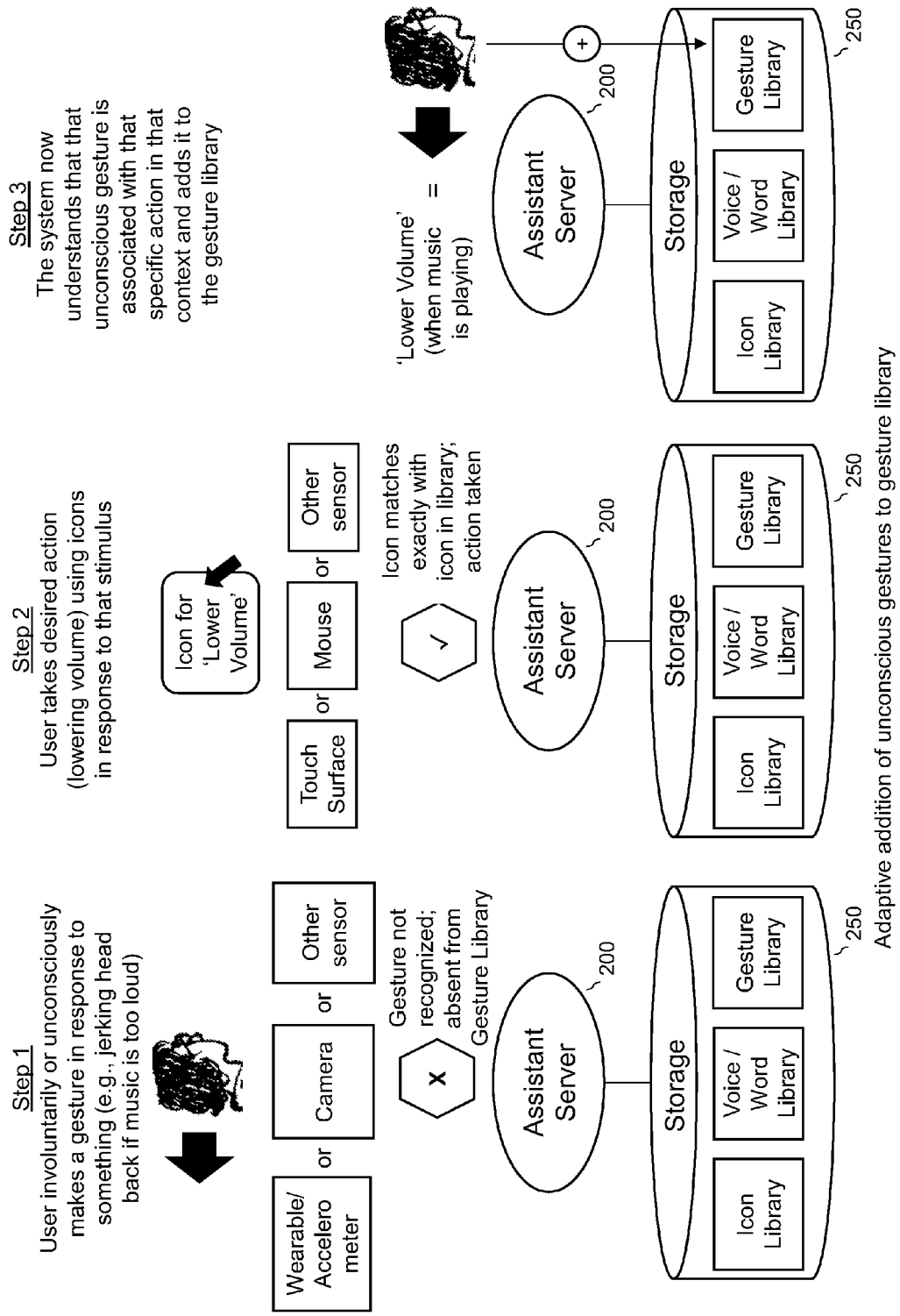
FIG. 12 illustrates a process of adaptive additions of unconscious input commands to a library of commands, according to an exemplary embodiment of the present general inventive concept.

According to an exemplary embodiment of the present general inventive concept as illustrated in FIG. 12, natural and involuntary inputs can also be interpreted as commands by the virtual assistant system 10. For example, if a user of the virtual assistant system 10 plays a video and the audio is too loud, the user may involuntarily flinch and jerk his/her head back. This involuntary motion will be followed by the use of icons or gestures or voice commands to lower the volume. The virtual assistant system 10 may thereby learn that the flinch and head-jerk-back gesture should be associated with lowering the volume by a large amount or muting it altogether. This new command (flinch and head-jerk-back) may be accordingly saved in the storage 250 of the assistant server 200. Similarly a grimace or other facial expression in certain contexts could be associated with 'undo or reverse the last command'. As another example, if a user squints at a display screen (e.g., user interface 150) of the mobile device 100, this facial expression could be interpreted as a command to enlarge a displayed text or image. Accordingly, the virtual assistant system 10 can adapt to and store unconscious or involuntary input commands in addition to conscious input commands.

As an alternative, or in addition to the above exemplary embodiment of the present general inventive concept, a user or a developer could specify specific gestures which represent specific people. As an especially contrived example, snapping one's fingers, tapping ones forehead and then gesturing to indicate a clockwise movement followed by two palms open to indicate '10' might mean 'send my mother a message that I will be there in 10 minutes." Hence, some inputs may have a range of variance that represent specific things like numbers or individuals.

Some variance may also be provided in the inputs, such as the icons and gestures, themselves. Therefore, several icons may be specified in the library which are mutually interchangeable and equivalent. Similarly, several gestures could correspond to the same underlying meaning and be interchangeably used. This interchangeability of command inputs is important because different cultural zones may have varying meanings associated with specific things and have preferences which are varying. Note that the color and size of icons could also have meaning associated with them. Similarly, icons and gestures could take on additional meaning when used in conjunction with one another, such as denoting which service 300 is being controlled. For example, an icon representing 'close' could be used to manipulate a door closed when the right palm is held flat out but be used to close a window screen when a U shape is made with right hand instead. Such rules would also constitute a part of how the library is predefined and then used by plugin developers to provide users with controls. Note that gesture repetition may also carry meaning. Making one knocking action with a finger versus two knocks in rapid succession could be entirely different gestures in the gesture library. As another example, for a plugin developer who is connecting the virtual assistant system 10 to a document management system, pinching fingers (as though holding an imaginary key) and turning once might mean make a document 'read only' whereas turning it twice could mean 'remove both read and write access.'

Figure 13:
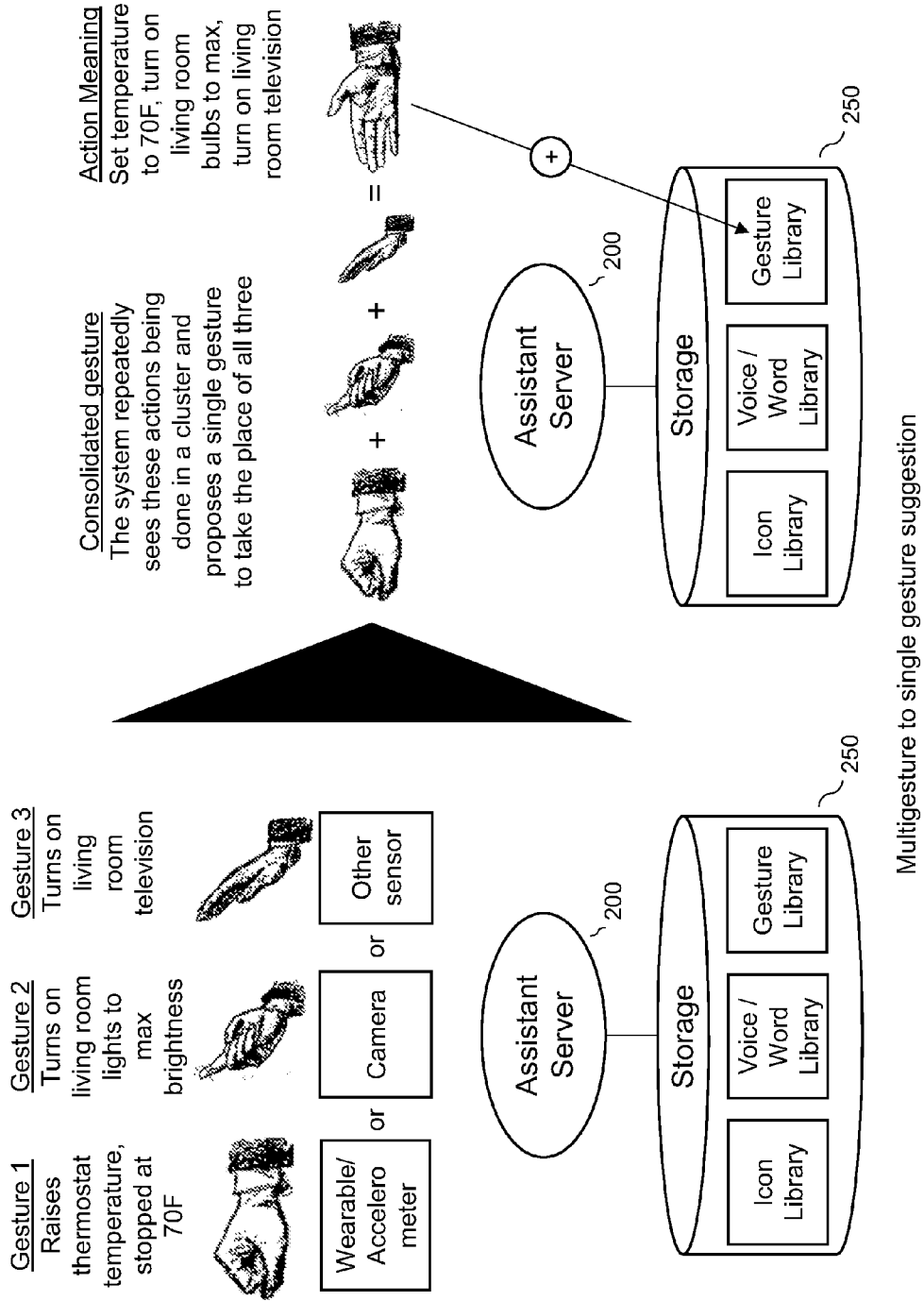
FIG. 13 illustrates a process of consolidating a plurality of gesture inputs in a gesture library to a single gesture input, according to an exemplary embodiment of the present general inventive concept.

Another example of such adaptive use according to an exemplary embodiment of the present general inventive concept is illustrated in FIG. 13. As described above with respect to FIG. 4A, the mobile device 100 may include a Central Processing Unit (CPU) 130. This CPU 130 may be configured to run a learning algorithm which determines when a series of commands are customarily given together. For example, a user may make a first command, illustrated as a gesture, to raise a thermostat temperature to 70° F. The user may then make another gesture to turn on living room lights to maximum brightness, and a third gesture to turn on the living room television. If the CPU 130, running the learning algorithm, determines that these gestures are customarily performed together, it may communicate this determination to the assistant server 200, which in turn may generate a new command which executes all three actions simultaneously. FIG. 13 illustrates a separate new gesture to execute the group of commands customarily presented together. In other exemplary embodiments of the present general inventive concept, multiple equivalent command inputs (for example, gestures) may be proposed, any one of which will execute all the associated actions. When one of these command inputs is detected at the mobile device 100, it is translated into one or more semantic atoms 1000 by the assistant interface 110 and transmitted to the assistant server 200, where it is then translated through the plugins 220 to give the appropriate command to the corresponding services 300a-n.

In other exemplary embodiments of the present general inventive concept, the virtual assistant system 10, specifically the mobile device 100, may determine that specific icons customarily receive touch inputs at a specific time of day, and then bring these specific icons to more prominent positions on the user interface 150 at that time of day. The virtual assistant system 10 may also present these icons (for example, as a visual depiction) on the user interface 150 of the mobile device 100 in more prominent positions compared to other icons at that time of day. The virtual assistant system 10 may alternatively generate a new icon at the assistant server 200 and displayed on the mobile device 100 which executes the actions of several icons customarily receiving touch inputs together. These correlations are saved—in human readable or non-readable format—in the storage 250 attached to the assistant server 200. The virtual assistant system 10 will generate a name for this icon based on the context. For example, an icon could be named 'arrived home'.

The virtual assistant system 10 may be adaptive in another respect. If, via the CPU 130 running the learning algorithm, the mobile device 100 notices that the user incorrectly but repeatedly uses an icon or sequence of icons with the intention of executing an action which fails to be executed (because the icons were incorrect) then the assistant server 200 may actually associate that icon or icon-sequence with that action (for that user, for a subset of users, or for all users). For example, if a user repeatedly tends to turn up the volume and then immediately turns it back down and then (using a different icon) moves up a channel of a television, this may indicate that the user is confusing the icon for turning up the volume with channel-up. The CPU 130 in the mobile device 100 can detect this behavior and then propose that the "volume-up" icon be used for "channel-up" instead and in turn be replaced with a different and less-confusing icon. The virtual assistant system 10 can also automatically make the change if it deems it appropriate based on a decision-making algorithm that is running in the CPU 130, the assistant server platform 210, or on a separate server whose results are saved on the storage unit 140 or storage 250.

These usage patterns and the accompanying changes may be collected in the storage unit 140 of the mobile device 100 or in the storage 250 of the assistant server 200 to be used as updated commands. As a result, the library of commands 230 stored on the storage 250 may expand over time with new, intuitive and adaptive commands.

Alternatively, or in addition to the above adaptive control in which the assistant server 200 automatically updates the commands, data on the user's actions and inputs may be collected and made available to the plugin developer, for example, by e-mail or an online administrative portal through which the developer can view information related to the usage of the plugin 220. This allows the developer to update the plugin 220 accordingly. This is valuable because the repeated use of the inputs, for example icons, indicates a persistent intuitive mapping of the inputs and the intended action in the mind of that user or in an aggregate group of users. The developer can discover that such a psychological input-to-action mapping exists based on user behavior. Separately transmitting the data to the developer instead of implementing a learning algorithm in a CPU can be advantageous when processor capacity or the effectiveness of a particular learning algorithm is a concern.

These adaptive techniques may be employed to address semantic confusion between plugins 220 created by different plugin developers. For example, the developer of the plugin 220 for one thermostat may specify one gesture to raise temperature whereas the developer of the plugin 220 for a different thermostat may specify a different one. Based on how users are employing gestures, the virtual assistant system 10 may provide suggestions to the developer on how gestures (or icons or voice commands) can be modified to allow users to accomplish what they want with a more consistent set of gestures. By classifying services into similar groups, developers will also be helped to select the most intuitive icons, gestures and voice commands for their new plugins 220. For example, a developer creating the plugin 220 for the tenth thermostat to interface with the virtual assistant system 10 may be able to be better informed by how users actually prefer to invoke various thermostat functions by means of icons, gestures and voice with the previous nine thermostats. This could be done prescriptively by strongly suggesting the developer use specific icons for specific functions or more indirectly by discouraging mappings which have been shown to be confusing for users in the past.

Furthermore, these adaptive techniques can be employed using various artificial intelligence techniques, which are to be utilized by and/or developed on various types of hardware, including robotics algorithms, learning algorithms, parallel programming, logical searching, optimization, heuristics, evolutionary computation, etc., but are not limited thereto. Accordingly, the virtual assistant system 10 can "learn" a user's preferences based on the user's movements, habits, and tendencies.

According to another exemplary embodiment of the present general inventive concept, different sets of gestures, icons and voiced commands can become established for different groups of users (e.g. in different countries). The virtual assistant system 10 (either the CPU 130 of the mobile device 100 or the assistant server platform 210 of the assistant server 200) can infer from the use of specific inputs (gestures, voice commands, icons, etc.) which of these groups the user belongs to and then provide support to them in the "dialects" that user is most familiar with. For example, it is possible that people coming from military contexts get used to a different set of icons or gestures to mean "turn left" than people coming from civilian contexts. If the virtual assistant system 10 is able to infer that someone is military-affiliated based on a gesture the person makes to indicate "turn left," other gestures and icons may also change meaning to provide this person with a more familiar context. Such inferences can then be saved in the virtual assistant system 10 as a context of this person (specifically, in the storage unit 140 of the mobile device 100 and/or the storage 250 of the assistant server 200).

According to another exemplary embodiment of the present general inventive concept, there may be a three tier system of libraries. The first set of (gesture, voice, icon) libraries are universal and apply to all users. The second set of (gesture, voice, icon) libraries apply to specific cohorts of users (e.g. those in a specific trade, those of a certain age or social grouping, those who speak a given language, those who are members of a specific set of institutions, those who reside in specific regions or countries, etc.). The third set of (gesture, voice, icon) libraries apply to specific users. If there is conflict between these because the same command inputs (e.g., words, gestures, icons, etc.) mean different things in these three different tiers of libraries, a precedence rule can be utilized. Normally, user-specific interpretations trump user-cohort interpretations which in turn trump universal interpretations. However, this precedence order can be different in some situations.

Figure 14:
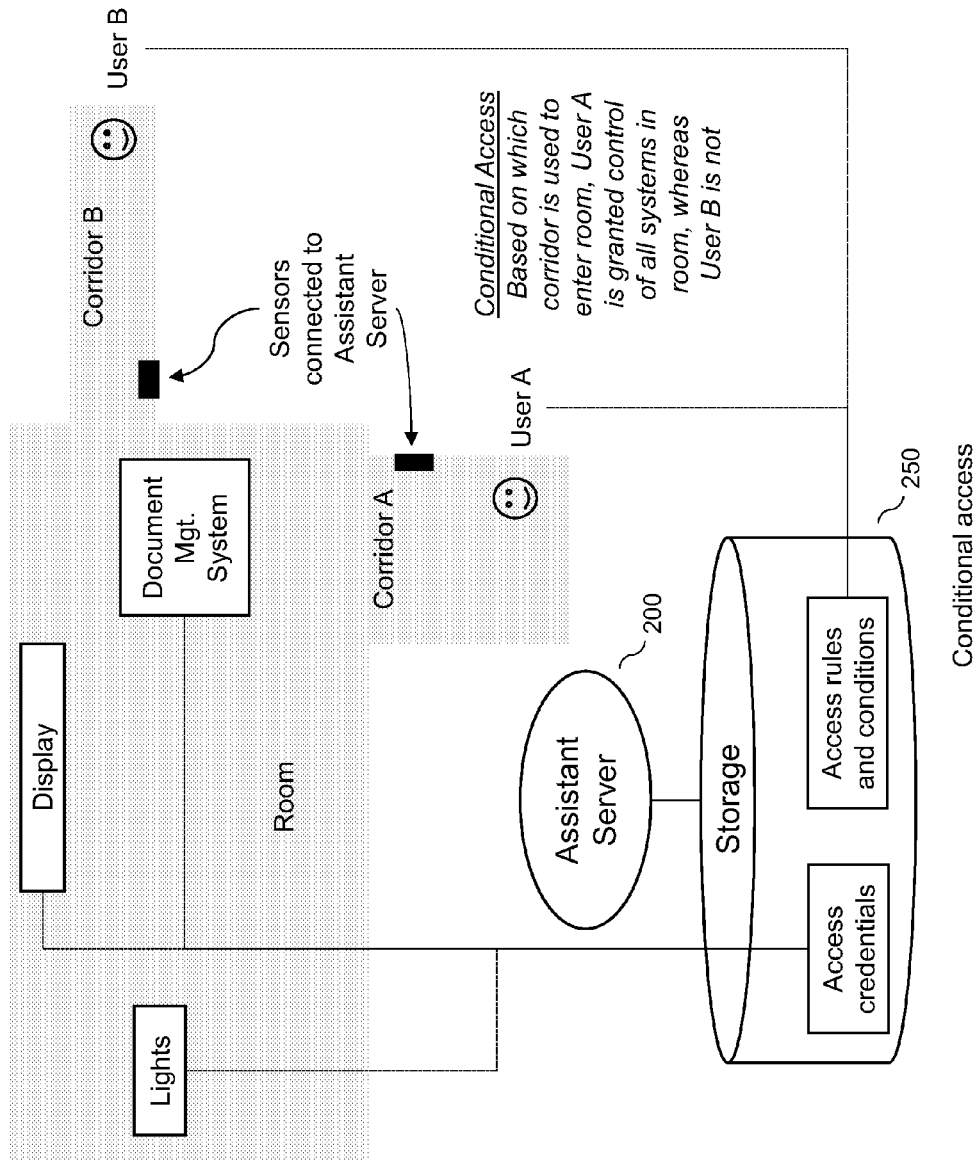
FIG. 14 is a diagram illustrating conditional access to the virtual assistant system, according to an exemplary embodiment of the present general inventive concept.

Controls may also be automated or vary depending on context. For example, if the user always turns on the DVR after turning on the TV, the virtual assistant system 10 can automatically choose to turn on the TV when receiving a command to turn on the DVR. Alternatively, this predictive behavior may be programmed by the plugin developers according to use or context data gathered by the virtual assistant system 10. As another example, access to a certain document management system can automatically be enabled if a user is present in a particular geo-fenced area, and such access may be cut off when the user exits that area. Control can be made even more specific, e.g., as illustrated in FIG. 14, a user that enters a room through one corridor they might have access to the document management system, whereas if the same user enters from a different corridor that user may not have access. Other factors, for example, time or the sequence of user usages of the virtual assistant system 10 can also be an element of context, thereby varying the controls of the virtual assistant system 10.

In order to enable these scenarios where the virtual assistant system 10 takes predictive action, according to an exemplary embodiment of the present general inventive concept of the virtual assistant system 10, the mobile device 100 or the assistant server 200 can constantly measure when certain actions are invoked and collect these measurements in its storage (storage unit 140 of the mobile device 100 and/or the storage 250 of the assistant server 200). The measurements could include locations, times of day, co-presence of specific individuals, action sequences that have been taken and other factors. If the virtual assistant system 10 finds a reliable way to predict when certain actions are taken based on statistical, probabilistic or machine-learning algorithms that are running on the CPU 130, the assistant server platform 210, or on servers or other learning type devices connected to or in communication with the virtual assistant system 10, then the virtual assistant system 10 can do so.

The virtual assistant system 10 can also proactively present its intention to predictively take such actions to the end user by means of displaying a message on the mobile device 100. This message can be transmitted from the assistant server 200 to the mobile device 100 to be displayed on the UI 150, or the message can be generated at the CPU 130 and displayed at the UI 150. The message may be, e.g., visual, audible, or tactile, and allow the user to approve or disapprove such actions. The message can take the form of presenting the predictive action in advance as a new "standing rule" or proposing that the virtual assistant system 10 take the action momentarily unless the user overrides the proposal and instructs the virtual assistant system 10 not to.

In another exemplary embodiment of the present general inventive concept, the mobile device 100 is configured to provide a virtual reality (VR) experience. In this case, the mobile device 100 may be, e.g., a wearable device such as a headset or gloves. The use of semantic atoms 1000 may enable a seamless VR experience.

VR in this context denotes an experience in which the user interacts with an immersive environment. An "immersive" environment means one which partially or completely replaces a user's perception of their surroundings with a virtual environment. For example, the mobile device 100 may be a headset worn by the user and which presents a view across part or all of the user's field of vision. The user of such a mobile device 100 perceives an artificial view of a virtual environment through the mobile device 100. As such, the user can be immersed in the virtual environment. Alternatively, the user may be in an enclosed environment, e.g. a room in which images are displayed on the walls, and the "mobile device 100" is stationary objects which may receive input commands from the user, e.g., by receiving gesture and voice commands. In other words, a user may have a VR experience without necessarily being required to wear anything directly on their body while still being immersed in an artificial environment.

The present general inventive concept enables VR by providing a unified environment for a user to interact with. Similarly to services 300*a-n* participating in a chat through plugins 220*a-n*, services 300*a-n* participate in a VR session through plugins 220*a-n*, with the user interacting with the plugins 220*a-n*. For example, upon initiating a VR session, the user may enter an initial VR environment of their choice. This first environment may correspond to a first plugin 220*a*. From this initial environment, the user may transit seamlessly between other VR experiences via other VR environments, where each different VR environment may correspond to one or more different plugins 220*b-n*. Relevant information regarding the user and command inputs may be communicated between plugins 220*a-n* via semantic atoms 1000. As such, semantic atoms 1000 streamline communications between different services 300*a-n* providing different VR experiences, allowing different VR experiences to be integrated with each other and operate together seamlessly.

User commands may still be accepted through the medium of the VR environment, for example through icon touches, gestures, or spoken commands. User command inputs may be interpreted contextually, e.g., through interaction with the VR environment. For example, a virtual icon may be displayed in the user's field of vision, and a touching motion by the user on the icon may correspond to a command to perform an associated action. A "touch" in this case may mean a gesture that logically equals a touch except that the user is "touching" something being displayed to the user in a VR display as opposed to something being displayed on a screen or other object the user is actually physically touching.

As noted above, the mobile device 100 including assistant interface 110 which translates a command input or inputs into one or more semantic atoms 1000 may be, for example, a VR headset or other wearable device that the user uses as part of the VR session. The mobile device 100 may alternatively be a separate computing device in communication with the headset or other wearable device, similarly to FIG. 5B. The assistant interface 110 of such a mobile device 100 may translate command inputs received from external sensing devices such as the headset into one or more semantic atoms 1000, and may transmit the translated commands to the assistant server 200.

In addition to allowing for seamless transition(s) between different services 300*a-n* making up the VR experience, exemplary embodiments of the virtual assistant system 10 allow cooperation between multiple users. Multiple users may participate in a VR session, experiencing the same or similar VR environments. Each user may use a separate virtual assistant system 10, including their own mobile device 100 and assistant server 200. The various assistant servers 200*a-n* may communicate with each other via semantic atoms 1000. Alternatively, an individual user may connect their mobile device 100 to two or more assistant servers 200*a-n*, which may similarly communicate with each other with semantic atoms 1000. Furthermore, different users may all use the same assistant server 200, even if the users are physically distant from each other, e.g., in different countries or time zones, so long as their respective mobile devices 100 are in communication with the assistant server 200.

When there are multiple instances of the assistant server 200, information such as user preferences, command inputs, and contexts may be communicated between assistant servers 200*a-n*, allowing one assistant server 200*a* to understand the command inputs of another assistant server 200*b*. This is a form of adaptive learning by the assistant server(s) 200, described in detail above. For example, command inputs of multiple different users can be communicated between and understood by the multiple instances 200*a-n* of the assistant server. Multiple instances 200*a-n* of the assistant server also enable the example given above in which multiple users are using completely different assistant servers 200*a-n*, but are still participating in the same VR experience, as their respective assistant servers 200*a-n* communicate with each other.

In a shared VR experience between two or more users, command inputs may also be shared. One user may make a command input that can then be corrected or complemented by another person. For example, one of the users might make a gesture to change a scene, which might fail because that user is unaware of the correct gesture to make (as registered in the library 230 of stored command inputs accessed by the assistant server 200, illustrated in FIG. 6A). Then, a second user might correct the first attempted command input, for example by means of a gesture, a spoken command or by touching icons, which is recognizable as a gesture within the library 230 of command inputs accessed by the assistant server 200. The assistant server 200 may then update its library 230 with the original, non-recognized command input, and associate the original command input with the intended action. This updating of the library is also an example of adaptive learning, which enables the assistant server 200 to adaptively expand its vocabulary of command inputs. This same action can be extended to multiple instances of the assistant server 200, as different instances 200*a-n* of the assistant server may communicate the new command input to each other to update their respective libraries of command inputs.

Command inputs from multiple users can also be bundled together via adaptive learning. For instance, if some actions repeatedly are being performed on a sequence of gestures, voice statements or virtualized touches of icons or graphics, the virtual assistant system 10 can bundle these actions together into a single gesture, voiced command or graphical icon touch that will trigger that entire sequence of actions to be performed. It is also similarly possible to adaptively bundle together actions that involve multiple people. For example, if some action is taken by User A, then followed by an action by User B and then another by User C, but these users often perform these actions in conjunction together, all these actions can be bundled together into a single trigger (e.g., a gesture, voice control, or graphic control), which can be made by any of the users. Sometimes, these actions can also require authorization from multiple people together or in sequence. If so, these authorizations can also be bundled together into a single control by extending the relevant authority conditionally for that bundled action alone. This bundling of actions relates to the extension and revocation of authority described in detail infra.

The meaning of command inputs may vary depending on context. For example, if a gesture command input is made in the direction of a light, the virtual assistant system 10 may interpret the gesture as, e.g., a command to reduce the brightness level. If the same gesture is made in the direction of a music player, the virtual assistant system 10 may interpret the gesture as, e.g., a command to reduce a volume level. This form of adaptive learning is extremely valuable in VR applications, to allow the virtual assistant system 10 to perform more intuitive actions in response to command inputs.

The same command inputs may also be interpreted differently for different people. For example, if one person consistently tends to use a gesture to mean one thing and another person uses the same gesture to mean something different, the virtual assistant system can learn these preferences via adaptive learning. Furthermore, if multiple instances 200a-n of the assistant server are used by one or more users, the instances 200a-n of the assistant server may communicate user preferences and command inputs between one another in order to support a seamless experience for one or more users. Note that this use of adaptive learning to interpret command inputs differently for different users also permits the emergence of dialects of command inputs in different user groups, or between individuals.

Equivalences may be established between handheld experiences (e.g. with a smartphone) and VR experiences for specific command inputs. So, in the library 230 of command inputs, some command inputs may be marked for use in handheld experiences, some command inputs may be marked for VR experiences, and some command inputs may be marked for both handheld and VR experiences. In some cases, there will be a mapping where a specific mobile command input (for example, an icon touch) corresponds to a different VR command input (for example, a gesture). These mappings can be inferred by the virtual assistant system 10 based on usage and feedback patterns, via adaptive learning. The mappings may also be explicitly provided by plugin developers.

Plugin developers may have the ability to design experiences (e.g. define one or more actions for plugins 220a-n) without defining which specific commands should cause these one or more actions to be performed at the corresponding service 300. Plugin developers can then later define the relevant command input(s) by mapping control elements (e.g., voice, gesture, touches, etc.) onto the defined one or more actions. Alternatively, or in addition, the virtual assistant system 10 may recommend one or more specific command inputs to use in specific situations based on experiences with other plugins 220. These command inputs can also be fine-tuned, as well as adapted, based on user behavior. As an example, a plugin developer for a music player plugin 220 can program relevant actions, e.g., change volume, change music being played, etc., while developing the plugin 220. The plugin developer may then later program the relevant command inputs, for example, a thumbs-up to increase volume, an icon touch gesture to change music, etc. Alternatively, the plugin 220 may be provided to the virtual assistant system 10 without specific command inputs defined, and the virtual assistant system 10 may suggest or provide command inputs. For example, if the virtual assistant system 10 has adaptively learned from other plugins 220a-n a specific gesture that a user typically uses to raise volume, the virtual assistant system 10 can suggest or supply that gesture to the music player plugin 220 in the above example to correspond to the command input to raise volume.

In some cases, the control elements that come to mean certain actions by plugins 220 or by the virtual assistant system 10 will also be adapted based on subconscious user behavior. If the user consistently does some things unconsciously, the virtual assistant system 10 may adapt to the user based on that behavior. For example, if a user consistently attempts to move sideways in a street-view type virtual walk through a city, the virtual assistant system 10 might observe this attempt to move and make such sideways motion a supported gesture corresponding to that action. This interpretation of command inputs can also be context dependent. For example, gestures that correspond to one or more controls for one or more services when user A is accompanied by user B might correspond to one or more different controls for one or more services when user A is instead accompanied by user C. Gestures that correspond to one or more controls when a user is in a citywalk plugin 220 might correspond to one or more different controls when the same user is using another plugin 220 to virtually fly over an oceanscape. Control elements can also have different meanings within a single plugin 220, for different internal contexts within the plugin 220. For example, for the plugin 220 providing a virtual walk through a city described above, a command input (e.g., a gesture or movement of the user's feet) may cause sideways movement when the user is on a virtual street, while the same command input may cause the user to enter a virtual building if the user is near a virtual building in the same virtual walk plugin 220. In this example, the virtual location of the user in the VR experience corresponds to a context used to interpret one or more command inputs.

The Client 110, corresponding to the user's interface with the virtual assistant system 10, can be personified in some way in a VR environment, and the user may be able to interact with it, e.g. talk or gesture to the client (consciously or unconsciously). For example, the Client 110 may be represented as a bird that the user perceives in the VR environment, and which the user can interact with directly, e.g., to give one or more command inputs and/or receive feedback from services 300. Presented in this fashion, a particular user's Client 110 may be perceivable only by that user, or alternatively may be perceivable by one or more other users participating in the same VR experience. A user's Client 110 can also be present and monitoring the user, for a limited duration or permanently, without being personified or even perceivable by the user at all. In other words, the user may not be consciously aware of their Client 110's presence in a VR session, although the Client 110 is still monitoring the user's actions and accepting command inputs based on the user's actions.

VR also allows for intuitive clarification of command inputs. When a user performs a command input that is not understood or may be incorrectly understood by the virtual assistant system 10, the user can resort to a graphical system, for example a display of selectable icons, that can help the system adapt and learn the command inputs that were not understood.

It is possible that different users who are present together in a common VR session may have different views or experiences of the same situation. For example, a user might pick a movie from their movie service 300a (for example, Hulu Plus™) and share the movie with another user (for example, by making a command input to control the virtual assistant system 10 to share the movie with the other user). The other user, receiving the shared movie, may have a different movie service 300b (for example, Netflix™) and could check the availability of the shared movie in this service 300b.

In this situation, data corresponding to the shared movie may be represented as one or more semantic atoms 1000. This data (the movie in this case) may then be mapped between services 300a-n, through the corresponding plugins 220a-n. A user can also share data expressed as one or more semantic atoms 1000 with another user. The other user can then translate this data into their respective services 300a-n easily.

It is also possible that the very session environment that two or more users are sharing is constructed using such transfers of data via semantic atoms 1000. For example, the specific color setting(s), scenery, audio background(s) and other aspects of the experience might be constructed by multiple VR systems exchanging semantic atoms 1000 via the assistant server 200, which then composes the information included in the atoms 1000 together into a single session environment. For this purpose, there could be multiple instances of the assistant server 200 running in the different users' VR systems, e.g., each user may have their own assistant server 200a-n, in communication with one or more other users' assistant server(s) 200a-n in the manner described above.

There are also scenarios where in a single VR session with one user, the user is interacting with the virtual assistant system 10 and moving data expressed as semantic atoms 1000 across services 300a-n. For instance, the user might look up an article of clothing on Pinterest™ (through a plugin 220a corresponding to Pinterest™) and then use that article of clothing to find and preview similar items on Nordstrom™ (through a plugin 220b corresponding to Nordstrom™) with ease. The user might even build a collection of items on one service 300, for instance, and then that list could get distributed across several other services 300a-n. For instance, over some period of time on Rotten Tomatoes™ a user might assemble a list of movies they wish to watch. This list of movies could then be distributed across movie services, e.g. Netflix™, Hulu Plus™ Amazon Instant™ and other services, based on the availability of movies in the respective services 300a-n. Such lists of items (movies in this example) can also be collaboratively built by multiple people working together.

Semantic atoms 1000 are also important in order to ensure seamless experiences as users exit one plugin 220 (corresponding to a VR experience designed by one developer) and enter another plugin 220 (corresponding to another VR experience designed by another or the same developer). With a conventional electronic device, for example a smartphone, a user transitions between services 300a-n (e.g. apps on the smartphone) by consciously stopping one service 300a, returning to a list of available services 300a-n (e.g. a "home screen") and selecting a new service 300b to run.

While this form of interface is acceptable for conventional electronics, it does not lead to an immersive VR experience. According to the conventional approach, a user in a VR session who wants to change between services 300a-n, for example different VR environments, must stop one VR session and start a new session with the new environment. This transition can break the continuity of a user's VR experience, since the user must stop one virtual reality experience completely in order to start another virtual reality experience. Furthermore, in starting a new VR session in a new VR environment, the user frequently must adjust to the new environment, e.g., establish their preferences and settings all over again. This adjustment can also break the user's sense of a continuous virtual experience. Exemplary embodiments of the virtual assistant system 10 may address this problem. Rather than force a user to step out of a VR experience in order to switch between services 300a-n, the virtual assistant system 10 described herein may allow a user to transit seamlessly between services 300a-n.

To establish such a seamless experience, the user's context and other elements which are relevant to the user's experience in one plugin can be shared with or provided to other plugins 220 as one or more semantic atoms 1000. For instance, a user who is walking down a virtual street in VR according to a first plugin 220a can climb into a virtual spaceship that is positioned on the virtual street, having been provided to the first plugin 220a by another, second plugin 220b corresponding to the spaceship, in the form of the semantic atoms 1000. Data from the first plugin 220a can be expressed as semantic atoms 1000 and shared with or provided to the second plugin 220b. Once the user has virtually climbed into the virtual spaceship, the user can then control the virtual spaceship in VR, for example, taking off, and the user has then actually transitioned to using the second plugin 220b, while all being performed seamlessly. In the user's perception, the user has had a continuous VR experience in which the user has walked down a virtual street, climbed into a virtual spaceship, and taken off in the virtual spaceship. This continuous VR experience is possible because the virtual assistant system 10 can manage the interactions between plugins 220a-n via semantic atoms 1000. This use of semantic atoms 1000 is especially important with respect to managing a user's VR experience.

In fact, there could be several VR experiences a user may look at at any point within a plugin 220 providing a VR experience, and each one of these VR experiences may correspond to VR experiences provided by different plugins 220a-n. When the user enters one of these VR experiences, any relevant data may be shared with or provided to the new plugin 220a as one or more semantic atoms 1000. This data may also be associated with user authority which may be extended to another plugin 220b, as well as with payment instruments which may travel with the user, i.e. the authority to use the payment instruments (e.g. charge transactions to the payment instruments) may accompany the user as the user moves between VR experiences. This transfer of relevant data between plugins 220a-n allows a user to combine VR experiences, provided by one or more plugin developers, into a single, seamless VR experience.

Data expressed as semantic atoms 1000 can also contain information about a user's current status, e.g. with respect to rewards programs or the user's achievement of some kind of status. Atoms 1000 representing data about the user's status can then be shared between or provided to other plugins 220a-n easily. Each plugin 220 will have its own definition of what a particular status means. Sharing or providing data about user statuses allows users to build on past experiences between plugins 220a-n. For example, one or more users may move their intensive play in a first VR game to a second VR game, to give the one or more users a higher starting point in the second VR game.

If data represented as one or more semantic atoms 1000 is stored in the virtual assistant system 10, it is also possible that people engage in VR sessions at disparate times but are able to use data that has been previously obtained from services 300a-n by other users. These users may then provide further data in the form of one or more additional semantic atoms 1000.

Exemplary embodiments of the present general inventive concept may also include augmented reality ("AR"). AR is related to VR, in that the user is presented with a virtual environment. The primary difference between AR and VR is that the user may still perceive their immediate surroundings, only additional graphics or other overlays may be provided. For example, a user trying to follow directions to a destination may perceive an arrow on the ground, guiding the user towards the destination. It will be understood that the inventive concepts presented herein are equally applicable to AR as to VR.

An AR experience may be provided, for example, through glasses that allow the user to see normally but also display images in the user's field of view. Alternatively, or in addition, the user may be watching for example a real-time or time-delayed camera feed, in which additional elements are displayed for viewing. An AR experience may also provide additional data to one or more users' other senses, for example via audio signals or haptic feedback.

Much like VR, the interpretation of command inputs and the actions performed in AR may depend on the accompanying context. In AR, however the contexts can include the user's immediate environment. As such, the virtual assistant system 10 may include or be connected to, for example, cameras and other sensors that detect the user's surroundings and allow the virtual assistant system 10 to react thereto. As an example, if there is an intruder in the user's home, a camera of an AR experience—such as a camera included in the glasses described above—may capture an image of the invader's face, and report it to the authorities. This image capture and report function may be performed in response to a conscious or unconscious action on the part of the user.

As will now be described in more detail while referring to FIG. 1A and FIG. 15, a user of the mobile device 100 may share access to the assistant server 200 (and hence the virtual assistant system 10) to allow other users to control services 300a-n within the virtual assistant system 10 and therefore already being controlled by the user sharing the access. Thus, a user (at mobile device 100) can share semantic atoms 1000 with other users through the other users' respective mobile devices 100a-n. Accordingly, any desired control of a service 300 by the user of the mobile device 100 can be shared with another user through the other user's mobile device 100a (see dotted lines "sharing access") by "friending" the other user's mobile device 100a, as illustrated in FIG. 1A. This sharing (or "friending") of access to control services 300a-n can be provided once the user (mobile device 100) has a way of contacting the other user, for example, via email, LinkedIn™, Facebook™, Twitter™, etc. In other words, once a user of the mobile device 100 within the virtual assistant system 10 is able to communicate with another user via another user's mobile device 100a-n through any form of communication, the user (mobile device 100) can send an "offer" to share access to the assistant server 200 with the other users' mobile devices 100a-n via this form of communication.

Sharing in particular may be enabled through messaging, in which a user may request access from another user and be granted access through a reply message. These messages may also include atoms 1000 representing, e.g., the access granted.

Once the other user(s) accepts the offer of access to the user's assistant server 200, the other user(s) may be provided with the same control over all external services 300a-n as the user of the mobile device 100 possesses through the assistant server 200. Moreover, as described in more detail below, the shared access with other users may be limited in many aspects, such as, for example, with respect to the level of control, the location in which the other user(s) is situated, a time frame in which the user allows other user(s) to maintain the shared access, etc. There are a vast number of ways in which access sharing to other users may be controlled/limited based on the desired setup of the virtual assistant system 10 by either the developer of the system 10 or the user's instructions at a later time after the original setup of the system 10.

The shared access allows the other users to control external services 300a-n through the original user's assistant server 200 and to the level at which the original user allows the shared (or "friended") user to have access.

Figure 15:
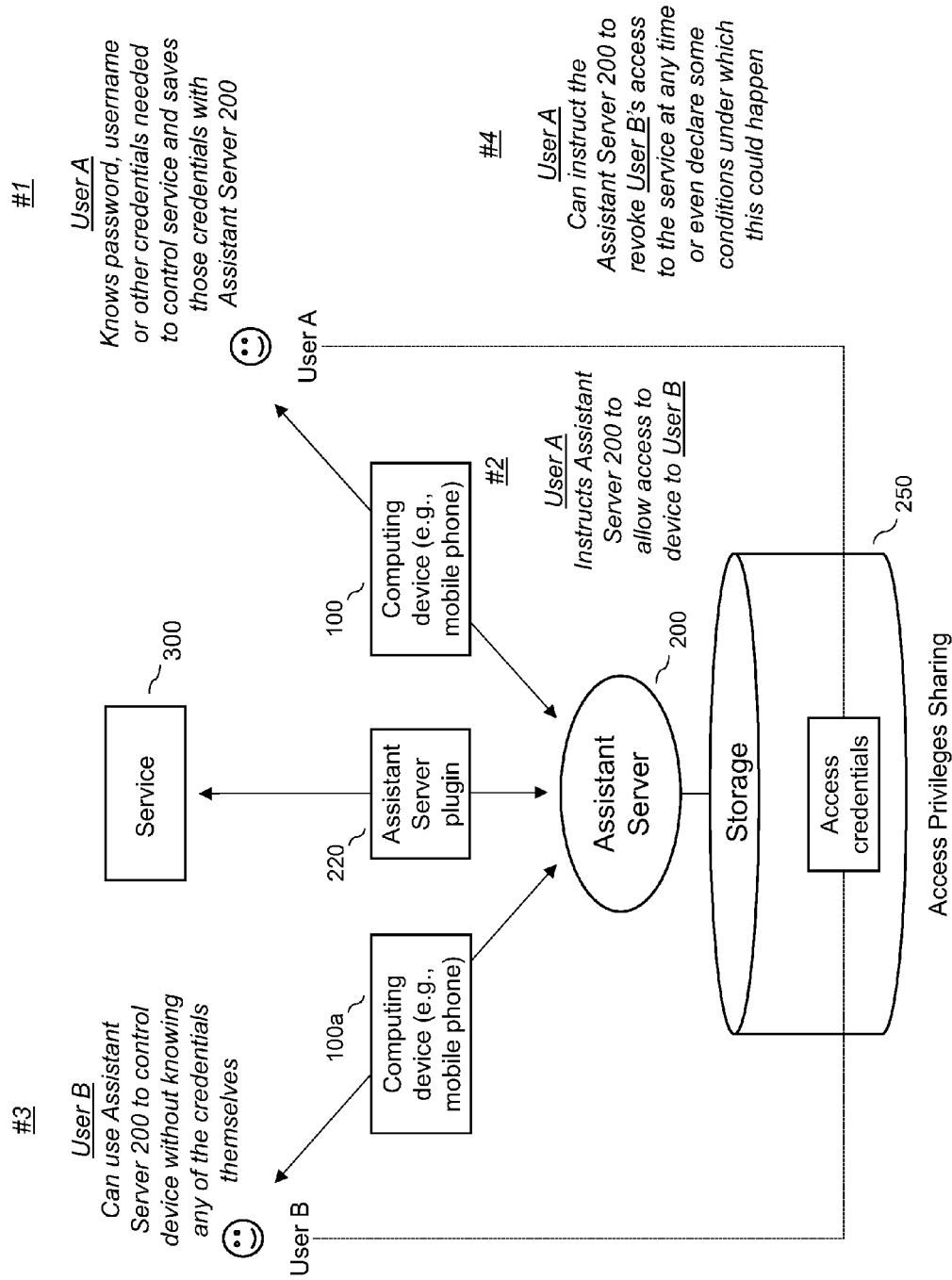
FIG. 15 is a diagram illustrating access privilege sharing of the virtual assistant system, according to an exemplary embodiment of the present general inventive concept.

Furthermore, as illustrated in FIG. 15, at #1, although the original user A (the user making the offer) must initially provide a username/security ID and password (or "access credentials") in order to access an external service 300, the user(s) B who becomes "friended" (receive shared access) does not need to enter this security ID or password. Therefore the original user A is never required to share these access credentials with the other user(s) B being "friended." Accordingly, when user A instructs the assistant server 200 to allow access to a service 300 (see #2 of FIG. 15), the user B receiving the shared access can then control the service 300a without knowing the access credentials input by user A, as pointed out at #3 of FIG. 15. Thus, no access credentials need to be exposed or shared with any other users in order to "friend" another user(s) and allow the other user(s) to have a full or limited access to any service 300, or even the assistant server 200. Furthermore, the original user A can instruct the assistant server 200 to revoke user B's access to the service 300 at any time, or alternatively can declare specific conditions under which revocation of access to other users, i.e., user B, can occur.

In addition to keeping the ID and password (or other credentials) confidential from other users, since the ID and password remain only at the assistant server 200, and therefore never need to be communicated wirelessly, the user's IDs and passwords (or other credentials) can safely remain confidential to the original user A (at mobile device 100). Accordingly, illegal access, impermissible access and misuse of such credentials via a wireless transmission interception or other type of compromised security can be entirely prevented.

Thus, the assistant server 200 maintains all credentials (ID, passwords, etc.) that give authority to access and use the underlying services 300a-n. These credentials are maintained by the assistant server 200 at the storage 250 that is connected either directly or indirectly to the assistant server 200. When a plugin 220 is created at the assistant server 200, and a user begins to access this plugin 220 for the first time in order to have the assistant server 200 carry out various actions with the corresponding service 300, the user first needs to provide the required credentials for the service 300 to the assistant server 200 in some form. These credentials can be collected by the assistant server 200 in one of many means: through a screen, keyboard, scanner, mouse, camera, microphone or hand-held or wearable device (such as armband or facewear or fingerwear, etc.) or another peripheral hardware system or systems connected to or in communication with the assistant server 200.

As an example, the user A (at mobile device 100) may provide a username and password for an email service to the assistant server 200. Now the assistant server 200 becomes capable of accessing and using the service via the Internet, Bluetooth, Optical or visual signaling, audio signaling (through an audio speaker or other mechanism), tactile or other mechanical signaling using a device such as a vibration unit, WiFi, USB, FireWire, HDMI or through other means on the user's behalf. The user can now instruct the assistant server 200 to share access to the service 300 with another user(s) B as well. As described above, this instruction by user A enables another user(s) B to access the service 300 via the assistant server 200, and only through the assistant server 200. As far as the underlying service 300 (e.g., email) is concerned, it is being accessed by the original user (user A) either through the assistant server 200 or through the mobile device 100 if the assistant server 200 and the mobile device 100 are provided together in one hardware, and only the assistant server 200 is aware that the service 300 is, in fact, being accessed by another user (user B).

Another example of this secured form of sharing is described as follows, while still referring to FIG. 15: the original user A establishes a service 300 in the assistant server 200 using the assistant interface 110, e.g., the original user A may establish a certain set of lights as an external service 300 to be accessed and controlled wirelessly. The user may then provide the assistant server 200 necessary information required to access and operate the lights. This information could include, for example, a password, username, and an IP address of the lights. The plugin engineer initially specifies which credentials are needed for a user to start using that type of external service 300 with the assistant server 200. Now the lights exist as the external service 300 in which the assistant server 200 can access. This access control is owned only by that user A. This user A can now instruct the assistant server 200 to "friend" those lights (service 300) to any other user B as desired. This sharing of access can be accomplished in various different ways as described herein. For example, user A may instruct the assistant server 200 the share access by contacting user B and offering user B to join the virtual assistant system 10, or can make a gesture toward the user B if user B is within an area in which a gesture can signal user B, or user A can make a gesture that signifies allowing access, at which point a camera detects a user B in the vicinity, etc. The other user(s) B can now see the external service 300 via the assistant server 200 and use the external service 300. The other user B can, for example, turn these lights on and off, and change the color of these lights. However, as described above, this other user B does not possess the username, password or IP address (or other credentials as originally created by the engineer) of the lights and has no means of operating the external service 300 except through the assistant server 200.

At any time the owner user A can instruct the assistant server 200 to "unfriend" the friended user B (revoke access) from the external service 300. If the owner user A revokes access to the other user(s) B, the other user(s) B ceases to be able to operate the lights or, in some cases, user B may even be blocked from being able to see these lights in any fashion at all. That is, user B's mobile device 100a may be blocked from even being aware of the lights.

A user may also set criteria by which "unfriending" occurs automatically. Such criteria can be a time limit of access shared with user B, a location condition placed on user B, and so on. For example, services may be shared with the other user B for a preset amount of time, or until the other user leaves a particular area.

An alternative exemplary embodiment of sharing access involves tossing semantic atoms 1000 between different users. For example, if a user is in a library in France that requires a password and credit payments for access to the WiFi, the user can send a request from a mobile device 100a (for example, the user's tablet computer), to all the user's friends (within Gmail™, Facebook™, MySpace™, etc.) to verify whether any of the user's friends have ever been in that library, whether they accessed the WiFi, and whether they have remaining payment credits that they are able to share. Then, the user can send a request to one of the friends for access to the WiFi in the library in France, even if the friend is in a different country. The friend can then either provide the WiFi access manually by "tossing" a semantic atom 1000 including their password to access the WiFi to the user. Alternatively, the friend could have preset the access to be provided upon request, i.e., preset tossing the semantic atom 1000 with the password to the user. In either case, the user receiving the WiFi access never needs to know the password to access the WiFi, as the information is sent as a semantic atom 1000 from the friend to the user. The received semantic atom 1000 can appear as an icon, attachment, image, file, email, chat, etc., but is not limited thereto, and allows the user to automatically access the WiFi upon receipt of the semantic atom 1000, or manually access the WiFi upon selection of the semantic atom 1000, without having any knowledge of the WiFi password.

Figure 16:
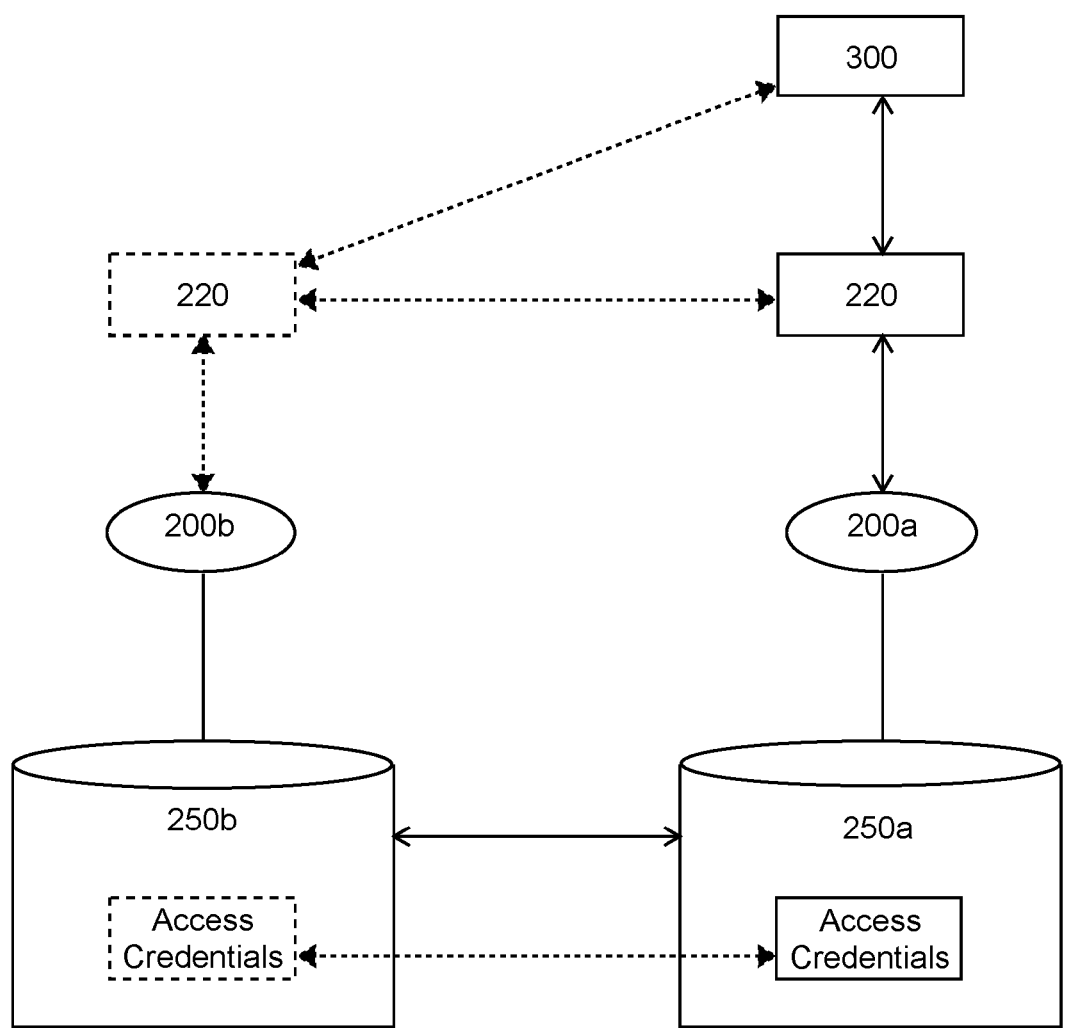
FIG. 16 is a diagram illustrating access privilege sharing between assistant servers, according to an exemplary embodiment of the present general inventive concept.

FIG. 16 illustrates an exemplary embodiment of the present general inventive concept in which access to a service 300 may be shared between different assistant servers 200, for example if there are multiple instances of the assistant server 200. As illustrated in FIG. 16, User A having a first assistant server 200a may share access to a service 300 with User B having a second assistant server 200b. The access control information (e.g., username, passwords, etc.) is contained in the first assistant server 200a (specifically, storage 250a corresponding to the first assistant server 200a) under User A's control. If access is shared with User B, User B's assistant server 200b may access the service 300 through User A's assistant server 200a, and the access credentials and plugin 220 stored thereon. Furthermore, User A can specify whether they want User B to continue to have access should the first assistant server 200a be turned off or otherwise disconnected from assistant server 200b. If User A determines that the access should continue, the access information stored in assistant server 200a, as well as the corresponding plugin 220, may be mirrored in assistant server 200b (specifically, in storage 250b corresponding to assistant server 200b), but then removed should User A revoke access to the shared service 300. Similarly to the above examples in which there is one assistant server 200 shared by two users, when this access control information is mirrored in User B's assistant server, User B is unaware of the details of such access control information. For example, User B does not know User A's username and passwords to access the shared service(s) 300.

There are an extensive number of other applications that can be implemented by the virtual assistant system 10. Controlling a set of home services 300a-n are one obvious application. If someone visits a user's home, the host (the user of the virtual assistant system 10) can instruct the virtual assistant system 10 to give the guest courtesy access to all or a large subset of the connected services 300a-n in the user's home (lights, thermostat, window blinds, alarm system, phone system, WiFi hub, entertainment systems, etc.) as long as the users being "friended" are within the physical confines of the home. This could also be done based on calendar invites. In other words, along with inviting others to a user's home, the user owning the home could also create a formal invite to the visiting users to be "friended" which specifies access to home facilities during the time of the visit. This formal invite could be sent via any form of messaging, such as, for example, e-mail, text message, etc. Messaging shared access in this manner is a form of "actionable messaging." The atom 1000 corresponding to the shared access (including, for example, access credentials) may be sent as a message to another user, potentially with other message content, e.g., text inviting the receiving user to the sharing user's home.

This limited access sharing can also be implemented in a business context. When someone joins a team, for example, the virtual assistant system 10 can extend access to various tools and services to this person via the assistant server 200. When this person ceases being part of the team, this access can be revoked. This revocation can be performed by simply requesting a list of those members provided with access, and then selecting among certain members in which the user requests access to be revoked.

The assistant server 200 can also provide this access based on payments being made. For example, a visitor to a movie theater can have access to a soda fountain via the theater's assistant server 200 for as long as a movie is playing. This time based access sharing can be automatically revoked at any designated time, i.e., at completion of the movie.

As another example, a user A (of mobile device 100) can share information from all his/her health devices with his/her doctor. The doctor, being user B, can be provided access to all health information stored in the storage 250 of the assistant server 200.

As described above, the shared access offered by the initiating user A of the mobile device 100 to other users B can be completely controlled by the user A of the initiating mobile device 100 such that access by any of the shared access users B can be terminated at any time by the owner user A, as well as being limited to a certain level of control, a certain time period of control, control limited to within a certain area/location, etc.

Sharing can also be predictive in nature, where the predictive rules and algorithms may or may not be humanly readable, and are saved in a storage 250 connected to or in communication with the assistant server 200, where they are running. Alternatively, as pointed out above, under certain situations the predictive rules and algorithms related to the access sharing can be running on the mobile device 100, and therefore stored in the storage unit 140. For example, if a certain set of contexts usually result in a user A sharing access to some services with another user B, the assistant server 200 may recognize this contextual pattern and in the future perform this sharing automatically. The assistant server 200 may also present the owner user A with the choice as to whether the contextual pattern should be determined and applied automatically, or whether the user A should make this decision. For example, the assistant server 200 can alert the user A that the assistant server 200 intends to share access to the lights or other services 300a-n based on a recognized contextual historic pattern, such as sharing a thermostat control, a television, etc., with a guest user B unless the user A explicitly wants to refuse such access. At this point the user A can select an option provided by the assistant server 200 by touching an icon on the display 150, making a gesture to a sensor 160 within the mobile device 100, and provide an input command via another form of input as described herein.

As pointed out above, sharing is also possible to perform at varying levels. For example, an online commerce service like Amazon™ has multiple things one can do with it. Ratings and pricing of various items can be reviewed in a personalized way ("this is the rating for other readers like you" or "as a prime member, you don't pay for shipping for this item"), items can be added to a wish list, items can be added to the Amazon™ shopping cart and purchases can be made. It is possible to create subset services where items can be reviewed and placed in the Amazon™ shopping cart but purchases cannot be completed. It is possible to see how a parent (user A) can provide their children (user B) with sharing an Amazon™ account to the extent of putting things in the Amazon™ shopping cart but not actually making the purchase. This way the parent (user A) can review all items the children (user B) want before the purchase is made. In other words, access sharing can apply to even subsets of a plugin's functionality rather than all of its functionality. Similarly, other rules can also be crafted. A parent can limit his/her children to change TV channels within certain values, while the parent (User A) can go to any channel desired via the assistant server 200.

This limited and context-based sharing has other applications also. For example, a city can allow an average citizen to operate doors or other systems in emergency situations where it is normally prohibited to them, and can only be operated by a specialist or normally-authorized personnel. Access can also be extended to specific groups of people. Based on these people being added to a specific user group, pregnant women (in a business, hospital, shopping mall or community), for example, may be given access to certain services 300a-n which are inaccessible to others for the duration of their pregnancy. Users whose electric cars break down in a specific way, for example, may have access to loaner cars in unmanned car parks where any normal user does not. Access to the user's broken-down car may predictively be granted to a repairman who heads out to the car. Here, the users A, via the mobile device(s) 100, will extend specific permissions to the repairman's mobile device 100a.

Social, family and community connections will be inferable from sharing patterns as well. This too can be used to make predictive sharing happen. If all home devices are being shared by one user A with another user(s) B, it is likely that the next home device to be registered at user A's home will also be shared with the same other user(s) B. Such patterns will be saved in the storage 250 and will be inferred using analytic algorithms created within the assistant server platform 210 or obtained as patterns that can be imported into the assistant server platform 210 from other software programs running on other servers.

Note that users can quickly forget their usernames and passwords to various services where access via the assistant server 200 suffices. An owning user A of mobile device 100 can also designate another user B as having the power to share access with yet other users. This can be implemented, for example, among members of a single household. One user can purchase a TV and interface it with the assistant server 200, and then provide access rights to other family members (users B), who can then each extend access to this TV (service 300) as-needed to their respective guests.

The assistant server 200 can also transfer ownership of services from one user A to another. This allows, for example, user A to sell their house to another person and transfer all services 300a-n within the house to that person. Similarly, a person (user A) changing offices can transfer ownership of all services 300a-n from themselves to another user B, where user A can then take ownership of other services 300a-n associated with a new office in which user A moves into. As pointed out above, services can be granted based on certain conditions also. For example, if a person unfortunately deceases, then their services 300a-n can automatically be turned over to their relevant family members or other desired people.

As pointed out above, gestures are a form of commands used with the virtual assistant system 10. Gestures are an easy way to operate the authority sharing features described above. The use of gestures—including eye movement or non-movement, eye brow movement, a gaze and a facial expression and all other visually-detected body movements (or non-movement) to extend or revoke authority of usage to users or groups of users—can be quite powerful, and can be performed using the virtual assistant system 10 as described herein. However, it will be understood that, as noted above, any other command input, for example, icon touches or spoken commands, may be used in place of gestures.

Referring to FIG. 17, sharing access to control of a set of lights (external service 300) to a user B could be as simple as the owner user A pointing to the lights and then making a gesture representing sharing (see Time #1) this access with the other user B. As a result, the assistant server 200 can grant access to user B. More specifically, in such an environment where a user A regularly works or lives, for example, a set of sensors, such as a camera or other type of photo-detecting device that are capable of capturing information about a user's movements, can be set up within the controlled environment. These sensors can be configured to have their own form of an assistant interface 110a-n such that when these sensors (see FIG. 17) detect a gesture by user A to share access to control services 300a-n such as light bulbs, etc., within the controlled environment, this gesture command can be translated at the relevant sensor into one or more semantic atoms 1000 and provided directly to the assistant server 200. As a result, the assistant server 200 can share access with a user B as instructed by the user A via a gesture command input representing sharing access. As noted above, FIG. 17 also illustrates an exemplary embodiment of stationary "mobile" devices 100, with the various sensors having assistant interfaces 110a-n.

For higher security situations, a camera or other type image sensor or other type sensor may be able to detect the actual hand or fingerprints of the user A in order to determine that it is in fact user A that is instructing the assistant server 200 to share access to another user B. Alternatively, the user A may have a wearable type device or accelerometer that detects a gesture made by user A. Moreover, when the sensor detects user B via the camera or other type recognition device, the assistant server 200 can store any predetermined detected character trait of user B and store this information within the storage 250 so that shared access may be provided to user B during later visits to such an environment.

Still referring to FIG. 17, revoking control to a user B can be as simple as making a gesture for "unshare" towards user B (see Time #2), which leads the assistant server 200 to revoke access to the device to user B. Alternatively, revoking can be performed by other gestures, such as, for example, making the same set of gestures as those of sharing access to user B, and then making a chopping gesture. This is merely an example to illustrate the various types of gestures that can be programmed into or learned by the assistant server 200. These gestures by user A can also be captured by a camera or other photo-detecting or sensing device that is capable of capturing information about movements of user A, which is in turn connected to the user's mobile device 100. Such gestures may also be captured by wearable, held or other devices that detect movement by using accelerometer hardware or other movement-tracking hardware, or even eye-tracking, lip-tracking or facial-tracking systems.

Alternatively, as described previously, user A may request a recent list of users B in which access has been shared. Once this list is provided to user A at the user interface 150 of mobile device 100 by the assistant server 200, user A may choose any user(s) B on the list provided at the user interface 150 and instruct the assistant server 200 through the user interface 150 to revoke future access.

It is also possible to set-up rules where access is extended temporarily to another user B and then must be extended periodically (or upon the occurrence of an event, such as someone departing from a geo-fenced area) with the use of a gesture. In this type of access sharing, if the owning user A makes such a gesture then access can be continued. If the owning user A fails to make the gesture, then access lapses.

Gestures may also be involuntary or be made in a way of which a user B is unaware. For example, a commercial establishment where products are sold may make door locks to certain restrooms operate for customers or prospective customers (i.e., user(s) B) who spend specific amounts of time in certain areas of the establishment, but not to others. Such a commercial establishment may even allow goods contained in secured closets or display cases to become accessible to certain customers based on gestures and movement information, which are not available to others, by granting them access to open the securing enclosures where others are not granted such access.

In geo-fencing and other such applications, locations can be determined by means of a GPS unit, WiFi unit, Bluetooth facility, location-broadcasting buoys, IP addresses, NFC, etc., which are connected to or in communication with the assistant server 200. Proximity-detection to location measuring sensing devices which may be embedded in automobiles, household objects, office objects and other objects can also measure location. Time can also be an element of the access determining means which can be setup and measured by a similar such computing device. The determining means of access can also include the sequence of user usages of the assistant server 200.

The virtual assistant system 10 described herein also provides the ability for users to have secret gestures for revoking and granting access to control external services 300a-n. For example, in a home break-in situation, a parent User A may grant the right to a child to summon the police using the home alarm via a secret gesture (where the child may not normally have this right).

These gestures may also operate in conjunction with icon-touches and voiced commands. The user A, for instance, might make a gesture that means 'share', then user A may recite the names of all the services he/she intends to share. A voice sensing device can detect the named services and accordingly provide access for these services. Then user A can point at the receiving user B as described above.

These gestures may also be used in situations where a subset of users from a large subset of users have to be granted or ungranted access to a service (or set of services).

An example of such a situation is where a decision needs to be made as to who has access to a given cash register in a store from among a hundred sales associates. In such a situation, simply laying out a list of names or photos of the associates and pointing at the particular ones to whom access should be granted can be one mechanism for granting a subset of users particular access. Another mechanism can be through gaze-tracking where the user A looks at the particular ones who should be granted provisional access longer than the amount of time user A looks at the ones who should not be granted access. Such gestures can be conscious or unconscious on the part of user A.

Similarly, a situation can occur in the reverse where there are a large set of services and a decision needs to be rapidly made as to which services access should be provided (or access revoked from) for a user or a set of users. Gestures by the user A—conscious or unconscious—can be used in this situation as well.

Gestures may also be used to seek access to services 300a-n by users seeking shared access (i.e., a user B seeking access in which the user A with access rights). This enables a "silent" conversation where one user seeks access to a given service 300 with one set of gestures and is granted such access—either by an owner user A with another set of gestures or through some decision made programmatically (algorithmically) by the assistant server 200 and sensor device combination which is observing the gestured request. These algorithms that determine such shared access can be software programs or parts of software programs running as part of the assistant server 200 together with other programs running within the assistant server platform 210.

In an exemplary embodiment of the virtual assistant system 10 providing a virtual reality experience, a user may share authority to control one or more services 300 with other users. Similarly, a user can choose to share authority over different aspects of their virtual reality experience with one or more other users for the duration of the VR session, for other lengths of time, or subject to other conditions. For example, two or more users can participate together in a game (corresponding to a service 300a) where one user has the authority to play the game and extends that authority to other users for a limited time basis. As another example, multiple users can shop together using the authority (corresponding to a shopping account) of one of the users in a virtual shopping experience to interact and buy from several merchants (corresponding to one or more services 300a-n).

Sharing authority can be very important in business-related VR sessions. For example, a meeting could be held in a VR session where the participants are reviewing an asset, e.g. a document. The owner of that asset can choose to extend viewing authority to some participants and editing authority to others. The owner can even choose to have different levels of authority (e.g., viewing authority, editing authority, etc.) be presented to the different participants which can be revoked at any time of the owner's choosing.

One important distinction virtual reality will often have from other environments is that it may be quite social and often involve collaborative scenarios. Often authority will need to be pooled to make something happen. That is, users can concurrently share their respective authority with each other, so that the users are all granted the sum total of the authority. For example, there could be games where different users have paid for different segments of a game (or multiple interconnected games) but can extend the authority to play in those segments to one another. In those situations, the virtual assistant system 10 can allow the authority to be pooled, thereby allowing every user to play the authorized segments of the game. As discussed above, sometimes combined actions can be constructed that involve authority from multiple users also.

Authority trades are also possible, where the virtual assistant system 10 arranges a simultaneous swap of authority over some underlying asset, for example the authority to issue commands to one or more services 300a-n, permanently or temporarily, based on an agreement between two or more users. These authority swaps can be simple trades between two users, but complex trades can also be arranged between more than two parties. In the same way, a user may permanently transfer the authority over an underlying asset to another user without receiving anything in return, or in exchange for a transfer of payment. Following such a transfer of authority, the original user loses their authority over the underlying asset. In this way, sales or transfers of access or authority can be made in virtual reality. For example, a user selling their home can transfer their authority over the home's thermostat to a buyer. The virtual assistant system 10 can also hold things (e.g., authority to issue commands to one or more services 300a-n) in escrow to ensure the transaction is completed properly.

A messaging session between two or more users may itself be a context for sharing authority. For example, a user in a messaging session can indicate to the virtual assistant system 10 that they are extending control over something (e.g., a service 300) to one or more other users within the medium in which the messaging session is being performed. This control could be temporary, permanent, or revocable upon user instruction or upon a certain context, e.g., upon the completion of a messaging session. For example, two users in a group chat session may desire to play a game of chess, using a service 300 that only one of the users has access rights to. The user with access rights could extend those access rights to the other user for the duration of the chat session, so that both users would have access rights to use the chess service during the chat session. As another example, a user can add a webcam view (corresponding to an output from a service 300) into a chat session which is only operational as long as the chat session lasts. This webcam view may not be directly related to the participants in the chat session, e.g., it may be a view different from that of a conventional video conference session. For example, the webcam view may be a view from a movable webcam (service 300) focused outward on a physical space that can then be manipulated by the users in the chat session to swivel or zoom. The owner of this webcam may extend authority to the other users in the chat session to control the webcam, e.g., by viewing the output and manipulating the view, without being required to also share access criteria, such as, for example, usernames and passwords.

A messaging session can further be a context used to limit the extension of authority. For example a presentation might be made available by a user to other users of a messaging session only as long as that messaging session lasts. Similarly, a user might be able to view a camera in a chat session with another user (or set of users) but not be able to view the camera anywhere else. Or the users may be able to view a presentation that has been shared in messaging when those users are messaging with the owner-user, but not at another time without the owner-user. Similarly, there may be services (for example songs or movies) that two or more users can use together inside a messaging session when one user is authorized, i.e., when one user has authority over the services, but have access to those services be denied to un-authorized users when such users are not accompanied by an authorized user. As another example of contextual extension of authority, a user may share authority for one or more services with members of a chat group as long as the user is a member of the chat group. If that authorized user leaves the chat group, any authority extended by that user to the other users in the chat for the one or more services may automatically lapse. This contextual extension of authority allows multiple users to pool authority. For example, a group of users may pool authority for a list of movies that the users individually have access to via a particular service 300a. When a user leaves that group, that user's authorized movies would no longer be accessible by the other users in the group.

Contextual extension and revocation of authority may also be driven by the content of the messaging session itself. If the virtual assistant system 10 is managing a messaging session, the client 110 could also be monitoring the content of the messaging for relevant commands, which may be forwarded to the assistant server 200 to carry out the associated actions. For example, a user in a messaging session might ask permission from another user to use a particular service 300a, e.g., "can I use the dropcam?", and this question could be translated into one or more semantic atoms 1000 by the assistant interface 110 and sent to the assistant server 200. The assistant server 200 could interpret this statement as a request to share access to the relevant service 300a, in this case the dropcam. If the owner of this service 300a responds with an unambiguous reply such as "sure," this reply would similarly be sent as one or more semantic atoms 1000 from the owner's assistant interface 110 to the assistant server 200, the assistant server 200 would understand this reply as granting the request, and accordingly authority for the service 300a can be automatically extended to the requesting user, without the need for a separate operation by either user. Similarly, if one of the users in the chat session asks "are you done using the dropcam?" and the user who was granted access replies affirmatively, e.g., "Yes, I am," the assistant server 200 can automatically revoke the access which was shared. Since sharing can be performed automatically based on the content of the messaging session, users do not need to turn away (revert to another form of control) from messaging in order to separately control the virtual assistant system 10 to share access. In this manner, sharing access and control of services 300 may become a more seamless part of messaging.

Incorrect granting and revocation can also be addressed by the adaptive learning approach described above. If the user revokes authority as soon as such authority is granted, for instance, that is an indication to the virtual assistant system 10 that it overstepped in granting that authority.

This approach, of actions taken based on the content of messaging, can be extended to transactions as well. For example, if a first and a second user discuss watching a movie at a particular theatre, and the first user asks the second user "I have found the tickets but can you pay for them?" this question may be converted to one or more semantic atoms 1000 by the first user's assistant interface 110 and sent to the assistant server 200, which may interpret the question as a request for payment for a specific purpose (payment for tickets in this case). If the second user assents, for example by responding "sure," a selected payment instrument of the second user may be applied to the specific purpose, in this case purchasing the tickets. The assistant server 200 interprets the second user's response as agreement to the request of the first user, and therefore extends authority to the first user for the selected payment instrument for that amount of money and that specific purpose (buying the tickets).

This use of the messaging content as command inputs may be performed automatically or through conscious user interaction with the assistant server 200. In the examples given above, the assistant interface 110 included in the mobile device 100 may automatically translate perceived commands (e.g., questions and responses from the users) into one or more semantic atoms 1000 and forward the semantic atom(s) 1000 to the assistant server 200, which may automatically take the corresponding action. Alternatively, or in addition to such automatic responses, the users may send commands to the assistant server 200 through the medium of the messaging session. In this situation, the assistant server 200 is, in effect, a "participant" in the messaging session in that the assistant server 200 may receive messages (corresponding to commands from users) and also transmit messages (e.g. replies, outputs from services 300, etc.) within the messaging session. Multiple assistant servers 200a-n in communication with each other, constituting multiple instances of the assistant server 200, may also be participants in a messaging session, similarly to how services 300a-n may participate in messaging sessions.

Figure 18:
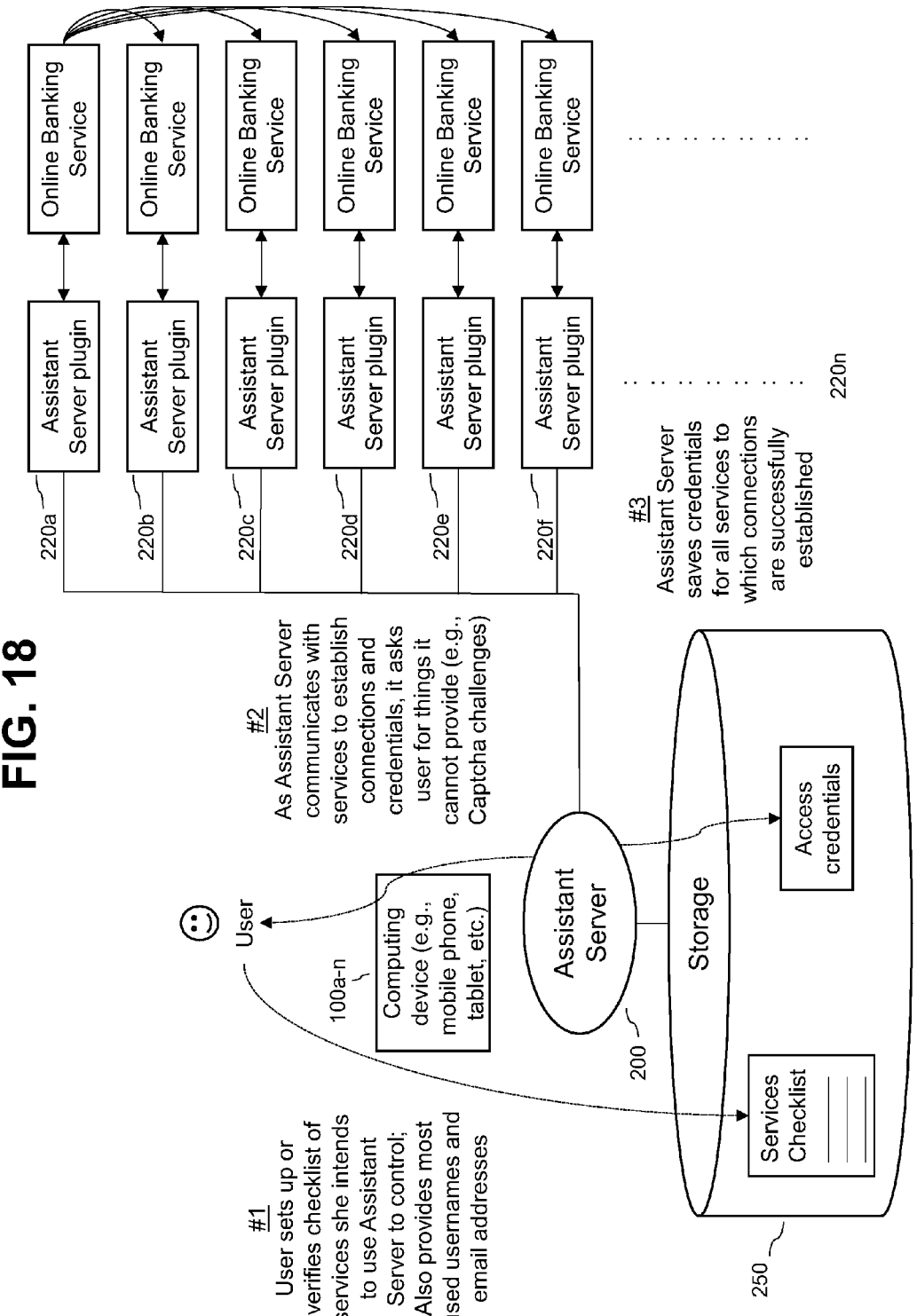
FIG. 18 is a diagram illustrating mass-addition of services to the virtual assistant system, according to an exemplary embodiment of the present general inventive concept.

Referring to FIG. 18, a user of the mobile device 100 can add, including a mass-addition, services to an assistant server 200 based on a questionnaire, survey or form-filling of credentials and other service-related data, as well as based on discovery.

More specifically, it is likely that when the assistant server 200 becomes established other users will want to provide all their individual account credentials to the assistant server 200 so the other users can rapidly establish connections to those services 300a-n. For example, a user can give his/her usernames and passwords to LinkedIn™, Yahoo™, Google™ Amazon™, Facebook™, etc., to the assistant server 200 at one sitting, which enables the assistant server 200 to systematically connect to these services 300a-n all quickly. This can be done by filling in a form that the assistant server 200 provides to the users. This form can be a spreadsheet, email form, fillable PDF, web-based form, a voice-based question and response session, or any other data collecting mechanism through which this type of information can be collected. The form can be delivered to the user via the Internet or via some other connection mechanism such as Bluetooth or NFC, or even physical mail or courier service.

The assistant server 200 can also take the user through a process where the user is asked for credentials to most common services 300a-n that the user is likely to be using— which is similar to filling out a survey. For example, the assistant server 200 can detect services 300a-n on the user's home network and then connect to them automatically by requesting the corresponding credentials when necessary. Information relating to these credentials and services 300a-n can be saved on a storage 250 that is connected to the assistant server 200.

Similarly, the assistant server 200 can actually take the user's emails and then probe most common services 300a-n with those emails to see if that user already has associated accounts. In this case, the user can provide various email addresses to the assistant server 200, which can save these email addresses and then use them to attempt to log into various web services and other services. If these users have forgotten their passwords, the assistant server 200 can initiate a password reset process (i.e., either by conducting the password reset process automatically or with the user's help if services like Recaptcha™ are involved, which require humans to recognize obfuscated letters and numbers) and revive those accounts and link them to the user's accounts. This also means that users may no longer have to come up with passwords. The assistant server 200 can come up with highly complex passwords which the user does not need to remember since the users are almost always going to access the underlying services 300*a-n* through the assistant server 200. These highly complex passwords may then be saved on the storage 250.

The assistant server 200 can also take a user through a process of establishing brand new accounts with various services 300*a-n* that are relevant to people similar to the user. This can have many applications. For example, the assistant server 200 can be used to establish a voting account in an election system for a citizen when they achieve a certain age. It can be used to enable the citizen to establish an account with bmw.com when they buy a BMW. The rules determining such new service setups can either be saved on the storage 250 or be communicated to the assistant server 200 by other services 300*a-n* that are able to communicate with the assistant server 200 over the Internet, WiFi, Bluetooth, NFC, USB or other mechanisms.

The virtual assistant system 10 can also facilitate connecting services 300*a-n* to each other. For example, if a user buys a video game system, the user may wish to connect it to a television. In this case, conventionally the user must use cables to perform an analog connection between the video game system and the television. Alternatively, if both the television and the video game system have wireless capabilities, the user has a wireless router, and the user is subscribed to an Internet Service Provider, then the user can wirelessly connect the video game system to the television by searching for the video game system on a menu screen of the television, for example, and then selecting the video game system to connect wirelessly to the television. This procedure may require searching through multiple menu screens of the television to locate the video game system on a user's home network, as well as potentially requiring the user to have knowledge of configuration/connectivity specifications of the devices that are to be interconnected. As such, the conventional procedures to connect two services (the video game system and the television in this example) cause inconvenience for the user.

However, the virtual assistant system 10 can provide the above interconnectivity without requiring the user to have an Internet Service Provider, a wireless router, or knowledge of configuration/connectivity specifications between the services. Also, the virtual assistant system 10 avoids the need for the user to search through multiple menu screens to find the desired service to perform the interconnection.

More specifically, when a user acquires a new service 300*a*, for example by purchasing a new device, plugin 220*a* corresponding to the service 300*a* can instantly be installed on the user's mobile device 100, or alternatively in the assistant server 200. This installation can occur manually by the user downloading the plugin 220*a*, e.g., from the Internet, and installing the plugin 220*a* on the mobile device 100 or assistant server 200. Alternatively, the plugin 220*a* can be sent via email, text message, another user's virtual assistant system 10, or any other type of communication method. For example, when purchasing the new service 300*a*, the user could simply provide an email address to the manufacturer for registration, which would in return automatically send the user the plugin 220*a* corresponding to the service 300. Furthermore, if the mobile device 100 and/or assistant server 200 is instructed where to find the plugin 220*a* (i.e., where the plugin 220*a* is stored), the mobile device 100 and/or assistant server 200 may retrieve and install the plugin 220*a* without the user needing to separately send the plugin 220*a* to the virtual assistant system 10.

Then, when the plugin 220*a* is installed in the mobile device 100 or assistant server 200, an icon representing the new service 300*a* (e.g., a video game system) may appear, for example on the user interface 150 of the mobile device 100. The icon could automatically appear specifically in a "Services" menu screen of the mobile device 100, for example.

In order to connect the new service 300*a* to another service 300*b* (for example, a television, which may already be represented within the mobile device 100, for example by an icon installed therein), the user may make the relevant command input, which may be intuitive, and require no detailed knowledge of connectivity. This command input could be any type of action that would make it appear that the services 300*a* and 300*b* are linked. For example, the user could simply drag an icon corresponding to a video game system to an icon representing a television on the user interface 150 of the mobile device 100. The virtual assistant system 10 may interpret this command input as a command to connect the two services 300*a* and 300*b*. In this example, the video game system would be wirelessly connected to the television, so that communication could be performed wirelessly therebetween. More specifically, since the video game system and the television both communicate in their own proprietary languages, installation of plugins 220*a* and 220*b* respectively corresponding to the video game system (service 300*a*) and the television (service 300*b*) allows the corresponding proprietary languages of the services 300*a* and 300*b* to be translated into semantic atoms 1000 via the virtual assistant system 10, which allows the services 300*a* and 300*b* to communicate with each other.

The above procedure can be used to connect any number of services 300*a-n* that require communication therebetween. For instance, a television can also be connected with external wireless speakers and an external wireless Blu-Ray player. Thus, the need for detailed "set-up" operations to enable services 300*a-n* to communicate with each other is eliminated.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A mobile device comprising a user interface, a communicator, a central processing unit (CPU), and a storage unit storing instructions executable by the CPU, the instructions configured to implement:
   a first application module configured to receive a first input command from a user through the user interface;
   a second application module configured to receive a second input command from the user through the user interface; and
   an assistant interface configured to translate the first input command into a first semantic atom and to transmit the first semantic atom via the communicator to an external server to perform functions at a first external service;
   the assistant interface further configured to translate the second input command into a second semantic atom and to transmit the second semantic atom via the communicator to the external server to perform functions at a second external service;
   the storage unit further storing libraries mapping received input commands to semantic atoms, each semantic atom encapsulating digital data specifying a function to be performed, the first and second semantic atoms corresponding to semantic atoms stored by the storage unit.

2. The mobile device of claim 1, the assistant interface further configured to receive a third semantic atom from the external server and to translate the third semantic atom into an output command for the first application module.

3. The mobile device of claim 2, the assistant interface further configured to receive a fourth semantic atom from the external server and to translate the fourth semantic atom into an output command for the second application module.

4. The mobile device of claim 1, the assistant interface configured to translate the first and second input commands into the same semantic atom.

5. The mobile device of claim 1, the first and second semantic atoms being part of a common command set comprising representations of commands, authority to issue commands, people, objects, and services.

6. The mobile device of claim 1, the first application module and the second application module being downloaded to the mobile device from separate external sources.

7. The mobile device of claim 1, the definitions of the first and second semantic atoms evolving over time based on participation of an open developer community.

8. The mobile device of claim 1, the first and second semantic atoms being represented in a format comprising at least one of text, YAML, and XML.

9. The mobile device of claim 1, further comprising a storage unit for storing the first and second semantic atoms.

10. The mobile device of claim 1, the first application module comprising at least one of a microphone, a camera, a motion detector, a proximity detector, an infrared sensor, a temperature sensor, and a global positioning device.

11. The mobile device of claim 1, the assistant interface further configured to translate the first input command into distinct semantic atoms based on a location of the mobile device.

12. The mobile device of claim 1, the assistant interface further configured to:
   receive a semantic atom comprising a third command for at least one other mobile device from the external server; and transmit the third command to the at least one other mobile device.

13. The mobile device of claim 1, wherein the first semantic atom extends authority to perform input commands for one or more external services to at least one other mobile device.

14. The mobile device of claim 13, wherein the first semantic atom further revokes authorization of the at least one other mobile device to perform input commands for the one or more external services.

15. The mobile device of claim 13, wherein the authority includes information to limit the authorization to a predetermined level of control, a predetermined location in which control is permitted, a predetermined time frame in which the control is permitted, and a predetermined access path in which the other user approaches the one or more external services.

16. A mobile device comprising a user interface, a communicator, a central processing unit (CPU), and a storage unit storing instructions executable by the CPU, the instructions configured to implement:
   a first application module configured to generate an output command through the user interface;
   a second application module configured to receive an input command through the user interface; and
   an assistant interface configured to receive a first semantic atom via the communicator from a first plugin of an external server, and to translate the first semantic atom into the output command for the first application module;
   an assistant interface configured to translate the input command into a second semantic atom and to transmit the second semantic atom via the communicator to an external server to perform a function at least one external service;
   the storage unit further storing libraries mapping received input commands to semantic atoms, each semantic atom encapsulating digital data specifying a function to be performed, the first and second semantic atoms corresponding to semantic atoms stored by the storage unit.

17. The mobile device of claim 16, the first application module comprising a social networking application, the first semantic atom comprising an event update destined for the first application module, the output command comprising an alert notification for an interface of the first application module, the second application module comprising a touchscreen input module, the input command comprising an icon touch or touchscreen gesture, the second semantic atom comprising an instruction to submit a query containing the event update to the external server.

18. The mobile device of claim 17, the assistant interface further configured to receive a third semantic atom from the external server containing at least one response to the query submitted in the second semantic atom.

19. The mobile device of claim 18, further comprising a third application module, the third semantic atom comprising an output command for the third application module.

20. The mobile device of claim 19, the third application module comprising a sound player, the output command for the third application module comprising a command to output specific sounds using the sound player.

* * * * *